US008041677B2

(12) United States Patent
Sumner et al.

(10) Patent No.: US 8,041,677 B2
(45) Date of Patent: Oct. 18, 2011

(54) METHOD AND SYSTEM FOR DATA BACKUP

(75) Inventors: Gary Steven Sumner, North Bend, WA (US); Jaybe Mark Ammons, Sapphire Beach (AU); Mike Liddell, Richmond (AU)

(73) Assignee: Datacastle Corporation, Seattle, WA (US)

( * ) Notice: Subject to any disclaimer, the term of this patent is extended or adjusted under 35 U.S.C. 154(b) by 274 days.

(21) Appl. No.: 11/580,425

(22) Filed: Oct. 12, 2006

(65) Prior Publication Data
US 2007/0100913 A1 May 3, 2007

Related U.S. Application Data

(60) Provisional application No. 60/725,812, filed on Oct. 12, 2005.

(51) Int. Cl.
*G06F 7/00* (2006.01)
*G06F 17/00* (2006.01)
(52) U.S. Cl. ......... 707/640; 707/652; 707/654; 707/682
(58) Field of Classification Search .................. None
See application file for complete search history.

(56) References Cited

U.S. PATENT DOCUMENTS

| 5,659,614 | A | 8/1997 | Bailey, III | |
| 6,021,201 | A * | 2/2000 | Bakhle et al. | 713/189 |
| 6,101,507 | A * | 8/2000 | Cane et al. | 707/204 |
| 6,505,216 | B1 * | 1/2003 | Schutzman et al. | 707/204 |
| 7,383,462 | B2 * | 6/2008 | Osaki et al. | 714/2 |
| 7,440,965 | B1 * | 10/2008 | Pruthi et al. | 707/102 |
| 2003/0046502 | A1 * | 3/2003 | Okazaki | 711/162 |
| 2004/0243652 | A1 * | 12/2004 | Furuta | 707/204 |
| 2004/0260973 | A1 * | 12/2004 | Michelman | 714/13 |
| 2005/0131990 | A1 | 6/2005 | Jewell | |
| 2005/0228994 | A1 * | 10/2005 | Kasai et al. | 713/168 |
| 2005/0257062 | A1 * | 11/2005 | Ignatius et al. | 713/176 |
| 2006/0271601 | A1 * | 11/2006 | Fatula et al. | 707/201 |

OTHER PUBLICATIONS

Herscovitz "Secure Virtual Private Networks: The future of Data Communications" International Journal of Network Management Int. J. Network Mgmt. 9, 213—220 (1999).*
Bhattacharya et al. "Coordinating Backup/Recovery and Data Consistency Between Database and File Systems" ACM SIGMOD '2002, Jun. 4-6, 2002, Madison, Wisconsin, USA.*
Rosenblum et al. "The LFS Storage Manager" Summer '90 USENIX Technical Conference, Anaheim, California, Jun. 1990.*

(Continued)

*Primary Examiner* — Pierre M Vital
*Assistant Examiner* — Berhanu Mitiku
(74) *Attorney, Agent, or Firm* — Olympic Patent Works PLLC

(57) ABSTRACT

Embodiments of the present invention are directed to Web-Services-based data backup and data-archiving applications that provide remote data backup and data archiving to private individuals, small businesses, and other organizations that need reliable, secure, geographically remote, and cost-effective data backup, data archiving, and backed-up and archived-data retrieval. In one embodiment of the present invention, a private or small-business client contracts with a service provider for data-backup and data-archiving services. The service provider, in turn, contracts with a remote data-storage facility to provide secure, reliable data backup and data archiving to the personal or small-business client. A client-side application is downloaded to the client computer and configured to allow the client to store locally encrypted data at the remote, data-storage facilities. Neither the service provider nor the data-storage facility can decrypt or otherwise access the information stored by the client.

8 Claims, 47 Drawing Sheets

OTHER PUBLICATIONS

Lorie "Physical Integrity in a Large Segmented Database" ACM Transsctions on Database Systems, vol. 2, No. 1, Mar. 1977, Pager, 91-104.*

Burns et al. "Efficient Distributed Backup with Delta Compression" Department of Computer Science Department of Computer Science IBM Almaden Research Center.*

* cited by examiner

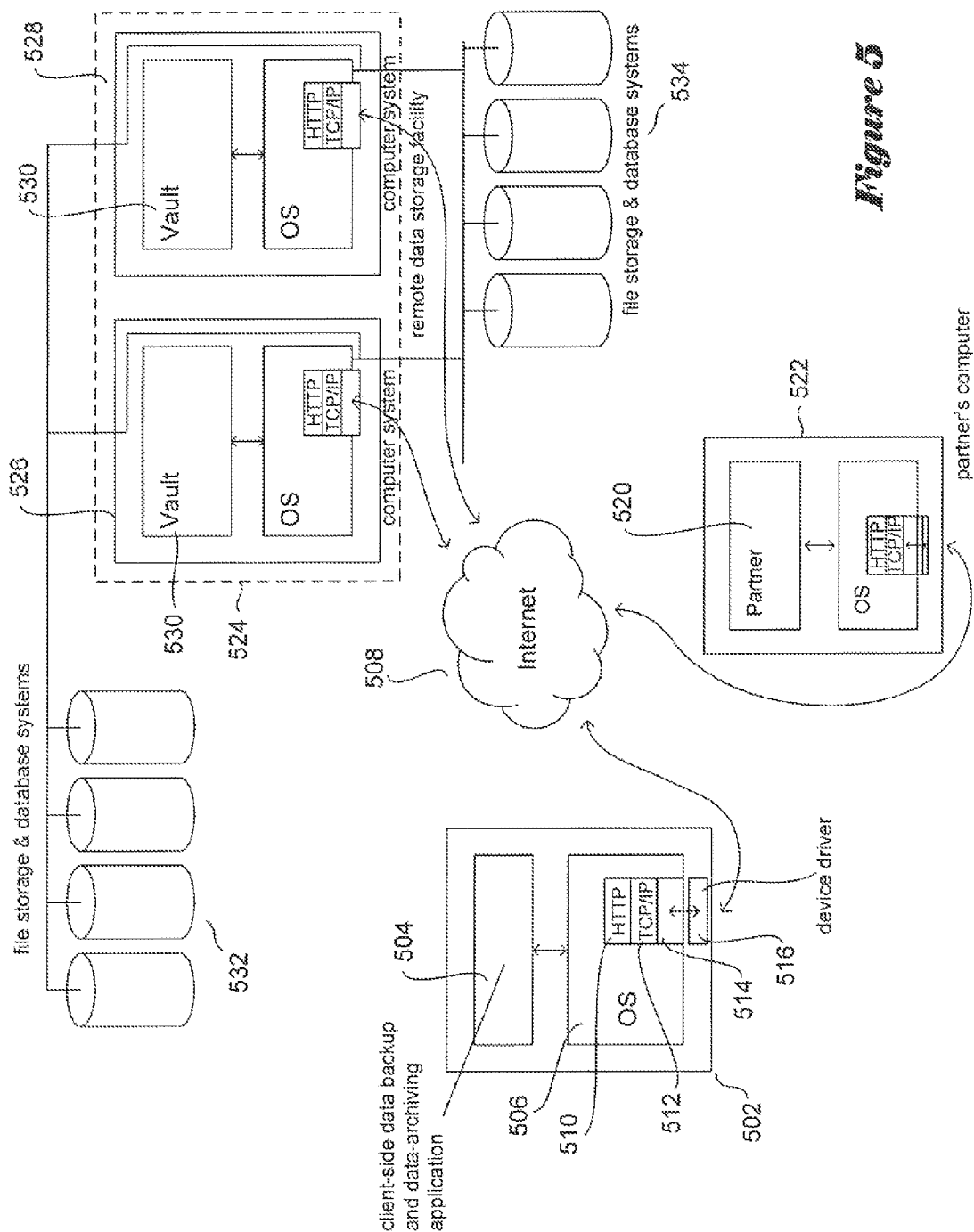

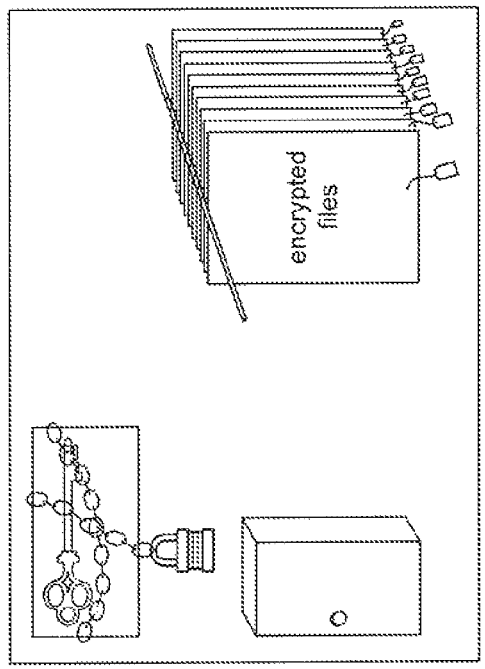
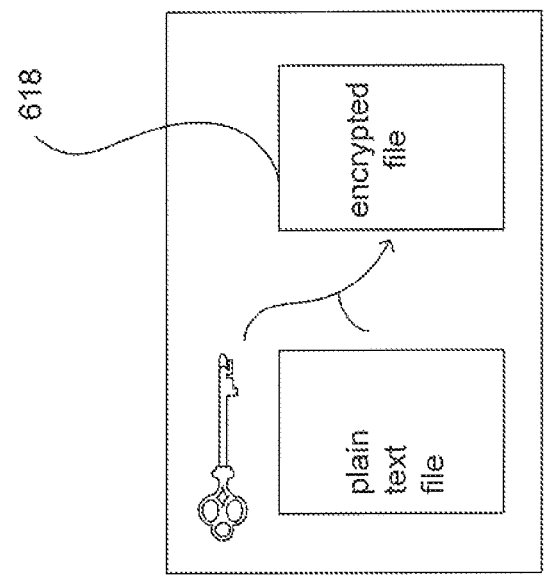
Figure 6D

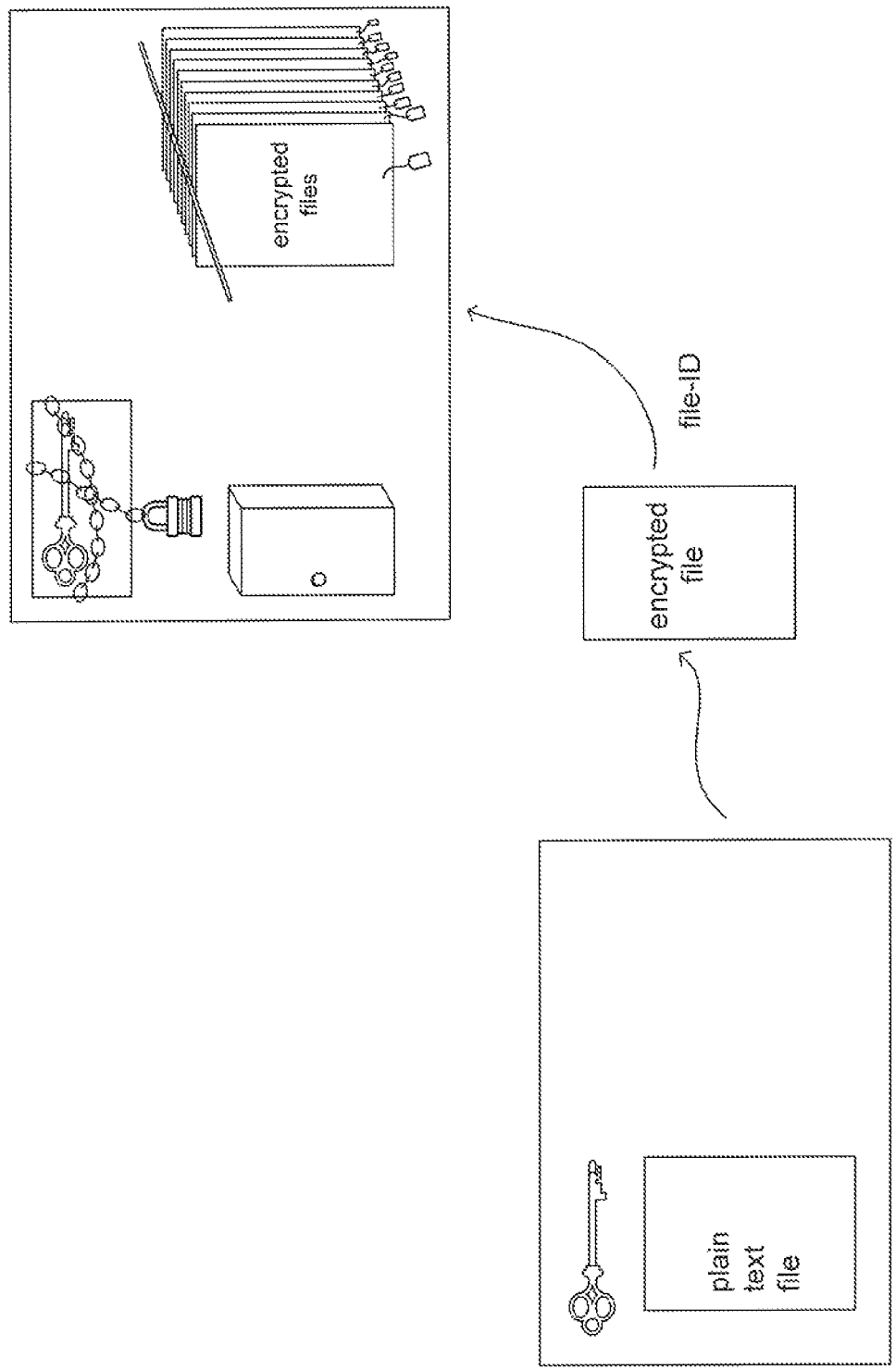

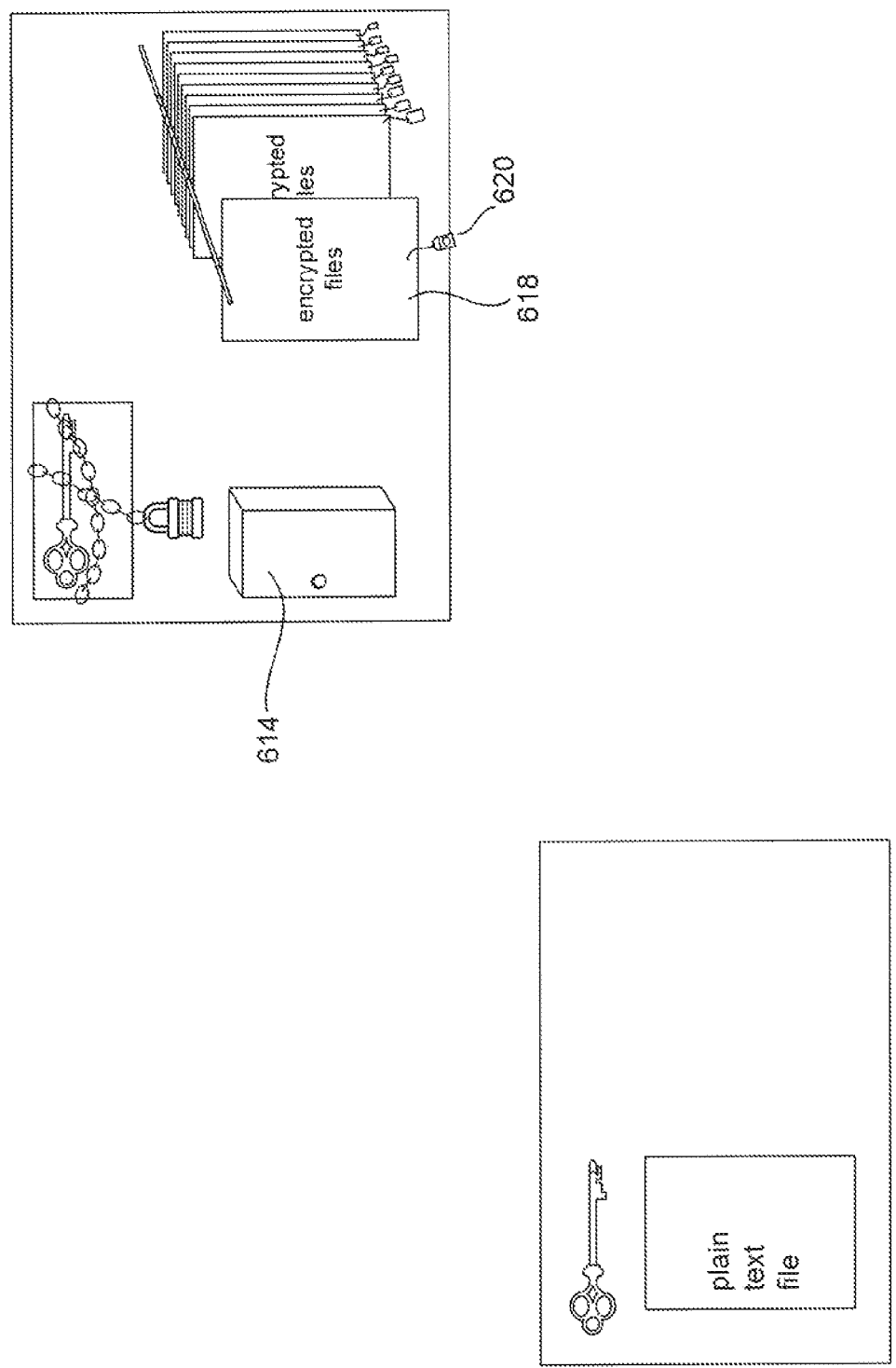

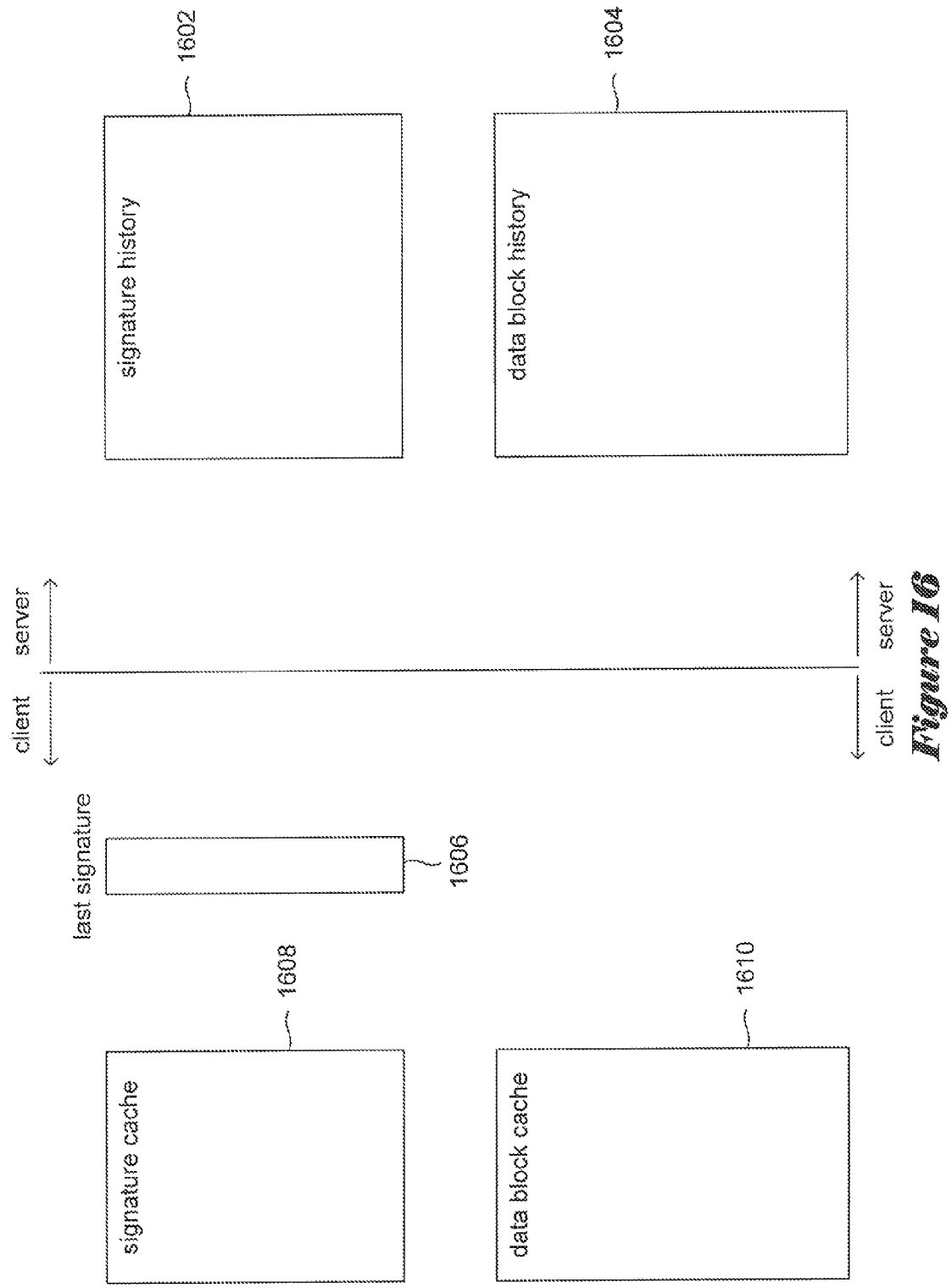

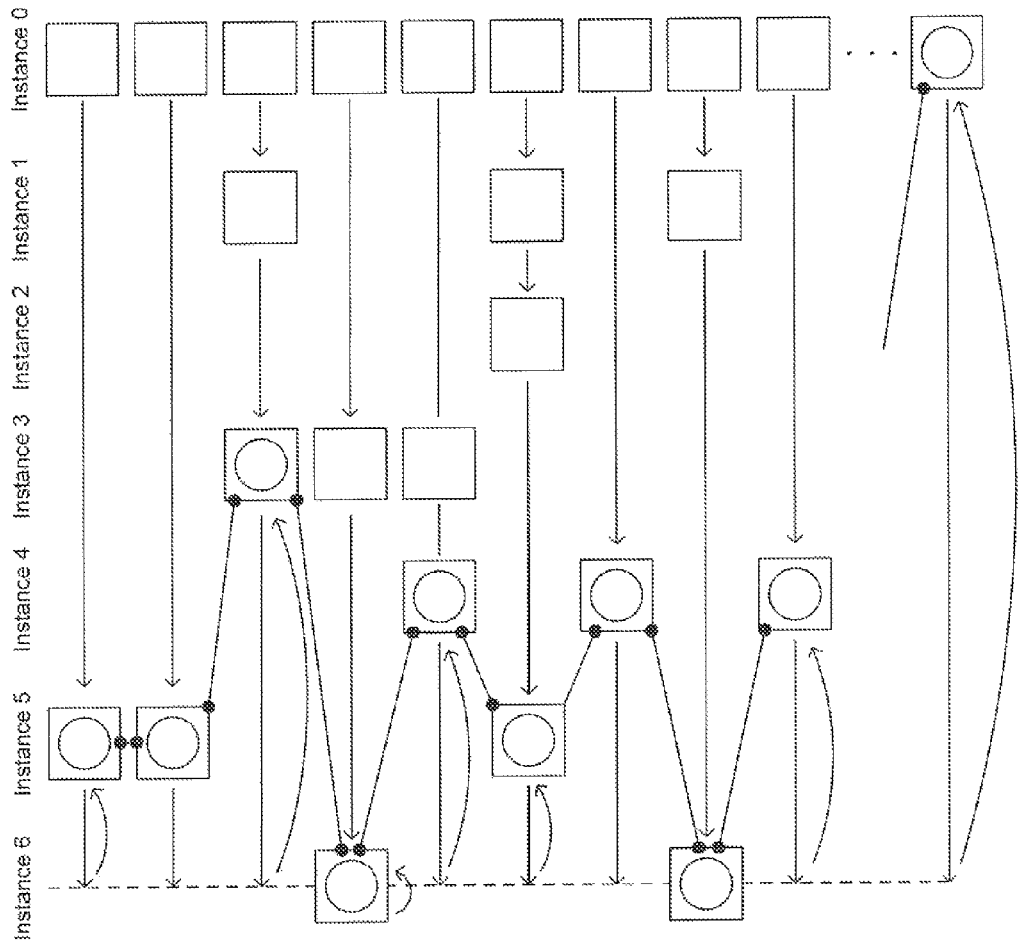

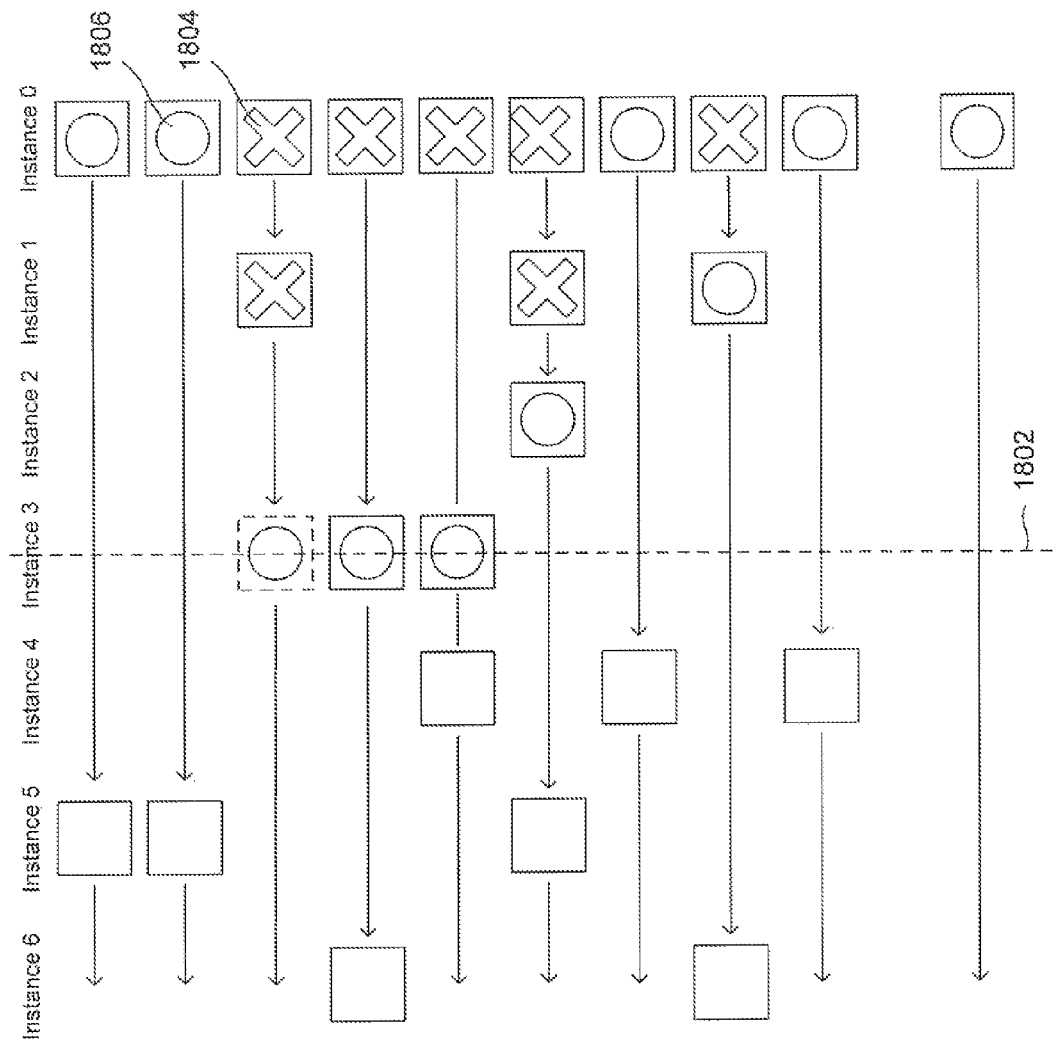

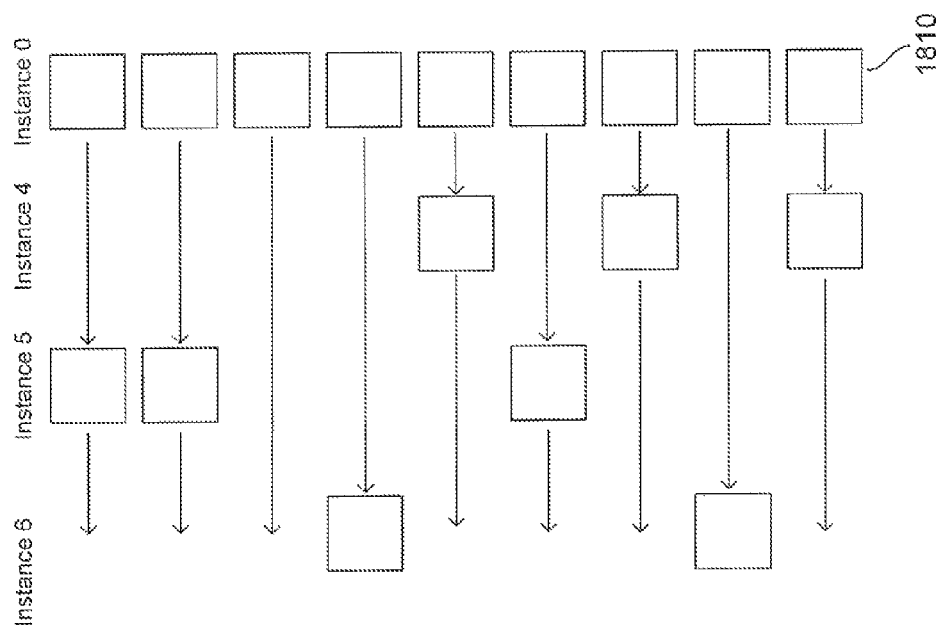

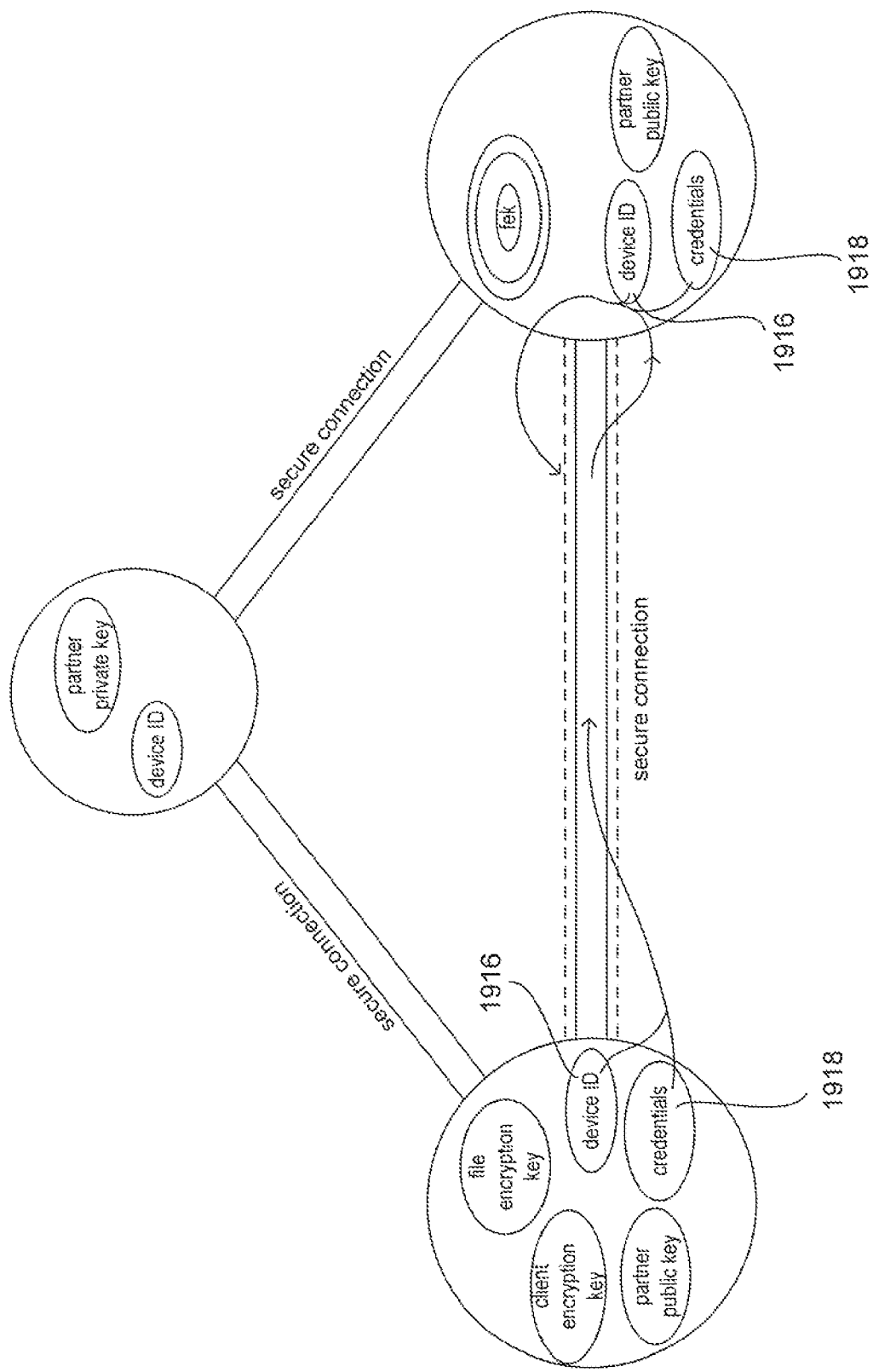

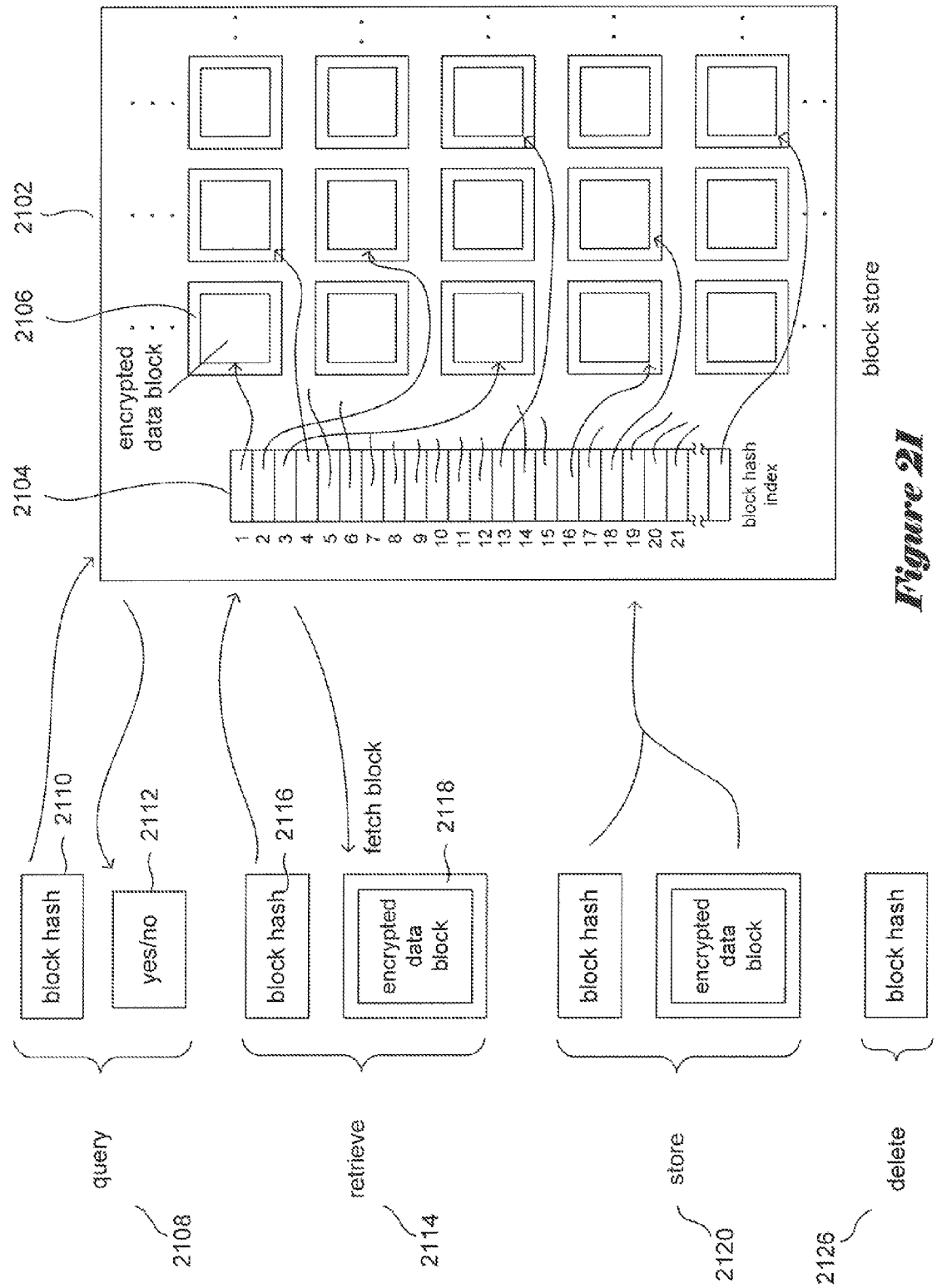

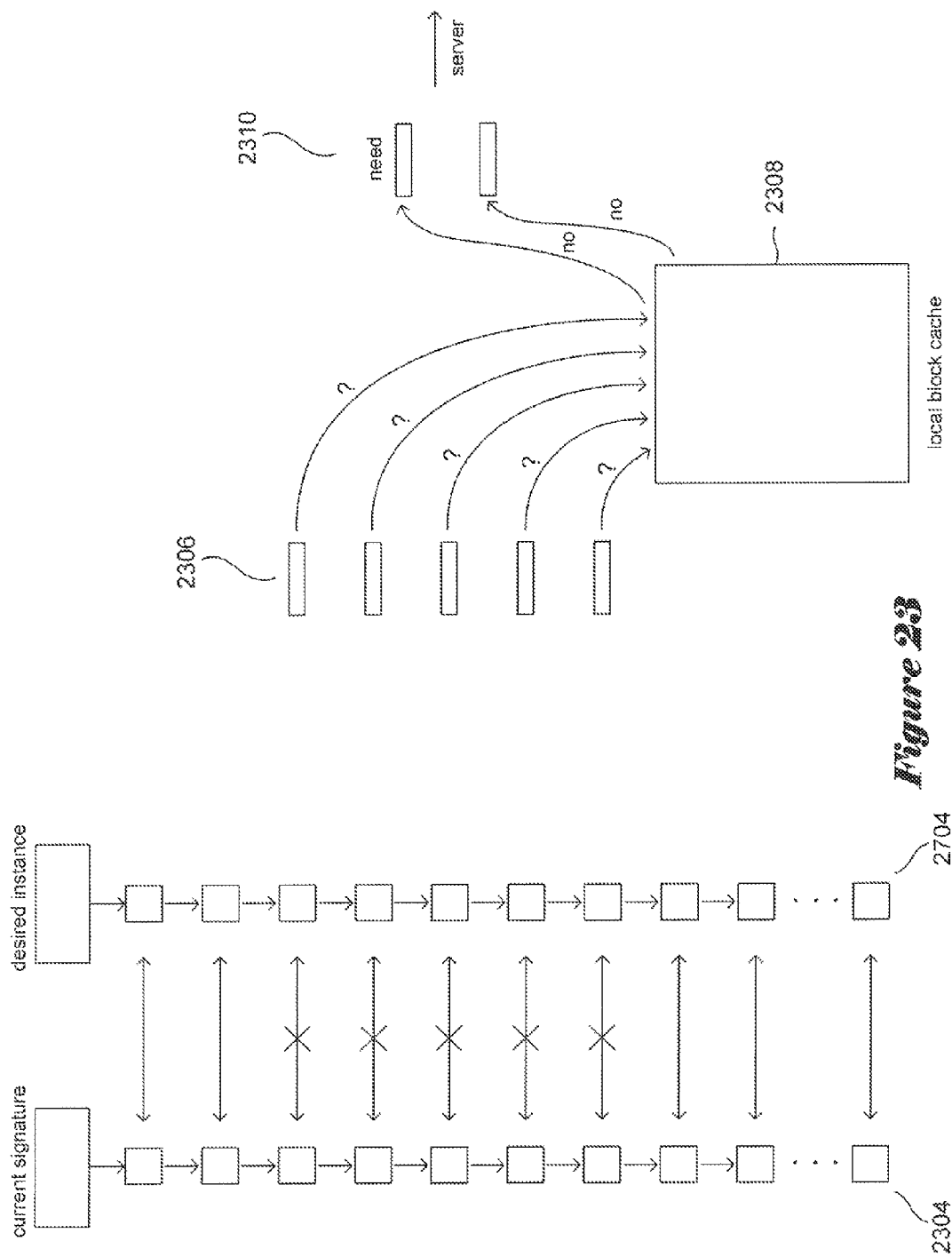

METHOD AND SYSTEM FOR DATA BACKUP

CROSS-REFERENCE TO RELATED APPLICATION

This application claims the benefit of U.S. Provisional Patent Application No. 60/725,812, filed Oct. 12, 2005.

TECHNICAL FIELD

The present invention is related to data backup and data archiving and, in particular, to Web-Services-based data backup and data archiving that allow private and commercial computer users to back up and archive data, including data files, on remote data-storage facilities via a Web-Services-based application.

BACKGROUND OF THE INVENTION

Only 30 years ago, the vast majority of private individuals, small businesses, and even medium-sized businesses carried out word processing tasks on electronic typewriters and stored personal and business-related data on hand-written and typed papers and forms that were manually filed in indexed folders within filing cabinets. During the late 1970's and 1980's, mini-computer-based word-processing systems, and, subsequently, personal computers became widely available, and electronic data storage relatively quickly replaced handwritten and typed pages stored in filing cabinets. However, in many cases, electronic data was stored on floppy disks that were, in turn, indexed and physically stored in filing-cabinet-like enclosures, since the small capacity and lack of robustness of early mass-storage devices and computer systems limited their usefulness for storing data backups and archived data. Data backups and archived data need to be reliably stored for relatively long periods of time. Often, backed-up and archived data may never again be needed, but, in those cases in which backed-up or archived data needs to be retrieved for subsequent use, an ability to retrieve the backed-up or archived data may result in serious and, in certain cases, even fatal consequences for business organizations.

With the continued improvement of personal computers and business computing systems, and increased price performance of computers, data backups and data archives are currently most commonly stored in mass-storage devices accessible by networked computer systems. FIG. 1 illustrates options for data backup and data archiving in a small-business environment. In general, an employee or small-business owner carries out most data-related tasks on the employee's or business owner's personal computer 102. Personal computers are commonly purchased with multiple disk drives that allow for redundant data backup, including full disk mirroring, and redundant data archiving within a single computer system. However, small businesses generally employ networked systems of personal computers and one or more servers 104 with higher-capacity and more highly available and fault-tolerant data-storage subsystems. In such environments, the employee or business owner primarily using PC 102 can access, via a network, other PCs 106 and 108 or the centralized server 104 for storing backup data and for archiving data, in addition to any local backup and archiving within the employees or business owner's own PC 102. Similarly, home users may have multiple disk drives on their PCs, and often have networked, multiple-PC systems that allow for storing backup data and archiving data over two or more networked computers. Additionally, data can be backed up and archived, in the small system shown in FIG. 1, on writeable CDs or DVDs, magnetic tapes, or other types of physical storage media, and the CDs, DVDs, or tapes may be stored in remote locations. Again, however, such practices depend on regularly conducted backups and archiving, on managing remotely stored information, and other manual tasks that are often forgotten or put off.

Unfortunately, current trends and developments in personal and business computing are conspiring to make data backup and data archiving in small computer systems, such as the small computer system shown in FIG. 1, inefficient and dangerous. As applications and computer systems on which applications run continue to become larger and more capable, the amount of electronic data that is routinely generated and that needs to be backed up and archived by personal and small-business users is increasing rapidly. Furthermore, as more activities and tasks become automated as a result of the increasing price performance in computer systems and the increasing availability of a wide variety of application programs, more types of electronic data are being generated by home and small-business computer users, much of which may need to be backed up and archived. New regulations and statutes require small business to maintain reliably backed-up data for relatively long periods of time. For example, certain new statues require electronic, reliable storage of medical records, and other new statutes require reliable, electronic storage of email and other securities-related information in companies dealing with securities transactions. These statutes and regulations contribute enormous added data-backup and data-archiving overhead. Data backup and data archiving require continuous diligence and technical understanding on the part of home users and small businesses. Home users and small businesses often lack the technical expertise, time, and vigilance required to effectively back up and archive data in ways that guarantee that backed-up and archived data is not lost or does not end up being unrecoverable for a variety of different reasons. Although progress has been made by computer vendors, operating-systems vendors, and other hardware, software, and service providers, efficient, user-friendly data backup and data archiving may require interfacing many different components with one another, and the many interfaces may be neither stable over time nor easy to set up and manage. Reliable data backup and data archiving require data to be stored in two or more geographically remote locations, to prevent catastrophic data loss at a single site. For example, even when data is backed up and archived in triply or quadruply redundant fashion within a small business, a fire, flood, or earthquake can easily result in all redundantly stored data being lost or unrecoverably damaged. Backing up and archiving data to geographically remote data-storage facilities is often beyond the technical and economic capabilities of home users and small businesses. Finally, even were a home user or small business able to create and manage a reliable and effective data backup and archiving system, it is exceedingly difficult for home users and small businesses to secure backed-up and archived data from inadvertent or malicious, unauthorized access. Such data is commonly accessed by hackers, business competitors, and fraudulent groups and organizations. For all of these reasons, home users, small businesses, and even medium-sized businesses and larger organizations have all recognized the need for user-friendly, reliable, and cost-efficient data backup and data storage services.

SUMMARY OF THE INVENTION

Embodiments of the present invention are directed to Web-Services-based data backup and data-archiving applications that provide remote data backup and data archiving to private individuals, small businesses, and other organizations that need reliable, secure, geographically remote, and cost-effective data backup, data archiving, and backed-up and archived-data retrieval. In one embodiment of the present invention, a private or small-business client contracts with a service provider for data-backup and data-archiving services. The service provider, in turn, contracts with a remote data-storage facility to provide secure, reliable data backup and data archiving to the personal or small-business client. A client-side application is downloaded to the client computer and configured to allow the client to store locally encrypted data at the remote, data-storage facilities. Neither the service provider nor the data-storage facility can decrypt or otherwise access the information stored by the client. In addition, the encryption key or encryption keys used by the client to encrypt the data for remote storage are securely stored at the remote, data-storage facility for subsequent recovery by the client, should the client suffer damage or loss to a local computer system. However, the client encryption key is stored in a doubly encrypted fashion, preventing access to the client's encryption key by either the service provider or the data-storage facility. Certain embodiments of the present invention also provide local indexing for remotely stored, encrypted data and efficient storage of updates to already remotely stored data.

BRIEF DESCRIPTION OF THE DRAWINGS

FIG. 5 illustrates one possible, high-level hardware configuration that supports various embodiments of the present invention.

FIGS. 6A-F illustrate one aspect of a Web-Services-based, data-backup-and-data-archiving service that represents one embodiment of the present invention.

FIGS. 15A-E illustrate file instancing according to embodiments of the present invention.

FIG. 16 summarizes the information stored on the server-side portion and client-side portion of the backup, restore, and archiving system that represents one embodiment of the present invention for each file on the client device that is monitored and continuously backed up by the backup, restore, and archiving system.

FIGS. 17A-B illustrate the logical operation for constructing a particular instance of a file from the file-signature history and data-block history stored for the file according to embodiments of the present invention.

FIGS. 18A-B illustrate version-history truncation according to embodiments of the present invention.

FIGS. 19A-B illustrate security-related entities and operations within the backup, restore, and archiving system that represents one embodiment of the present invention.

FIG. 19D illustrates secure communications between the client device and server facilitated by client credentials.

FIG. 21 illustrates, at an overview level, the block store implemented by the permanent-store portion of the server-side portion of the backup, restore, and archiving system that represents one embodiment of the present invention.

FIG. 23 illustrates differential restore.

DETAILED DESCRIPTION OF THE INVENTION

Embodiments of the present invention are directed to a Web-Services-based data-backup and data-archiving application. As discussed above, although electronic data backup and data archiving are now commonly employed by home users and small businesses, the need for reliable, secure, and geographically remote data backup and data archiving continues to grow with increases in data generation and requirements for reliable data backup and archiving.

As discussed above, with reference to FIG. 1, a PC user in a home environment or small-business environment may access hardware and software resource both on the local PC as well as on remote PCs within the home environment or small-business environment, and servers within business environments. Again, however, as discussed above with reference to FIG. 1, the networked home-computer systems and small-business systems are inadequate for data backup and archiving needs.

Figure 2:
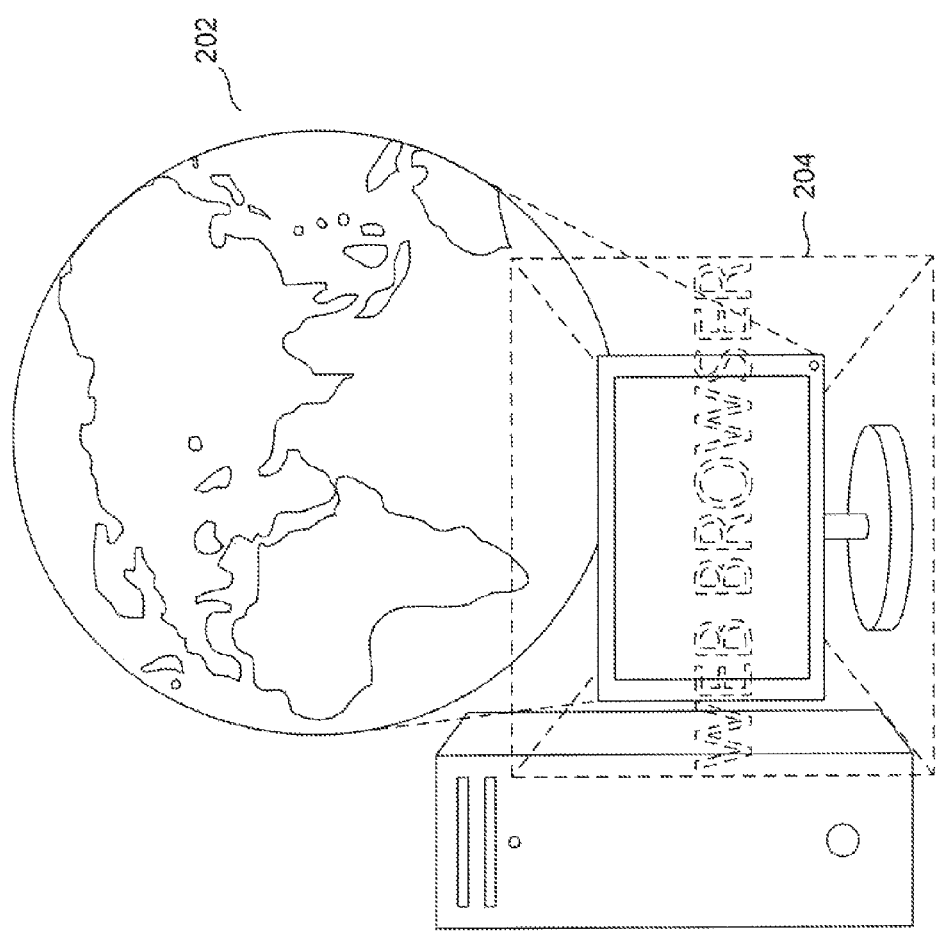
FIG. 2 shows additional resources available to a PC user in either a home environment or a small-business environment.
Figure 3:
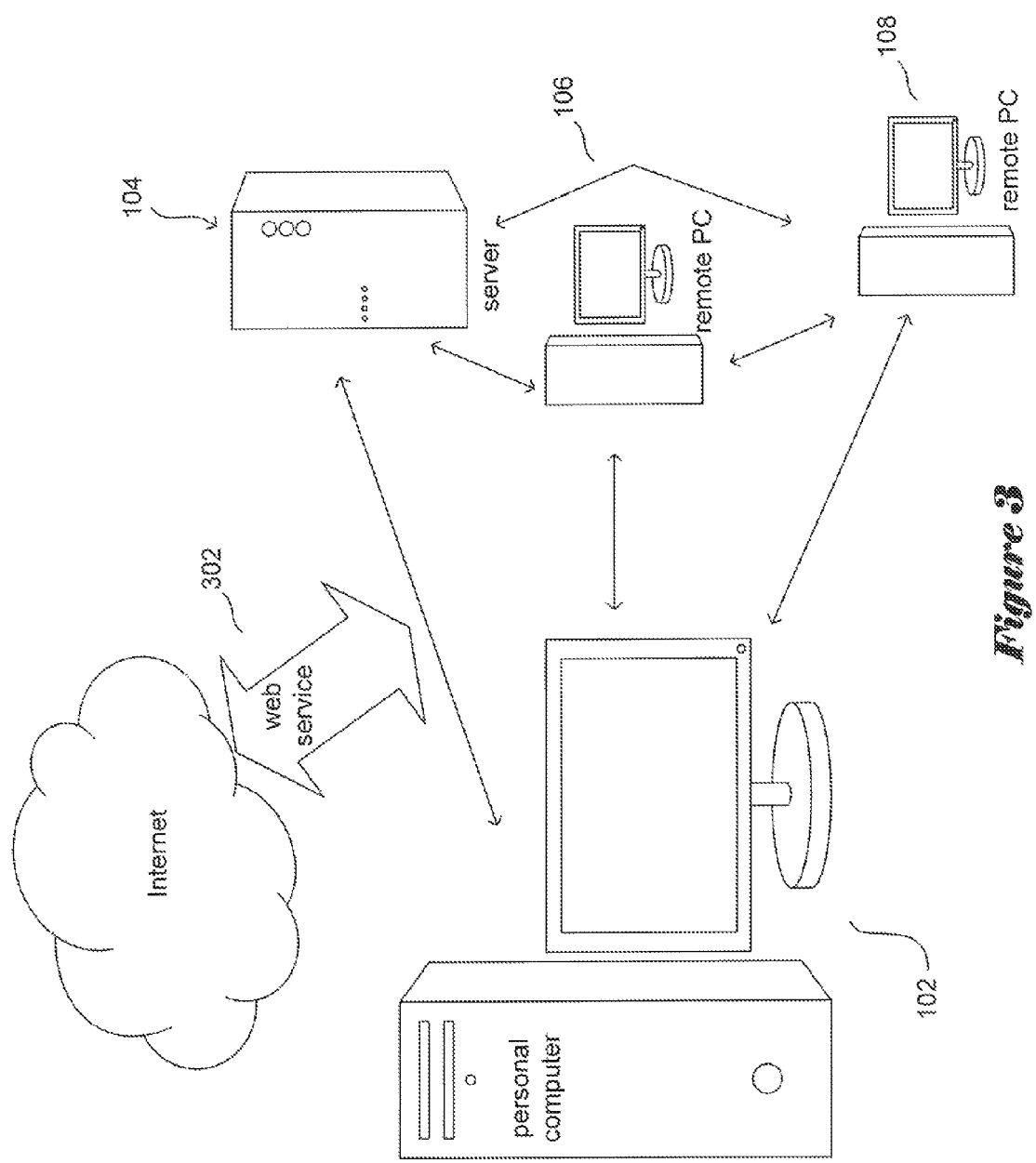
FIG. 3 illustrates, using the illustration conventions of FIG. 1, backup and archiving resources available to a home user, small-business user, or other user of a PC or other small computer system.

As shown in FIG. 2, a PC user may, in addition to accessing local hardware and software resources and the hardware and software resources available over a local area network, access an enormous amount of HTML-encoded information and Internet-based services 202 from all over the world via a web browser 204 executed on the local PC and Internet access provided by an Internet service provider. Unfortunately, while a PC user may access tens of millions of pages of information through the Internet, and may conduct retail transactions and business-to-business transactions on the Internet in order to purchase and receive various goods and services, there is currently no method known to Applicants that allows a user to continuously, securely, and transparently upload data files and other files to a remote data-storage facility, through the Internet, for backup and archiving purposes, without exposing potentially confidential information, including file names and other file attributes, to the remote data-storage facility, to hackers, and to those who might intercept information transmission through the Internet.

A new standard for application-to-application interaction through the Internet is currently under development. This collection of emerging standards is referred to as "Web Services." Web Services can be thought of as a collection of HTTP-based or HTTPS-based, and XML-based, protocols that define particular types of operations or transactions associated with particular ports, currently including ports 80 and 443. For example, a Web-Services protocol may be defined to allow a particular application program running on a client computer to interact with a server-based counterpart to the application program in order to carry out certain, defined tasks. A Web-Services-based application may include client-side and server-side, paired application programs for encoding and transferring medical information. Another Web-Services-based application may allow for concurrent audio and visual information to be transmitted between two peer PCs and rendered for broadcast and display to allow for video conferencing between users or groups of users interfacing with two PCs interconnected through the Internet. The current availability of web browsers and Internet access to both home users and small-business users of computer systems, and the emergence of Web-Services-based applications, together with the currently recognized need for reliable, secure, and cost-effective data backup and data archiving services to remote data-storage facilities motivates a variety of different embodiments of the present invention. These embodiments are directed to Web-Services-based data-backup and data-archiving services that allows a private individual, small-business employee, or other user of a PC or small-computer-system to easily and cost-effectively transmit data for backup or archiving to a remote data-storage facility over the Internet via a Web-Services-based application and to retrieve backed-up and archived data from the remote data-storage facility, as needed.

Figure 1:
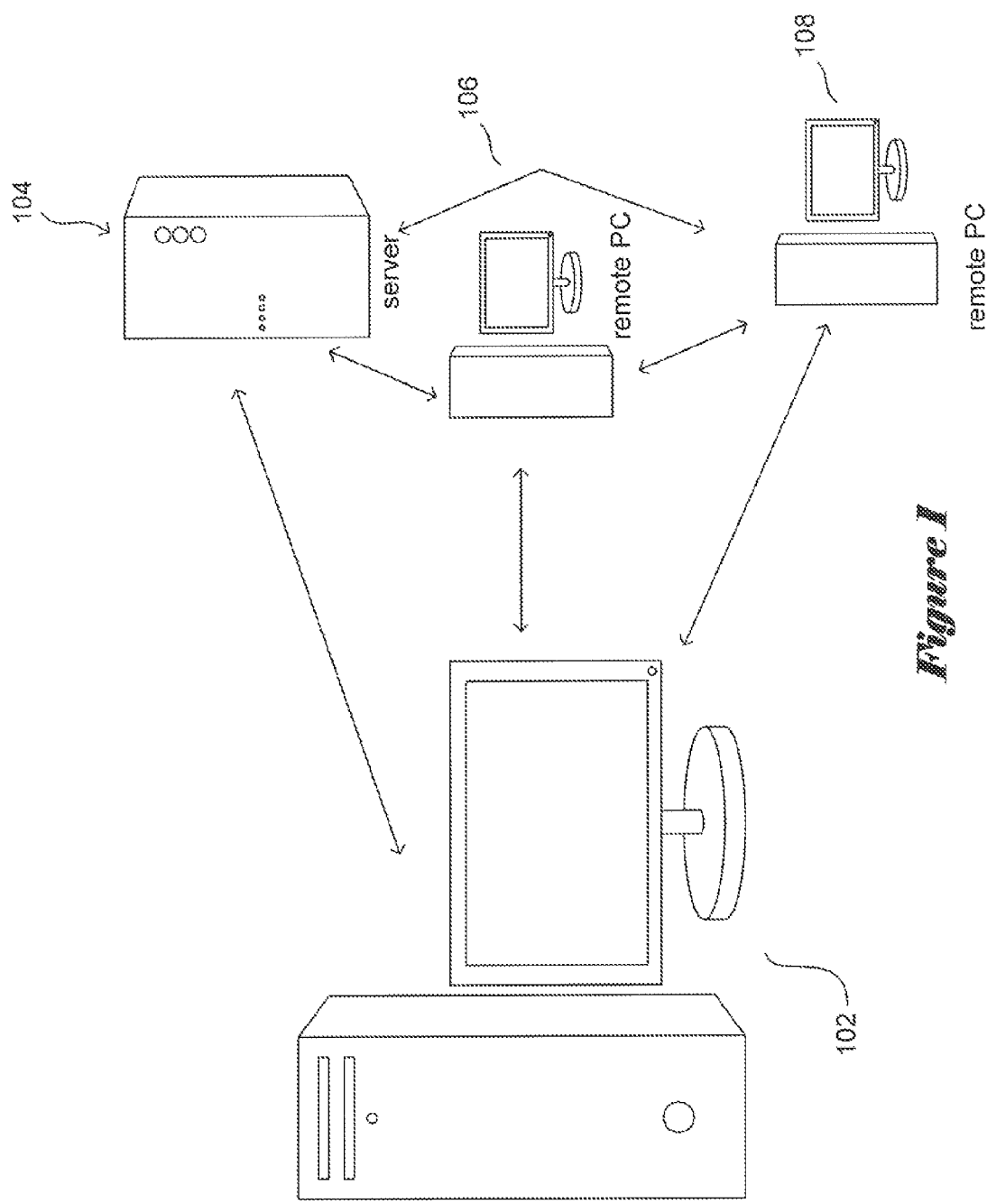
FIG. 1 illustrates options for data backup and data archiving in a small business.
Figure 4:
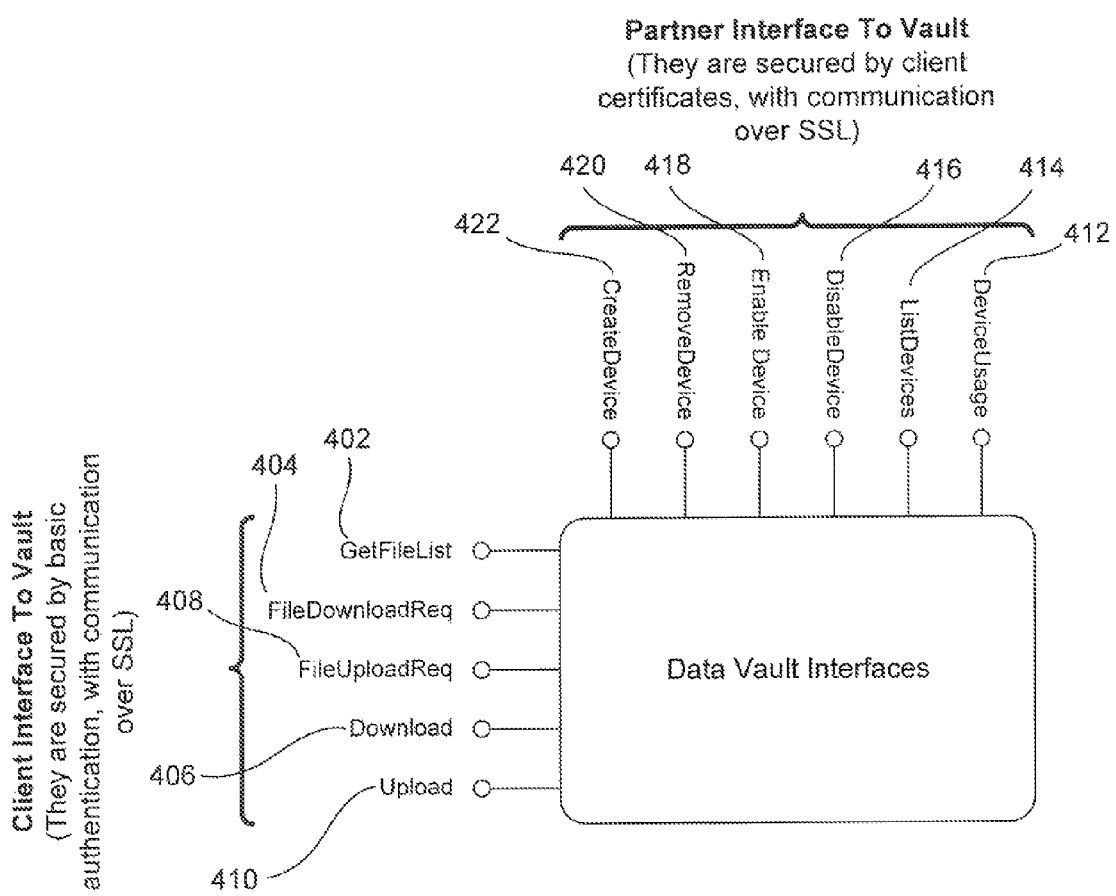
FIG. 4 illustrates the two Web-Services interfaces provided by one embodiment of the data-vault Web-Services-based application that runs on a remote data-storage facility.

FIG. 4 illustrates, using the illustration conventions of FIG. 1, backup and archiving resources available to a home user, small-business user, or other user of a PC or other small computer system. As discussed with reference to FIG. 1, the user of a PC 102 or other small computer system within a home environment, small-business environment, research environment, or other environment in which data is generated and in which generated data needs to be reliably backed up and archived, may employ local mass-storage devices, other hardware, and software to back up and archive data redundantly within the local PC 102, may back up and archive data on remote, networked PCs 106 and 108, may back up and archive data on a centralized server or other larger-scale computer resource 104, and, in accordance with the present invention, may employ a data-backup and data-archiving, Web-Services-based service 402 to back up and archive data on a remote data-storage facility that supports the data-backup and data-archiving web service. The Web Service may be directly accessed from the local PC 102 via a data-backup and data-archiving client-side application program running on the local PC 102, or may access the data-backup and data-archiving Web Service indirectly, via the centralized computing resource 104 or through remote PCs 106 and 108.

The data-backup and data-archiving Web Service, like any Web Service, can be viewed as a collection of operations, remote procedure calls, or other such functional interfaces that together constitute a defined Web Service. In various embodiments of the present invention, the remote data-storage facility implements a data-vault that provides a first Web-Services interface to client computers running client-side data-vault applications and a second Web-Services interface to partner service providers through which clients contract data-backup and data-archiving services provided by the remote data-storage facility. FIG. 4 illustrates the two Web-Services interfaces provided by one embodiment of the data-vault Web-Services-based application that runs on a remote data-storage facility. The data-vault application provides the first Web-Services interface to client computers comprising separate protocols that allow a client to retrieve a list of files stored by the client on the remote data-storage facility 402, request preparation for retrieval of a file stored on the remote data-storage facility 404, to actually retrieve a file requested for retrieval from the data-storage facility 406, to request preparation for upload of a file for storage onto the remote data-storage facility 408, and to actually upload a file to the remote data-storage facility for storage 410. In one embodiment, the data-vault web-based application provides a partner interface to third-party, partner service providers that allows a partner service provider to obtain device-usage information from the data-vault application 412, to list devices configured by the data-vault application for clients through the partner service provider 414, to disable a device configured for a client computer via the partner service provider 416, to enable a device configured for a client of the partner service provider 418, to remove a device configured for a client through the partner service provider 420, and to create a new device for a client of the partner service provider 422. In alternative embodiments, additional functionalities may be provided by the first and second data-vault web-based interfaces, and in yet additional embodiments, different collections of protocols and associated operations, remote procedure calls, or other functional interfaces may be provided. In some embodiments, the Web-Services-based data-backup and data-archiving service may be provided directly to clients by the remote data-storage facility, without needing a partner services provider.

FIG. 5 illustrates one possible, high-level hardware configuration that supports various embodiments of the present invention. In FIG. 5, a client computer 502 runs a client-side data-backup and data-archiving application 504 on top of an operating system 506 that includes support for Internet-based communications 508. The operating system 506 supports the HTTPS 510 protocol on top of the TCP/IP protocol 512, in turn layered above one or more device-driver-specific protocols 514 that transfer data over an internal bus to a device driver 516 that, in turn, transmits electronic messages to, and receives electronic messages from, remote computers supporting the HTTPS and TCP/IP protocols. A partner data-backup and data-archiving application 520 runs on a partner service provider's computer 522. As discussed above, in certain embodiments of the present invention, a client contracts with a partner service provider for data-backup and data-archiving services. Once service is established, the client then directly communicates with a remote data-storage facility 524 to store and retrieve data. The remote data-storage facility 524 may, in certain embodiments, consist of two or more geographically separate computer systems 526 and 528, each running a data-vault application 520 which provides the first Web-Services interface to client computers and the second Web-Services interface to partner service providers discussed above with reference to FIG. 4. The remote data-storage facility includes redundant file storage and database systems 532 and 534 that may be each geographically associated with the two or more, geographically dispersed, remote data-storage-facility computers 526 and 528, or may be also geographically remote both to the remote-data-storage-facility computers 526 and 528 as well as to the partner service provider 522 and the clients 502.

Figure 6A:
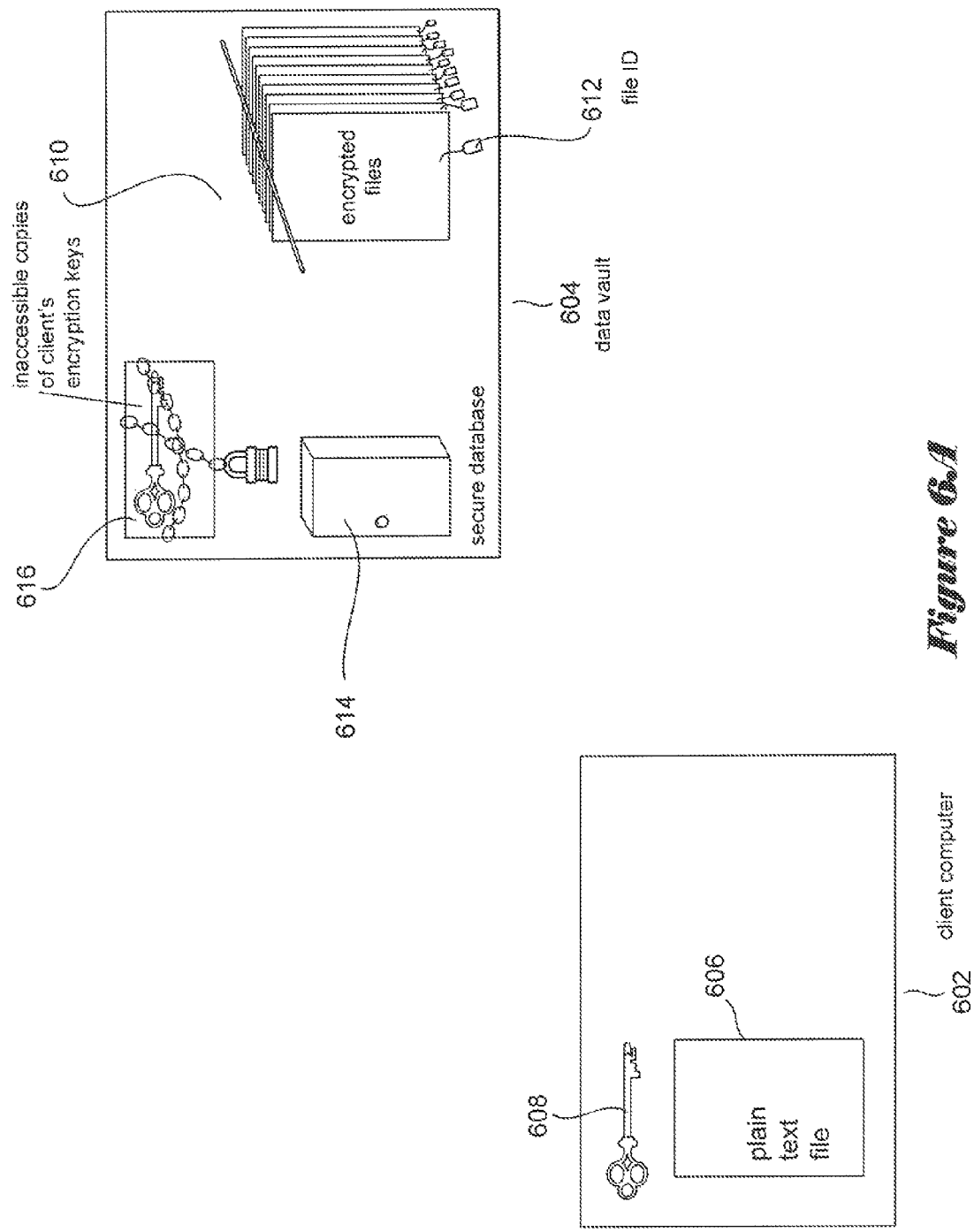

FIGS. 6A-F illustrate one aspect of a Web-Services-based, data-backup-and-data-archiving service that represents one embodiment of the present invention. FIGS. 6A-F employ symbolic representation of features of the Web-Services-based, data-backup-and-data-archiving service. FIG. 6A shows a client 602 and the data vault 604. As discussed above, the client 602 is a client-side Web-Services-based, data-backup-and-data-archiving-service application running on a client computer, and the data vault 604 is a Web-Services-based data-vault application running on one or more remote data-storage-facility computers. A file-store operation, provided by the Web-Services application to clients, provides for transmission of data, generally in the form of a file, from the client to the data vault, for storage. Initially, the client has a plain-text file 606 that the client desires to be backed up or archived on the data vault. The client and also maintains an encryption key 608 to which only the client has access. The client has contracted for data-backup and data-archival services through a partner service provider, and has been configured for data-storage operations. As part of configuration, the client has been allocated a device by the data vault. In other words, from the data-vault's perspective, the client is a remote device with a device identifier. The data vault stores files encrypted by the remote device and transmitted to the data vault by the remote device 610. These files are associated with file IDs, such as file ID 612, to allow the data vault to later retrieve and return the stored, encrypted files, when requested to do so by the client.

The data vault thus provides a logical service analogous to an apparel-check-in service provided by a theatre, bus station, or other such service provider. A customer can check in one or more items, and receives identifying tags for the items. The service provider attaches tags with matching identification numbers to the stored items. Later, the customer can retrieve one or more items of apparel by presenting the tags, which the service provider then matches with the stored apparel. In FIGS. 6A-F, the stored, encrypted files are symbolically represented as articles of apparel hung from a clothing rack, with attached identification tags, to emphasize the above-presented analogy, although, in fact, the files are electronically stored on a file server, or in some other file-storage facility.

The data vault also includes a secure database 614 that can be imagined to serve the purpose of a safe in a bank or retail establishment. One function of the database is to securely store inaccessible copies of the client's encryption key 616. If, for some reason, a client loses the encryption key 608, the client can obtain the encryption key from the data vault. However, the data vault cannot itself access the encryption key, and therefore cannot access any of the information stored in the encrypted file 610. The client normally keeps local lists of all the files that the client has backed up or archived in the data vault. However, if the client were to, for some reason, lose its list of files, the client can retrieve an encrypted list of files from the data vault, which stores encrypted file attributes in the secure database 614. However, the data vault cannot, itself, access the file-attribute information stored in the data vault. Thus, no information concerning the contents of files or the attributes of files backed up or archived in the data vault needs to ever leave the client computer. All data backed up or archived on the data vault is as secure as the encryption techniques employed by the client to encrypt the client's data, and accessible only to the client computer.

Figure 6B:
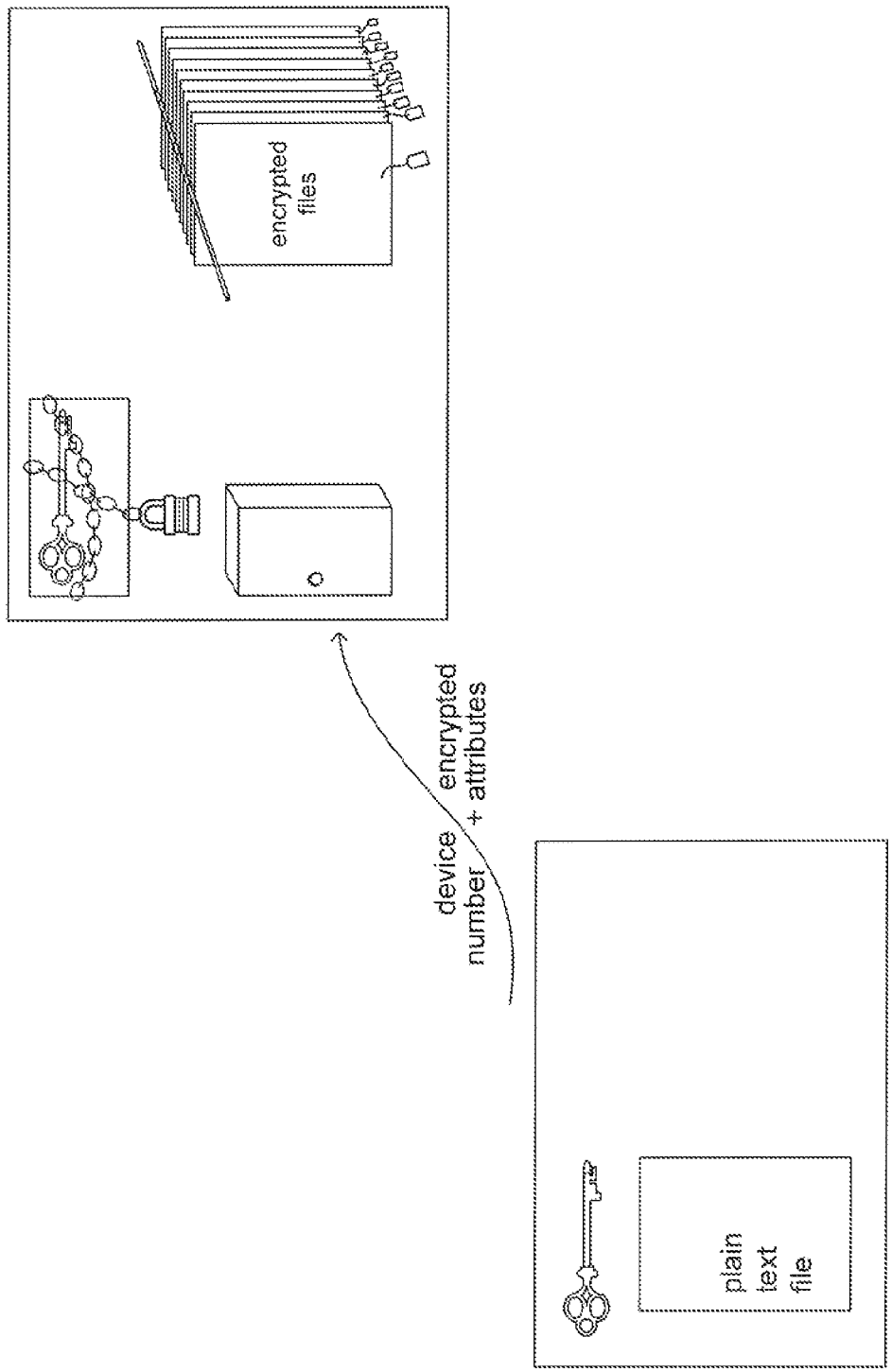
Figure 6C:
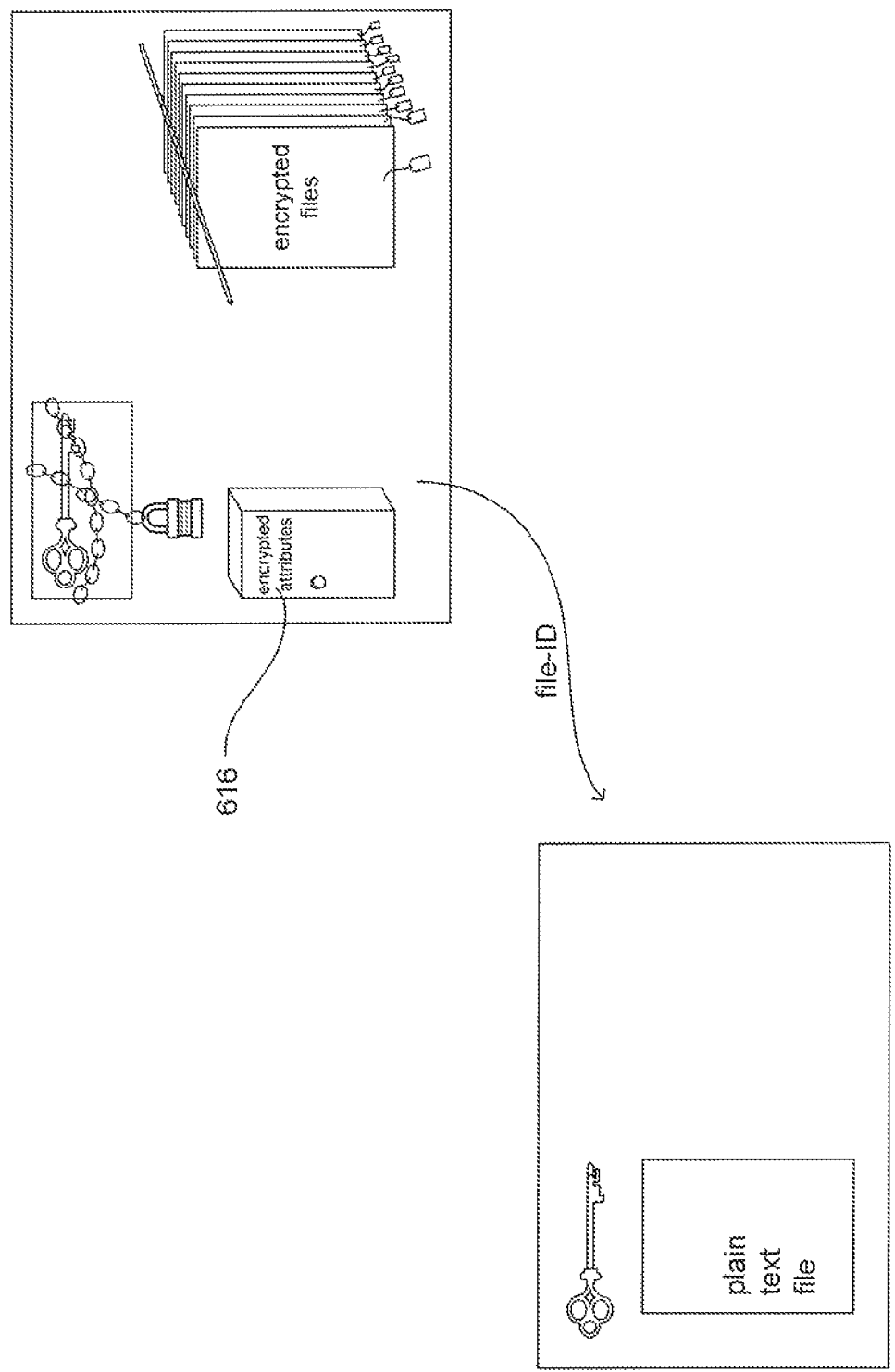

The client carries out two distinct operations in order to store the plain text file 606 within the data vault. First, as shown in FIG. 6B, the client sends the client's device number as well as encrypted file attributes to the data vault, requesting to subsequently store the associated file. Next, as shown in FIG. 6C, the data vault returns a file ID to the client that the data vault associates with the file that the client intends to store. Again, as noted above, the attributes are encrypted by the client before being transmitted to the data vault. Thus, the data vault stores encrypted attributes 616 within the secure database, and the data vault cannot itself access or read the encrypted attributes. As shown in FIG. 6D, having received the file ID for the file to be stored, the client encrypts the plain-text file to generate an encrypted version of the plain-text file 618. The client then sends the encrypted file, along with the client's device number and the file ID previously returned to the client by the data vault, to the data vault, as shown in FIG. 6E, for storage. Finally, as shown in FIG. 6F, the data vault stores the encrypted file 618, associated with the file ID 620, in the file storage facility allocated to the device associated with the client's computer so that the client can subsequently retrieve the encrypted file by supplying the file ID to the data vault. The file ID is associated with the encrypted file attributes and the device identifier for the device within the secure database 614 so that, should the client lose locally stored information identifying the files that have been backed up or archived on the data vault, the client can request encrypted-file-attributes/file-ID pairs associated with the client's device from the data vault for use in subsequently retrieving files from the data vault.

Figure 7A:
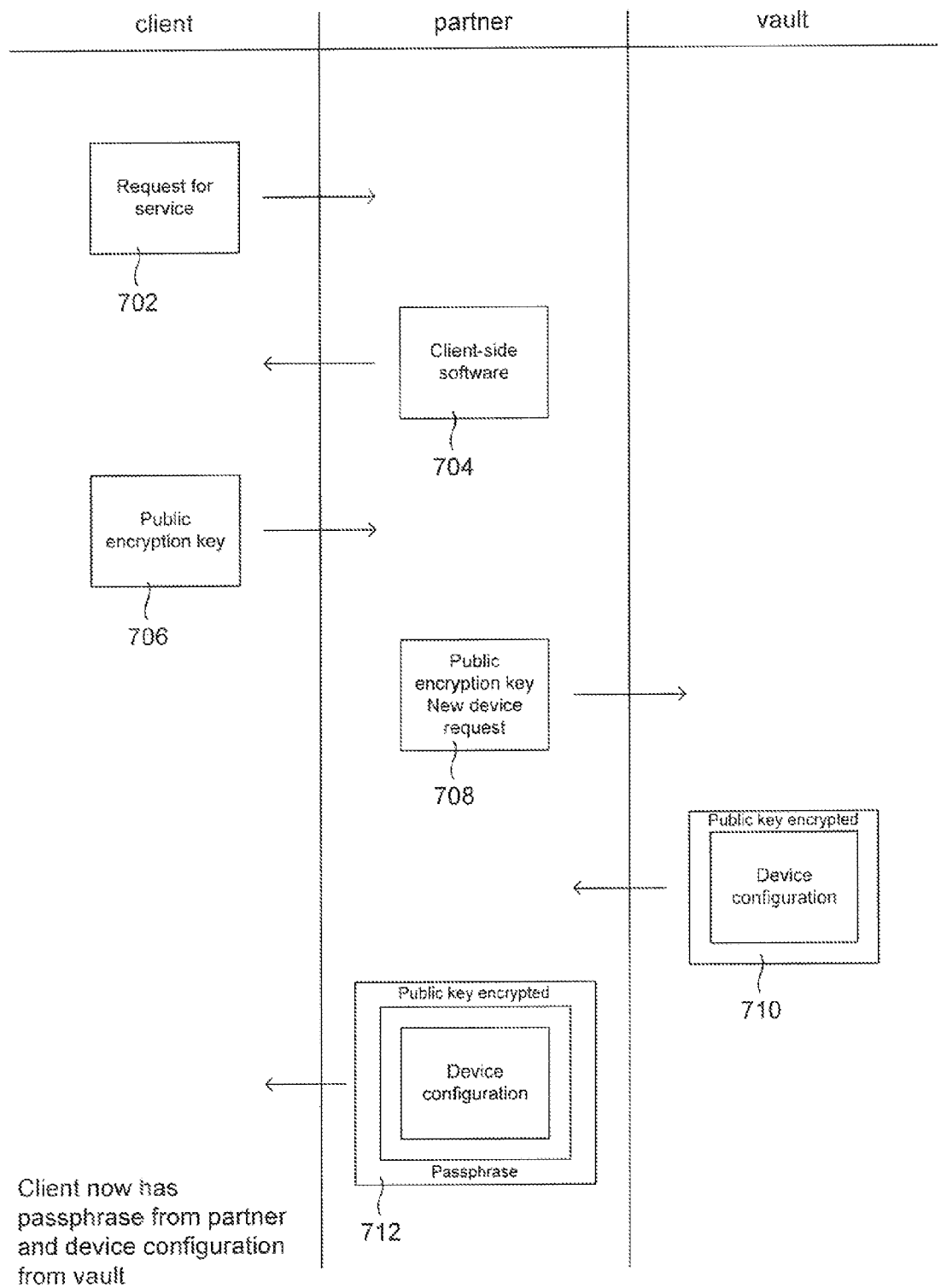
FIGS. 7A-B illustrate interaction between a client and a partner service provider to contract for Web-Services-based, data-backup-and-data-archiving services, as well as to initially configure a client.
Figure 7B:
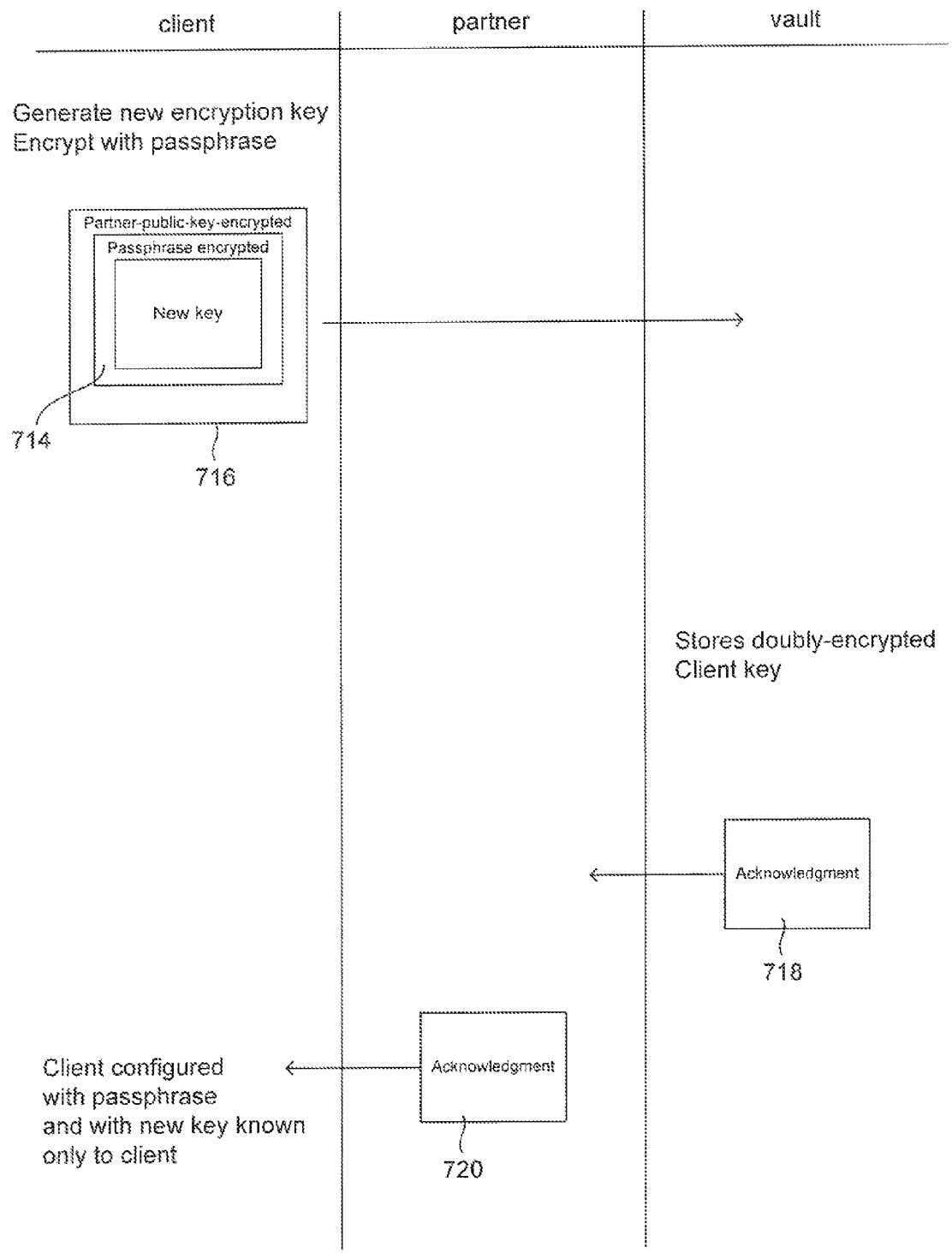

FIGS. 7A-B illustrate interaction between a client and a partner service provider to contract for Web-Services-based, data-backup-and-data-archiving services, as well as to initially configure a client. FIGS. 7A-B illustrate transmission of data between clients, partner service providers, and the data vault according to Web-Services protocols. In FIGS. 7A-B, three columns are shown representing a client, a partner service provider, and the data vault in left-to-right order. As shown in FIG. 7A, a client transmits a request for service 702 to the partner service provider which returns client-side, Web-Services-based, data-backup-and-data-archiving-service application software 704 to the client. Although this transaction is shown occurring via two messages in FIG. 7A, the transaction may involve a relatively lengthy protocol in which a client initially responds to a web page provided by the partner service provider, receives, fills out, and returns various forms and payment information, and carries out any additional transaction-related operations in order to successfully contract for the Web-Services-based, data-backup-and-data-archiving service and to receive the client-side software.

Once the client-side software is installed, a public/private encryption-key pair is generated on the client computer, and the public encryption key 706 of the public/private encryption-key pair is transmitted by the client to the partner service provider as part of a request for new configuration. The partner service provider, in turn, transmits the client's public encryption key along with a new-device request 708 to the data vault. The data vault generates a new device on behalf of both the partner service provider and the client, encrypts device-configuration information using the client's public key within a response message 710, and returns the response message to the partner service provider. The partner service provider includes the encrypted device configuration information within a response message that, in addition, includes in the response message a passphrase generated by the partner service provider on behalf of the client 712, and returns the response message to the client. Upon receiving the response message 712, the client can extract the passphrase supplied by the partner service provider as well as the encrypted device-configuration information, and can decrypt the device-configuration information using the client's private encryption key. In certain embodiments of the present invention, the client can choose or suggest one or more passphrases, rather than rely on passphrase generation by the partner service provider. The device-configuration information is then used by the client-side software to fully configure the client-side application for subsequent data-backup and data-archive operations. Note that the partner service provider cannot intercept, access, or use the device-configuration information returned by the data vault to the client, since the partner service provider does not possess the client's private encryption key. Note also that the passphrase returned by the partner service provider to the client is not available to the data vault. However, in many embodiments of the present invention, the partner service provider agrees to store passphrases generated on behalf of clients, as well as the partner service provider's private encryption key, with an escrow service so that the passphrase or passphrases provided to clients can be recovered by the clients, and the partner service provider's private encryption key can be recovered by the data vault, in the case that the partner service provider discontinues operation or is otherwise unavailable to client computers that have contracted data-backup and data-archive services from the data vault through the partner service provider.

Next, as shown in FIG. 7B, the client generates a new encryption key known only to the client's computer and encrypts the new encryption key using the passphrase provided by the partner service provider to produce a passphrase-encrypted new encryption key 714, and then encrypts the passphrase-encrypted new encryption key using the partner service provider's public encryption key to produce a doubly encrypted new encryption key 716 which is sent by the client to the data vault. The data vault stores the doubly encrypted new client encryption key in the secure database, in association with the device identifier for the device allocated for the client. The stored, doubly encrypted client encryption key is represented as secured encryption key 716 in FIG. 7A. The data vault then sends an acknowledge message 718 back to the client computer. In certain embodiments of the present invention, the acknowledgement may be sent by way of the partner service provider.

The client computer is now fully configured for subsequent data-backup and the data-archive operations. The client computer has a locally stored copy of the client computer's encryption key which the client computer subsequently uses to encrypt all data transmitted to the data vault for backup or archiving. Since only the client knows the client's encryption key, and since the client's encryption key is doubly encrypted within the data vault, neither the data vault nor the partner service provider can access the client's encryption key in order to decrypt information stored by the client within the data vault. An important consequence of this is that, not only is client data secure in the data vault, but also file attributes associated with stored files are secure, so that neither the partner service provider nor the data vault can read or otherwise access stored data attributes. A law firm, for example, may store many files with file names suggestive of the law firm's clients or suggestive of various legal matters or transactions conducted on behalf of the law firm's clients by the law firm. Even if the contents of these files are inaccessible to the data vault or partner service provider, were the file names accessible, much confidential information might be gleaned by the data vault, the partner services provider, or malicious third parties that gain access to the data vault or partner services provider. However, under the Web-Services protocols that represent embodiments of the present invention, file names, file owners, and other file attributes are fully secured by encryption prior to leaving the client computer.

Figure 8:
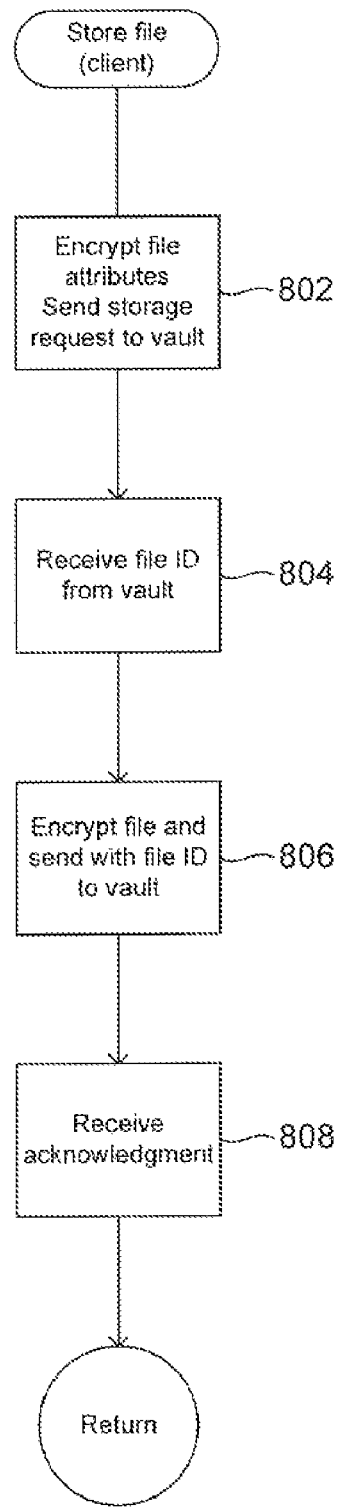
FIG. 8 is a simple flow-control program that illustrates client-side operations invoked to securely store data within the data vault, previously discussed with respect to FIGS. 6A-F.

FIG. 8 is a simple flow-control program that illustrates client-side operations invoked to securely store data within the data vault, previously discussed with respect to FIGS. 6A-F. In step 802, the client encrypts file attributes associated with a file and sends a storage request directly to the data vault. The storage request includes the device ID for the device associated with the client computer received as part of the initial configuration of the client-side software. In step 804, the client receives, in return, a file ID from the data vault. In step 806, the client encrypts the file to be stored and sends the encrypted file, along with the file ID, to the data vault. In step 808, the client receives acknowledgement from the data vault that the file has been successfully stored on one or more remote data-storage facilities.

Figure 9:
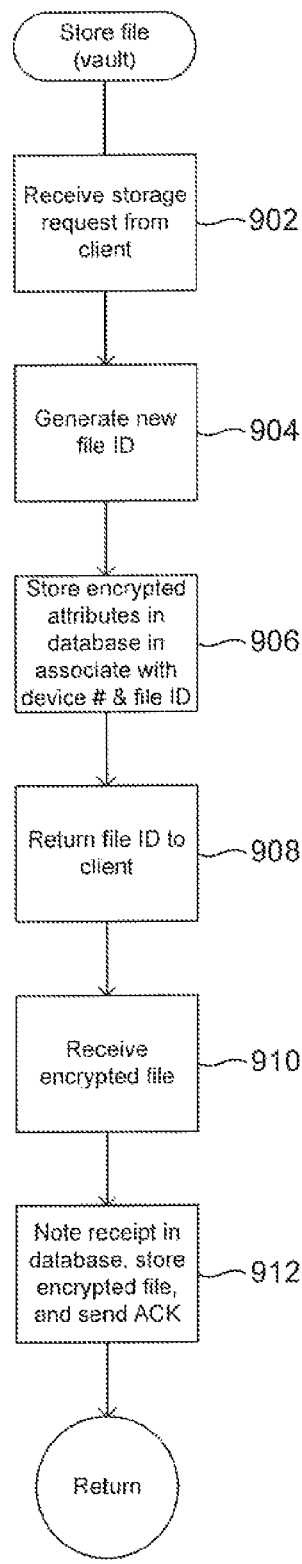
FIG. 9 illustrates operations performed by the data-vault application related to storing a file on behalf of a client.

FIG. 9 illustrates operations performed by the data-vault application related to storing a file on behalf of a client. In step 902, the data vault receives a storage request from the client. After performing authorization and validation steps, the data vault generates a new file ID on behalf of the client. In step 906, the data vault extracts file attributes from the storage request received in step 902 and stores the encrypted file attributes, in association with a newly generated file ID, in the secure database. In step 908, the data vault returns the file ID to the client. In step 910, the data vault receives the encrypted file, along with a file ID, for storage in the data vault, and in step 912, the data vault notes the receipt of the encrypted file in the database entry associated with the file ID, stores the encrypted file on a file server or other data-storage device, and sends an acknowledgement to the client.

File retrieval by clients is relatively simple, involving sending a request for a file to the data vault, accompanied with a file ID and device identifier, and, once the request is properly validated and authorized by the data vault, the data vault locates the specified file on the file server returns the specified file to the client. As discussed above, a client may also request and receive from the data vault encrypted-file-attribute/file-ID pairs, should the client somehow lose local copies of this information. In addition, the client can request and receive the doubly encrypted client encryption key from the data vault, should the client lose the client encryption key. This request may be made by a client through a partner service provider, in which case the partner service provider can decrypt the first level of double encryption on behalf of the client, before forwarding the passphrase encrypted encryption key to the client.

In alternative embodiments of the present invention, the Web-Services-based, data-backup-and-data-archiving services may provide additional services. For example, in one embodiment of the present invention, prior to encryption of a file, the client-side application generates index information for the file that is stored in a local index, to allow the client-side application to search remotely stored files for text strings or other search information. In other words, the locally-stored index includes a word index, or other data-object index, in which words are associated with file IDs. Then, when the file is encrypted, the index information generated for the file may also be encrypted and separately sent to the data vault for storage. If the local index information is somehow lost by the client, the index information can be retrieved, in encrypted form, from the data vault.

A further service provided by various embodiments of the present invention is efficient file update. In various embodiments, the client compares an updated file for storage on the data vault to a previous version of the updated file stored locally on the client, and computes the differences between the two files. Then, the client encrypts only the differences, along with metadata describing the differences, and these encrypted differences and metadata are transmitted to the data vault for storage, rather than transmitting the entire, updated file. The data vault can store a first version of the file, along with a series of updates, and can return both the first, complete version, and subsequent updates, or can return the most recent update and any previous, requested updates to the client when the stored, updated file is subsequently requested by the client. Encryption and transmission of updated differences, rather than entire updated files, is both more computationally efficient as well as more efficient for transmission and storage.

More Detailed Description of Various Embodiments of the Present Invention

Figure 10:
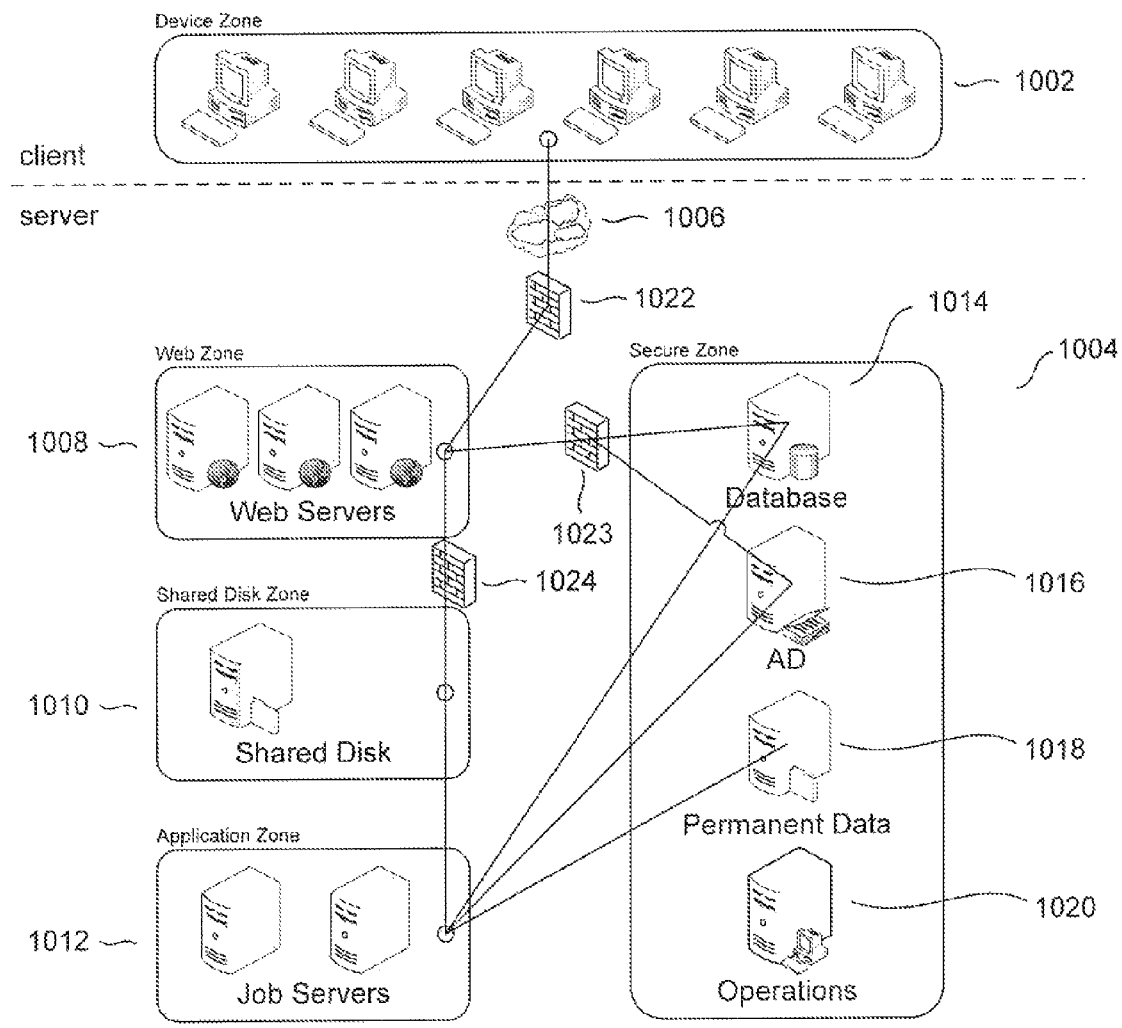
FIG. 10 illustrates, at an overview level, the client-side and server-side portions of a backup, restore, and archiving system that represents one embodiment of the present invention.

In this subsection, a more detailed description of an implemented embodiment of the present invention is provided. FIG. 10 illustrates, at an overview level, the client-side and server-side portions of a backup-restore-and-archiving system that represents one embodiment of the present invention. The client-side portion of the backup-restore-and-archiving system 1002 includes a number of user devices, generally personal computers ("PCs"). In the described embodiment, backup, restore, and archiving services are provided by the server-side portion of the backup-restore-and-archiving system at the granularity of client devices. In other words, backup, restore, and archiving services are provided to a physical, hardware device, such as a personal computer. In alternative embodiments, backup, restore, and archiving services may be provided at a finer level of granularity, such as to particular user partitions of a hardware device.

The client devices communicate with the server-side portion of the backup-restore-and-archiving system 1004 via secure connections, in certain embodiments using secure socket layer ("SSL") connections implemented above the Internet protocol 1006. The server-side portion 1004 of the backup-restore-and-archiving system includes one or more web servers 1008, one or more shared-disk servers 1010, one or more job servers 1012, one or more database servers 1014, one or more active-directory servers 1016, one or more permanent-data-storage devices 1018, and an operations monitor 1020. The one or more web servers 1008 interact directly with client devices 1002, and the web servers are thus isolated from the client devices and other devices within the server-side portion of the backup-restore-and-archiving system 1004 by firewalls 1022-1024.

Figure 11:
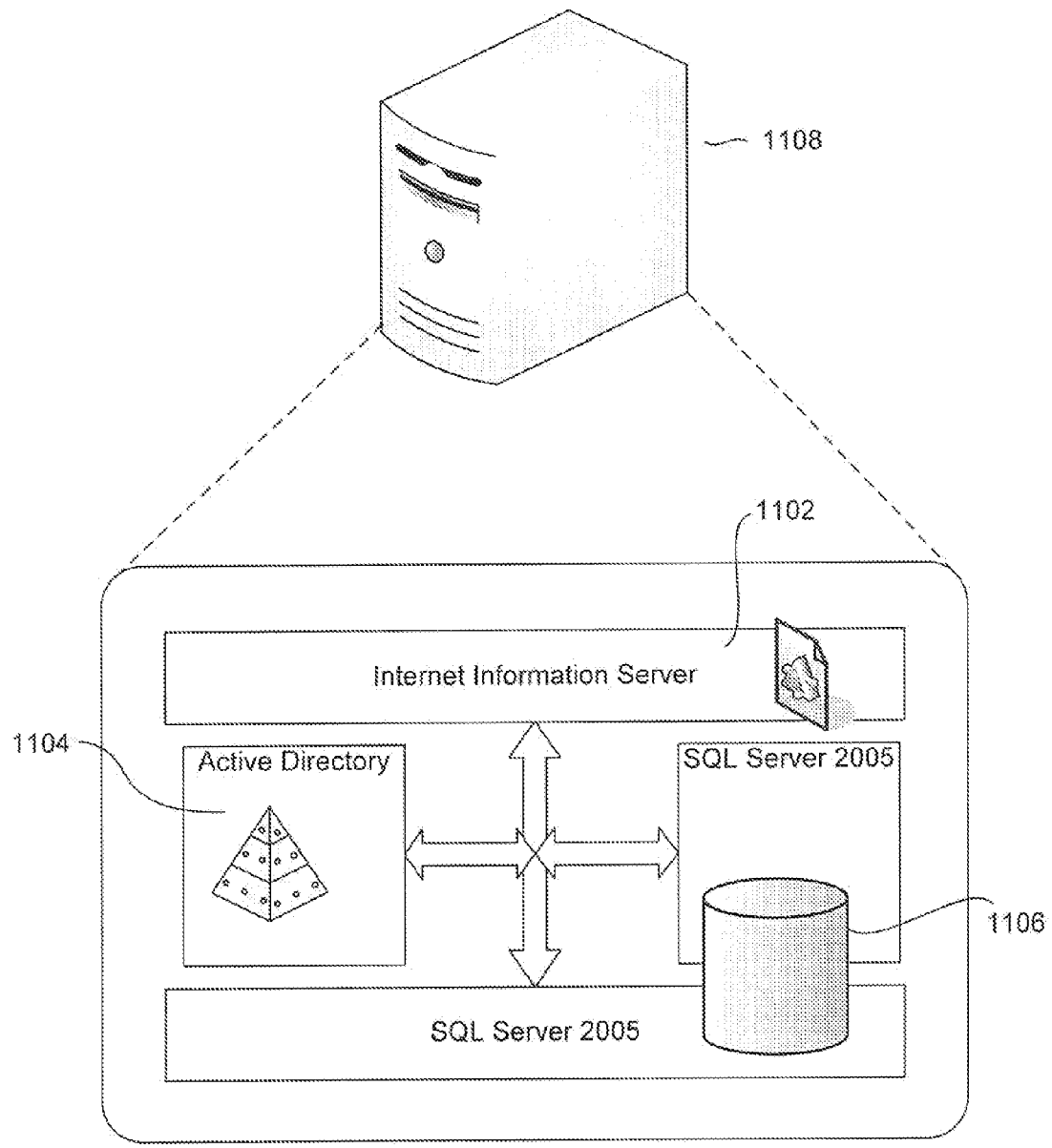
FIG. 11 illustrates, at an overview level, a single-server implementation of the server-side portion of a backup, restore, and archiving system that represents one embodiment of the present invention.
Figure 12:
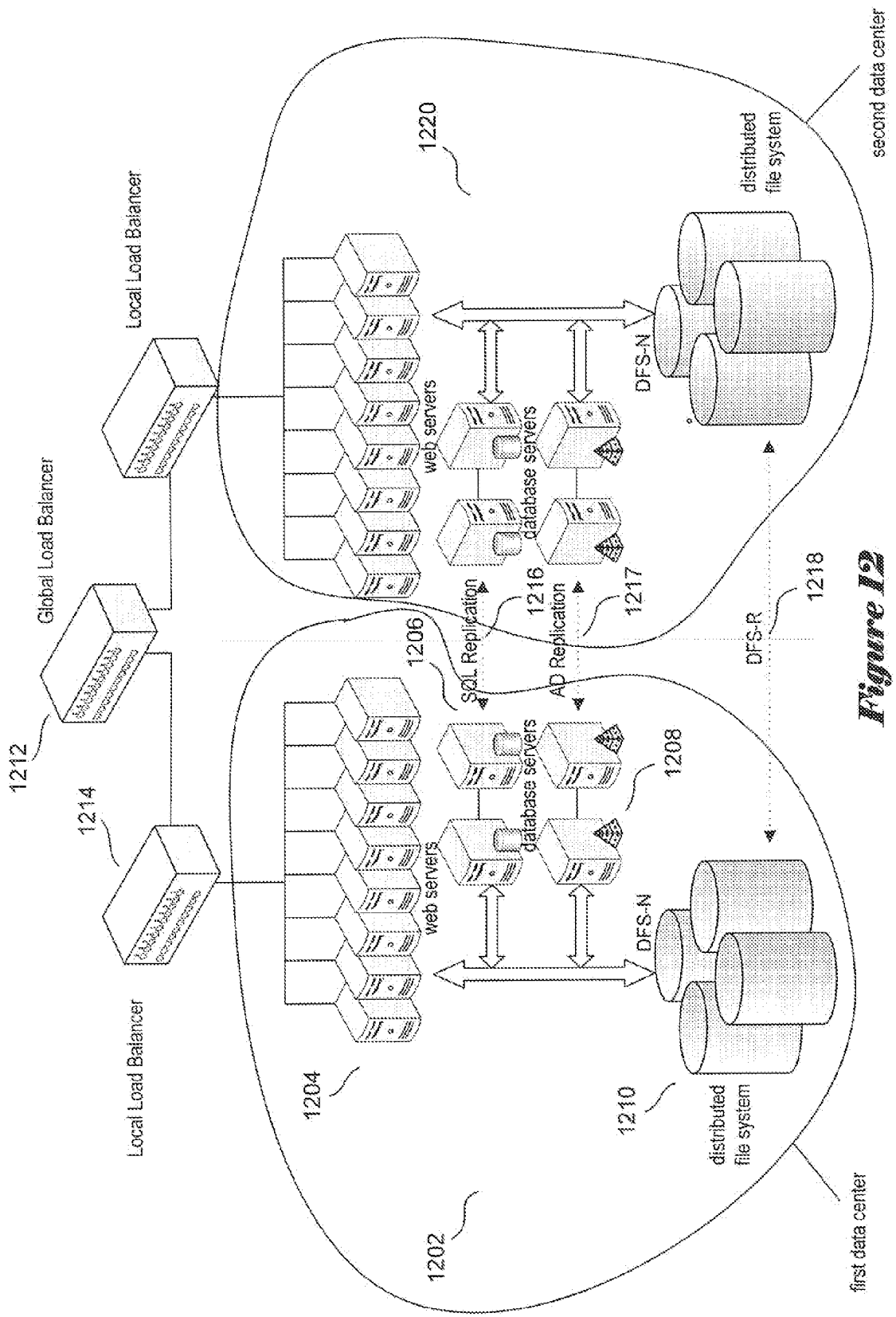
FIG. 12 illustrates a complex, replicated backup, restore, and archiving system that represents an alternative embodiment of the present invention.

The overview of the backup-restore-and-archiving system shown in FIG. 10 illustrates but one of a myriad possible configurations of a backup-restore-and-archiving system according to the present invention. At one extreme, the entire server-side portion of the backup-restore-and-archiving system may be implemented in a single server computer, and, at the other extreme, complex, multi-component server-side portions may be replicated locally and geographically to provide extremely high levels of fault and disaster tolerance and high availability. FIG. 11 illustrates, at an overview level, a single-server implementation of the server-side portion of a backup-restore-and-archiving system that represents one embodiment of the present invention. The single-server implementation includes an Internet-Information Server application 1102, an Active Directory 1104, and an SQL Server 1106 that together provide the functionality of the server-side portion of the backup-restore-and-archiving system within a single-server computer 1108. FIG. 12 illustrates a complex, replicated backup-restore-and-archiving system that represents an alternative embodiment of the present invention. In the multi-component, replicated, backup-restore-and-archiving system shown in FIG. 12, a first data center 1202 containing a bank of web servers 1204, database servers 1206, active-directory servers 1208, and a permanent data storage facility implemented with the distributed-file-system methodology 1210 may be accessed via the Internet from client computers via a global load balancer 1212 and local load balancer 1214. SQL replication 1216, active-directory replication 1217, and distributed-file-service replication 1218 are used to replicate the first data center 1202 at a second data center 1220 that may be geographically dispersed from the first data center. Thus, in the embodiment shown in FIG. 12, two separate, multi-component server-side portions of the backup-restore-and-archiving system coexist to provide fault and disaster tolerance as well as high availability. In still alternative embodiments, the multi-component server-side portion may be replicated threefold, fourfold, or at even higher levels of redundancy. In addition, in the higher end implementations, the permanent data store in each server-side portion may itself be mirrored or redundantly stored by alternative types of redundancy-introducing techniques, including error-code-encoding-based redundancy found in RAID-5 and RAID-6 storage systems.

Figure 13A:
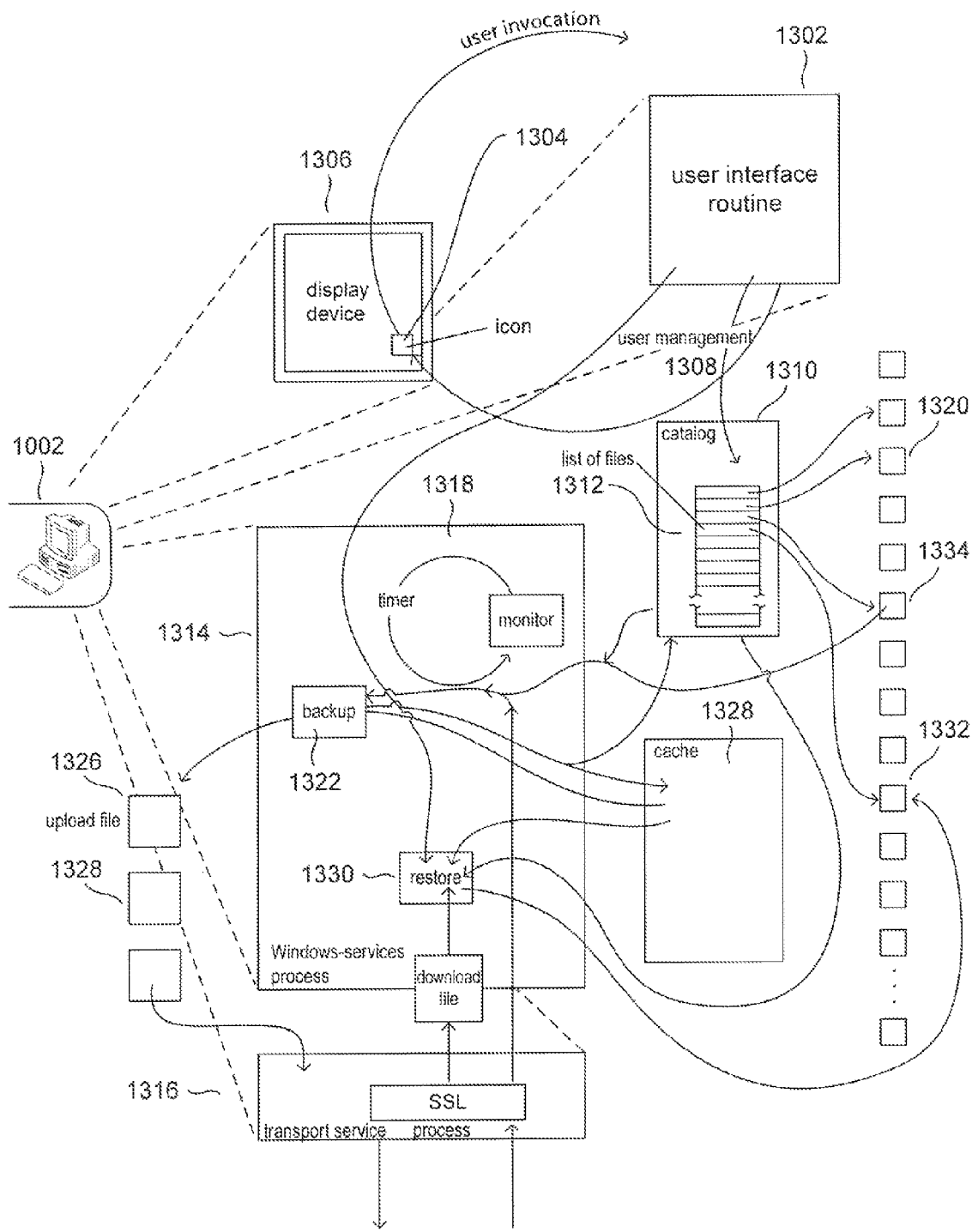
FIGS. 13A-C illustrate basic functionalities within the backup, restore, and archiving system illustrated, at overview level, in FIG. 10.
Figure 13B:
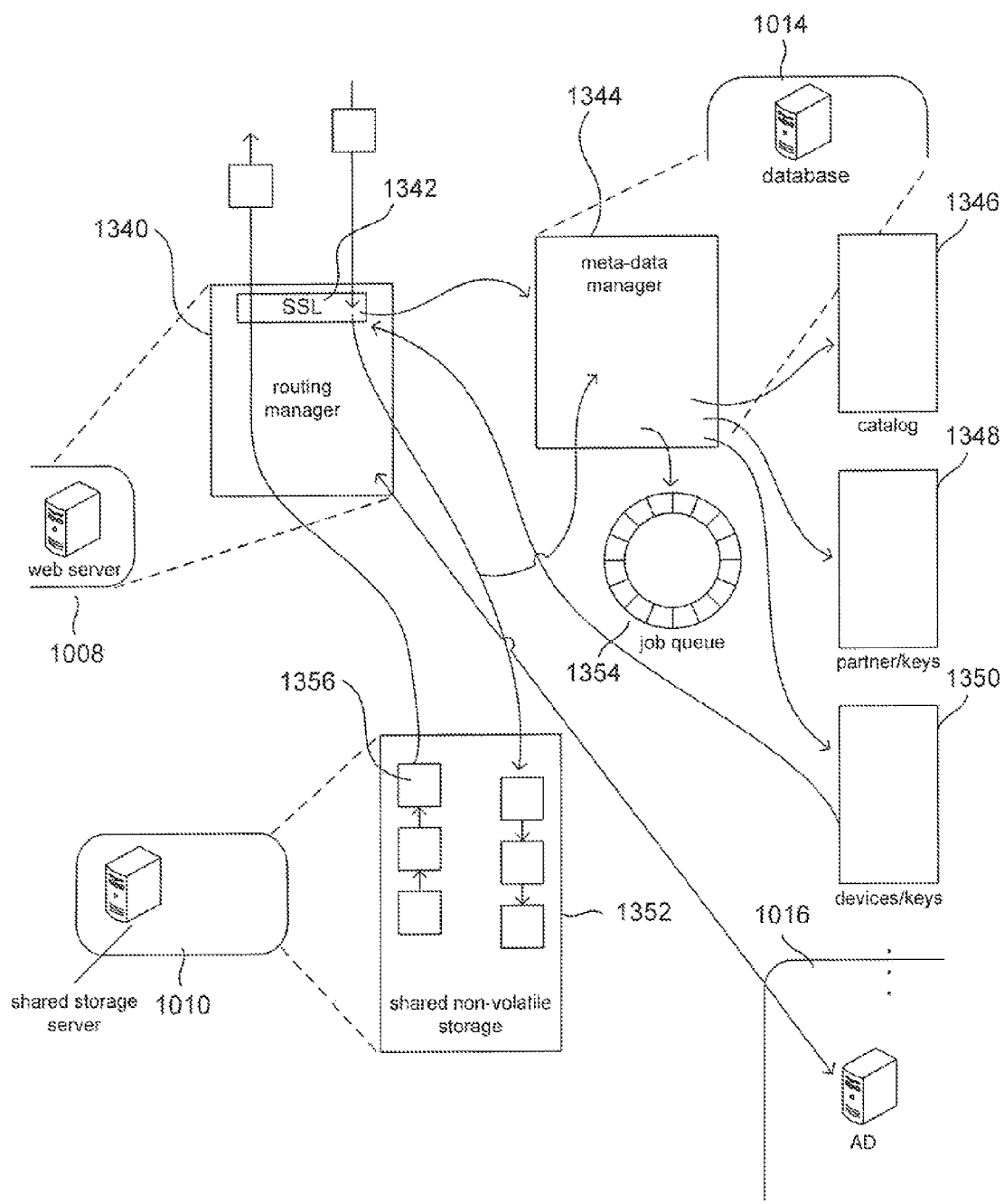
Figure 13C:
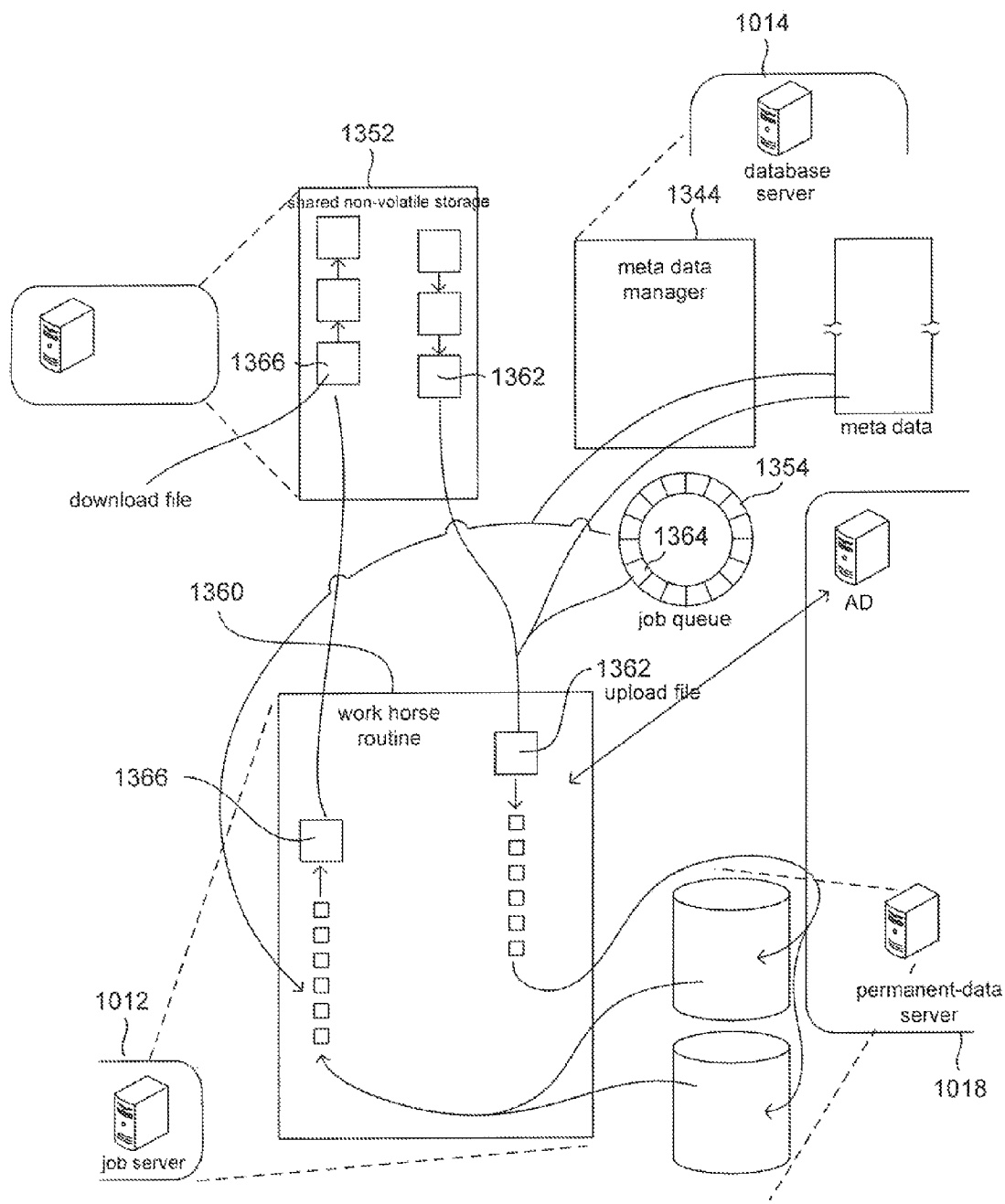

FIGS. 13A-C illustrate basic functionalities within the backup-restore-and-archiving system illustrated, at overview level, in FIG. 10. FIG. 13A illustrates basic functionalities within a client device (1002 in FIG. 10). The client-device portion of the backup-restore-and-archiving system includes three different processes. The first process is implemented as a user-interface routine 1302 that is invoked by a user via any of various routine-invocation methods, including interactive invocation through an icon 1304 displayed on the terminal 1306 of the client device. The user-interface routine provides basic user-management and user-configuration services that allow a user to modify 1308 a locally stored catalog 1310 that, among other things, includes a list 1312 of files and other file-like objects resident within the client device that are to be backed up continuously and automatically by the backup-restore-and-archiving system. The catalog 1310 additionally may include configuration information, such as file-alteration-detection periods for each file, indications of the number of revisions, or instances, of a given file or file-like object to maintain, indications of the level of protection desired by the user for the file or file-like object, and other such parameters.

The user may issue various types of commands through a graphical-user interface displayed on the client-device display monitor 1306 to the user-interface routine 1302. Commands include adding or deleting files and file-like objects from the backup list, commands to restore one or more particular files to a particular, previously backed-up instance, commands to truncate revision histories stored within the backup-restore-and-archiving system, and a variety of additional commands in various alternative embodiments.

Two additional processes 1314 and 1316 run continuously within the client device as Windows services. The first Windows-services process 1314 is the main client-side service process responsible for executing backup and restores operations. The second continuously executing Windows-services process 1316 is a transport service that employs the background intelligent transfer service ("BITS") and secure socket layer ("SSL") for exchanging data with the server-side portion of the backup-restore-and-archiving system, as well as with a backup-restore-and-archiving-system partner. BITS uses spare network bandwidth and processing cycles, as a background process, for exchanging data with remote entities.

The main client-side process 1314 includes a monitoring function 1318 that periodically checks each file or file-like object, such as file 1320, that is continuously backed up by the backup-restore-and-archiving system as specified by data stored in the catalog 1310. The monitoring process 1318 determines, based on comparison current file timestamps with previously recorded timestamps, or other such information, whether the file has been altered since the last periodic monitoring cycle. If the file has been altered, then a backup routine 1322 computes a block difference between the altered file and the previous instance of the file using the file itself 1324 and either locally-stored information or information obtained from the server-side portion of the backup-restore-and-archiving system. The block difference is a set of Δ blocks determined to include those portions of the file that have been altered and that therefore need to be transmitted to the server-side portion of the backup-restore-and-archiving system for permanent storage. The Δ blocks, or a subset of the Δ blocks that are known to not be currently stored by the server-side portion of the backup-restore-and-archiving system, are added to an upload file 1326 as well as to a local cache 1328. The upload file 1326 is queued to a queue of upload files 1328 that are transported, one-by-one, by the transport service process 1316, to the server-side portion of the backup-restore-and-archiving system. When a user requests a restore operation through the user-interface routine 1302, a restore process 1330 within the main client-side process 1314 is invoked to determine those blocks of the file that can be obtained locally, from the local cache 1328 and any existing portion of the file 1332, retrieves all other needed blocks from the server-side portion of the backup-restore-and-archiving system via the transport service process 1316, and uses the retrieved blocks and locally available blocks to assemble a restored version of the file 1332.

The client-side portion of the backup-restore-and-archiving system illustrated in FIG. 13A is but one of many different possible implementations. The backup, restore, catalog, cache, transport, and user-interface functionalities may be combined together into fewer modules and processes, or may, alternatively, be broken up into an even greater number of different functional modules, processes, and services.

FIGS. 13B-C illustrate functional operation of the server-side portion of the backup-restore-and-archiving system (1004 in FIG. 10) that represents one embodiment of the present invention. As shown in FIG. 13B, the one or more web servers 1008 each include a routing-manager functionality 1340 that communicates via an SSL layer 1342 and a communications medium, such as the Internet, with the transport service process (1316 in FIG. 13A) of each of the client devices to which the backup-restore-and-archiving system provides backup, restore, and archiving services. The routing manager 1340 accesses one of the one or more database servers 1014 to match credentials supplied by a client device after the client device opens an SSL connection to the web server 1008, with credentials stored by the server-side-portion active-directory servers 104. The one or more database servers 1014 execute a meta-data manager 1344 that manages, retrieves information from, and stores information into, various database tables or files that represent a global catalog 1346, stored information concerning partners and partner encryption keys 1348, stored information concerning the client devices, credentials associated with client devices, and escrowed file-encryption keys for client devices 1350, and other information When the routing manager verifies a connecting client device, the routing manager can then accept upload files from client devices and queue the upload files in a shared non-volatile storage 1352 supplied by the one or more shared non-volatile-storage servers 1010. In addition, the routing manager transmits information about received upload files to the meta-data manager 1344 executing on one of the one or more database servers 1014 so that the meta-data manager can enter a job request into a job queue 1354 stored within the database and managed by the meta-data managers of the one or more database servers. Similarly, download files, such as download file 1356, may be stored in a download-file queue within the shared non-volatile storage 1352 for transport by the routing manager 1340 to client devices.

While the bulk of data transferred between client devices and the routing manager consists of upload files representing backup data and download files representing encrypted data blocks needed by a client device to restore a particular file or file-like object, the routing manager 1340 can also receive additional commands, such as commands involving updates to catalog data for the client device and other such configuration and management commands. In many cases, these commands are directly transferred by the routing manager to the meta-data manager 1344 executing on a database server, with the meta-data manager either immediately executing the commands and returning a response to the routing manager or queuing the commands in the job queue for later processing. The one or more active-directory servers 1016 are responsible for managing network objects within a distributed network domain. The various component systems of the server-side portion of the backup-restore-and-archiving system, including services and applications executed by the component systems, data resources, and other such objects, are addressable through a global name space created and managed by the one or more active-directory servers.

As shown in FIG. 13C, a workhorse routine 1360 running on each of the one or more job servers 1012 is responsible for carrying out backup and restore operations. The workhorse routine 1360 de-queues successive jobs from the job queue 1354 stored on, and managed by, the collection of database servers 1014, and carries out tasks represented by the de-queued job-queue entries. For backup tasks, the workhorse routine 1360 retrieves the upload file 1362 corresponding to a particular job queue entry 1364 and, using meta data supplied by the meta-data manager 1344, disassembles the upload file into a series of file signatures and encrypted data blocks, and stores the file signatures via the meta-data manager 1344 in the database 1014 and stores encrypted data blocks associated with the file signature in the permanent database provided by one or more permanent-data servers 1018. Similarly, the workhorse routine 1360 retrieves needed encrypted data blocks, stored file signatures, and other information from the permanent data store 1018 and database 1014 upon de-queuing a restore job from the job queue 1354, assembles the information into a download file 1366, and queues the download file into a queue of download files within the shared non-volatile storage 1352 for eventual transfer by the routing manager 1340 to a client device.

Thus, returning to FIG. 10, the backup-restore-and-archiving system that represents one embodiment of the present invention includes a potentially very large number of client devices 1002 that are provided backup, restore, and archiving services by the server-side portion 1004 of the backup-restore-and-archiving system. The server-side portion of the backup-restore-and-archiving system may be implemented within a single server computer, in a single data center comprising multiple, specialized servers and computer systems, as shown in FIG. 10, or may be implemented as multiple, replicated, multi-component data centers. The server-side portion of the backup-restore-and-archiving system includes a web interface to client devices that is responsible for receiving requests from client devices and routing those requests to appropriate components of the server side of the backup-restore-and-archiving system for execution, and that routes responses and data from the server-side portion of the backup-restore-and-archiving system back to client devices. The server-side portion of the backup-restore-and-archiving system includes a shared, non-volatile storage space 1010 used for temporarily storing and communicating upload files to job servers 1012 and download files from job servers 1012 to the web interface 1008. A database portion of the server side of the backup-restore-and-archiving system 1014 stores metadata needed to track the state of client devices, partners, and current tasks needed to be executed by the backup-restore-and-archiving system, while the permanent data store portion 1018 of the server side of the backup-restore-and-archiving system stores encrypted data blocks that may be needed by client devices to restore files and file-like objects.

Figure 14A:
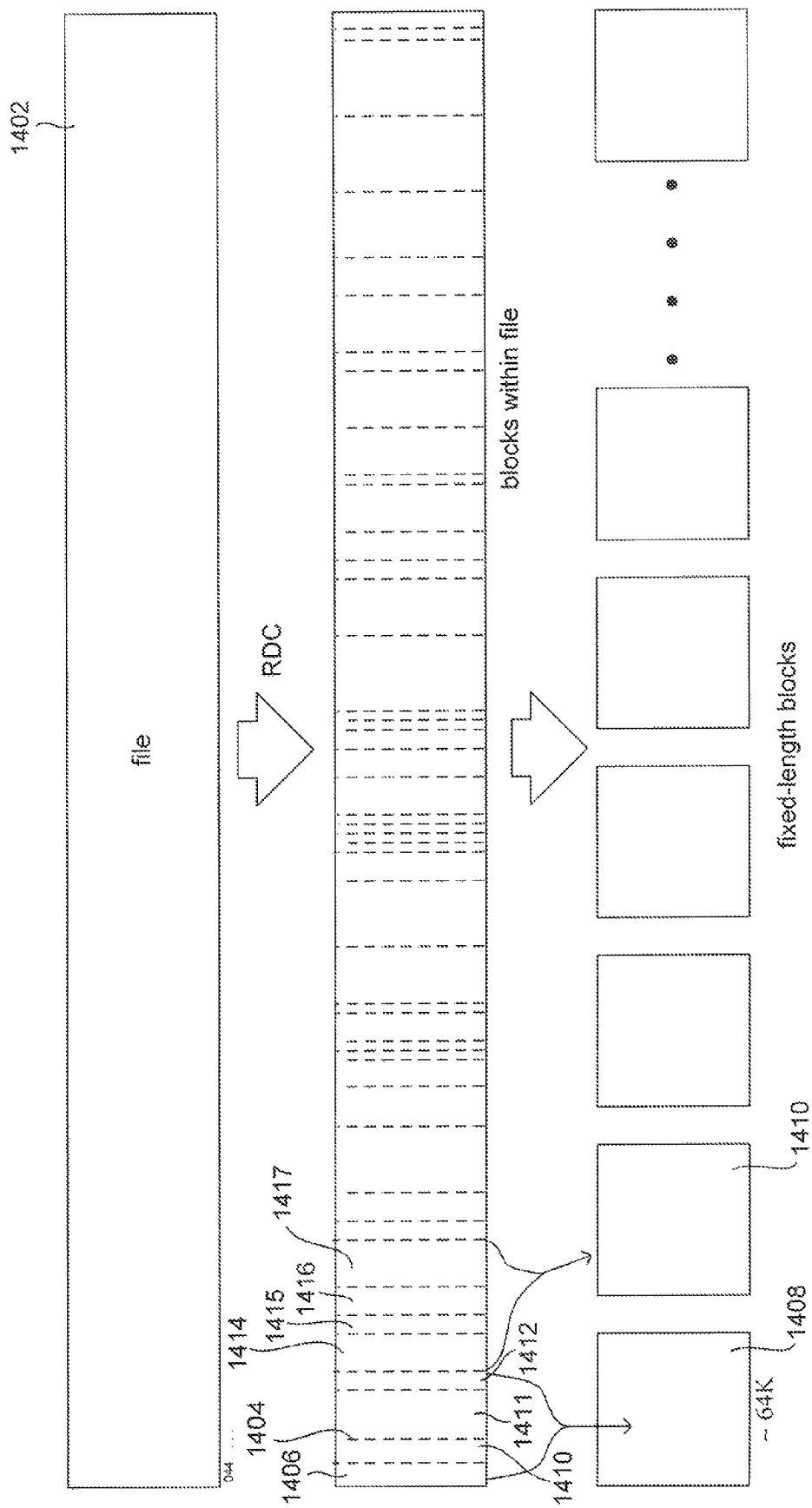
FIGS. 14A-D illustrate processing, by the main service process (1314 in FIG. 13A) of files and file-like objects to generate corresponding file signatures and encrypted data blocks.

FIGS. 14A-D illustrate processing, by the main service process (1314 in FIG. 13A) of files and file-like objects to generate corresponding file signatures and encrypted data blocks. As shown in FIG. 14A, a file or file-like object 1402 can be viewed as an ordered sequence of bytes, words, long words, or other primitive data units. In a first step carried out by the main service process on a client device, a file or file-like object resident within the client device 1402 is logically partitioned into natural blocks. Natural block boundaries are indicated in FIG. 14A by dashed, vertical lines, such as dashed vertical line 1404. The natural blocks have varying lengths, and natural block boundaries correspond to boundaries within the file that separate portions of the file that may be relatively independent from one another with respect to incremental alterations of the file over time. In other words, as a file is altered, over time, by edit operations and other file operations, multiple intra-block changes should occur at greater frequency than multiple inter-block changes, so that sets of relatively contemporaneous changes are localized within natural blocks. The varying-length blocking method, however, represents a best estimate of natural blocks within a file or file-like object, and is not guaranteed to exactly partition the file into independent blocks with respect to file alterations.

In a next step, the generally relatively small natural blocks are sequentially collected together and formed into successive, approximately fixed-length blocks such as fixed-length block 1408. Approximately fixed-length block 1408, for example, contains the first four natural blocks 1406 and 1410-1412 identified in the first step. The next set of natural blocks 1414-1417 are coalesced into a next fixed-length block 1410. Thus, as a result of the first two steps of the file-processing method, a file or file-like object is partitioned into a set of sequentially ordered, approximately fixed-length blocks that are estimated to be reasonably independent from one another with respect to incremental changes. The approximately fixed-length blocks may also slightly vary in length, due to disparities in the sum of the lengths of the natural blocks coalesced in each approximately fixed-length block. In one embodiment of the present invention, the approximately fixed-length blocks have lengths close to 64K bytes.

Figure 14B:
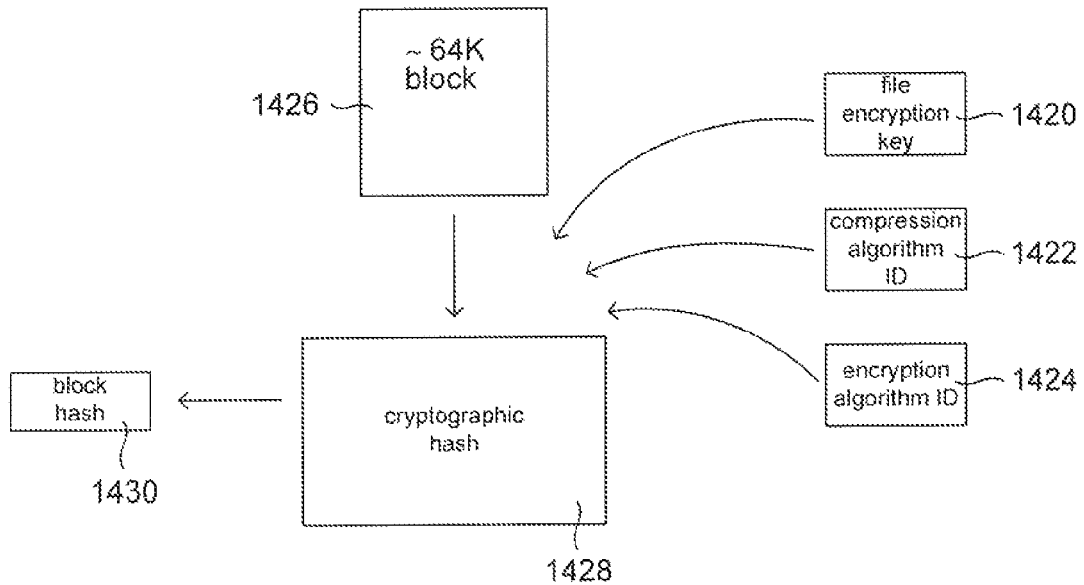

As shown in FIG. 14B, a block hash is computed for each approximately fixed-length block. In one embodiment of the present invention, the client-device file encryption key 1420, a compression-algorithm identifier 1422, and an encryption algorithm identifier 1424 are combined with the data within an approximately fixed-length block 1426 and processed by a cryptographic hash function, such as the MD5 hash function 1428, to produce a block hash 1430. Inclusion of the file encryption key, compression algorithm ID, and encryption algorithm ID ensures that, should the file encryption key, compression algorithm, or encryption algorithm be changed by a client, blocks encrypted and compressed by new encryption keys and/or compression algorithms can be easily distinguished from blocks encrypted and/or compressed by previously used encryption keys, encryption algorithms, and/or compression algorithms. Furthermore, inclusion of the file encryption key can blunt certain types of security attacks directed to the server-side portion of the backup-restore-and-archiving system. The block hash 1430 can be thought of as a numerical summary, or digest, of the original approximately fixed-length block 1426. In general, the block hash has a fixed length of, for example, 256 bytes, 512 bytes, 1024 bytes, or another power of 2 bytes. Use of the cryptographic hash function ensures that the chance that two different approximately fixed-length blocks generated by any client device from any file or file-like object residing on the client device have the same block hash is infinitesimally small. In other words, the block hash is, to an extremely high probability, guaranteed to be a unique identifier of the approximately fixed-length block throughout the backup-restore-and-archiving system.

Figure 14C:
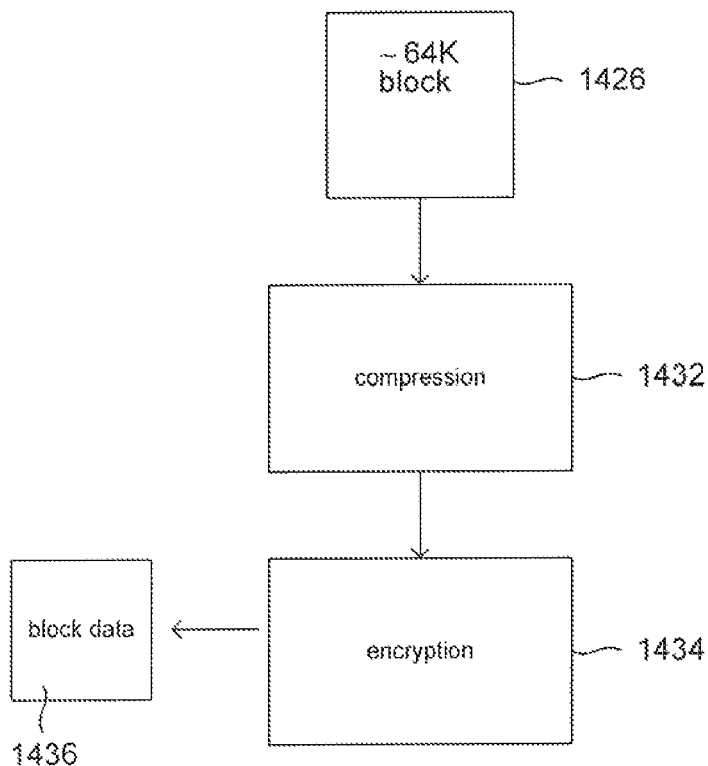

As shown in FIG. 14C, each approximately fixed-length block, following computation of the block hash corresponding to the block, is compressed by a compression algorithm 1432 and then encrypted by an encryption algorithm 1434 using the client's file-encryption key. These steps produce a generally smaller, encrypted data block 1436 corresponding to the original approximately fixed-length data block 1426 identified by the previously computed block hash 1430.

Figure 14D:
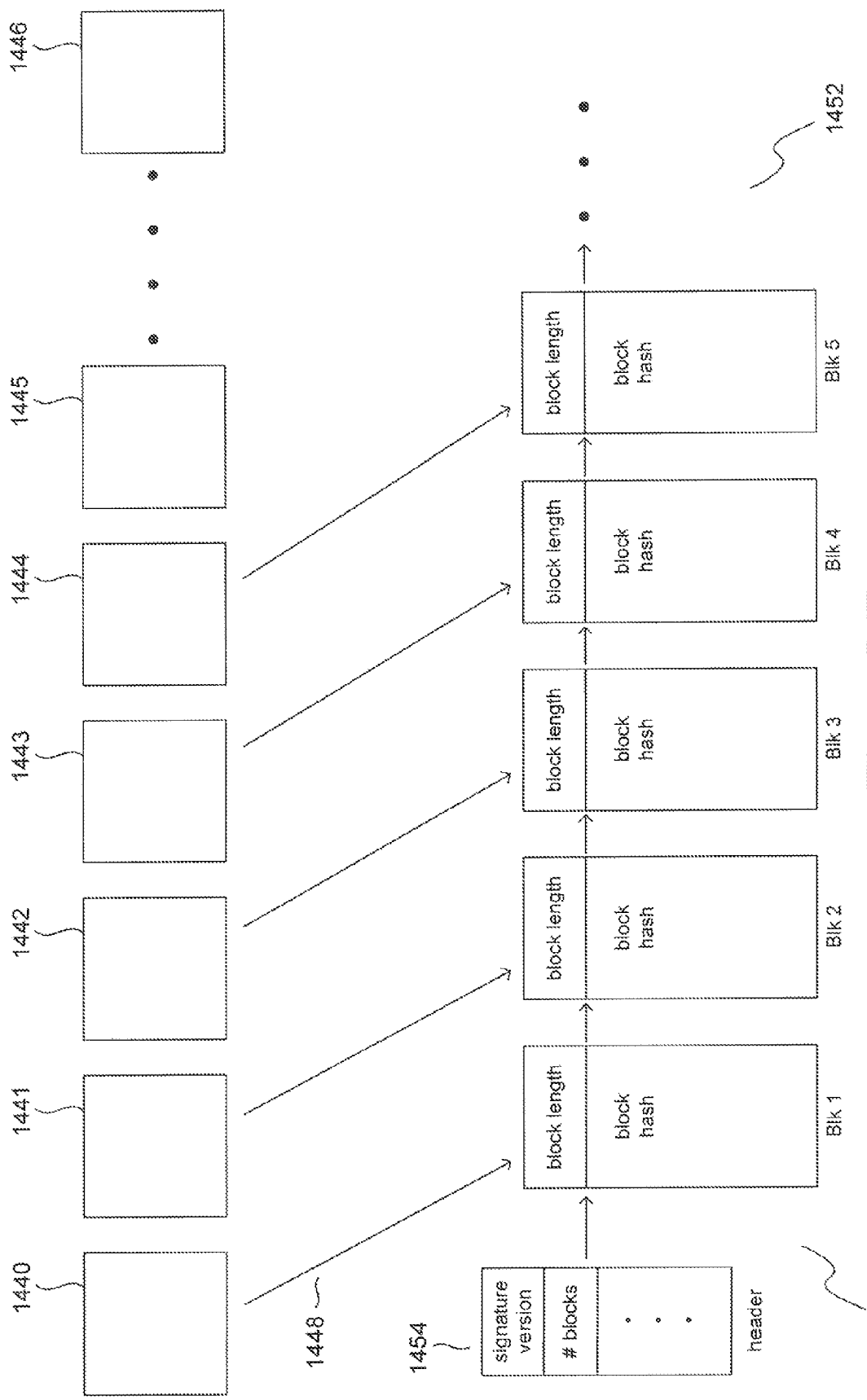

FIG. 14D illustrates computation of a file signature by the main service process of a client device. As discussed above with reference to FIGS. 14A-C, a file or file-like object is first partitioned into a sequence of approximately fixed-length blocks 1440-1446. The steps shown in FIG. 14B are carried out for each approximately fixed-length block, represented by arrows, such as arrow 1448 in FIG. 14D, generate a block hash for each approximately fixed-length block. The block hash together with the length of the approximately fixed-length block comprise a block descriptor, such as the block descriptor 1450 corresponding to the first approximately fixed-length block 1440. An ordered sequence of block descriptors is constructed for the corresponding approximately fixed-length blocks of the file or file object, and a header is appended to the ordered sequence of block descriptors to form a file signature 1452. The header 1454 may include a signature version number, so that the contents and/or format of file signatures can be changed over time, with each file signature self-describing with respect to version as a result of the version identifier included in the header 1454. In addition, the header may include the number of block descriptors within the signature, and additional information. A file signature can be represented by a sequence or stream of bytes encoding the header and block descriptors, or may be encoded in a more complex data structure.

Thus, from the standpoint of the backup-restore-and-archiving system, a particular instance of a file or file-like object stored within a client device that is continuously monitored and backed up by the backup-restore-and-archiving system is considered to be a file-signature/data-block-sequence pair. A file or file-like object can be fully reconstructed, and is fully specified by, the file-signature and the approximately fixed-length blocks containing the file data. Within the client, the ordered sequence of approximately fixed-length blocks is available if clear-text form, but any approximately fixed-length blocks transmitted from the client to the server-side portion of the backup-restore-and-archiving system are encrypted, so no external entity can access the data contained in them.

Figure 15A:
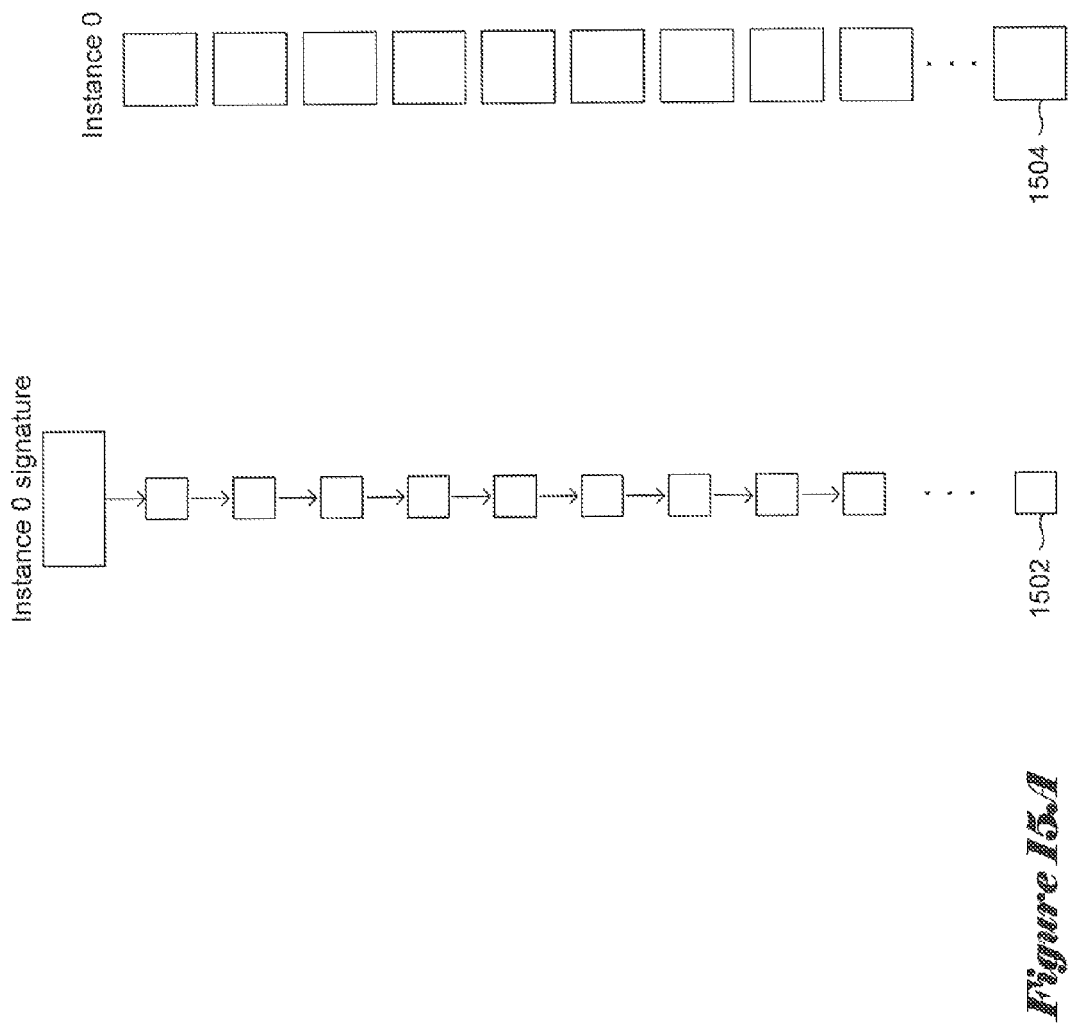

FIGS. 15A-E illustrate file instancing according to embodiments of the present invention. FIG. 15A shows a first, base-level instance of a file. As discussed above, a file or file-like object is processed by the main service process on a client device to generate a signature 1502 and a sequence of approximately fixed-length blocks 1504 that are compressed and encrypted for transmission to, and storage within, the server-side portion of the backup-restore-and-archiving system. Thus, the file-signature/approximately-fixed-length-block-sequence pair fully specifies the contents of the file or file-like object from which the file signature and approximately fixed-length blocks are generated. Initially, a file is identified by a client-device user for continuous monitoring and back-up of changes to the file over time. Each time changes to the file are detected, and the file is backed up, a new instance, or version, of the file is generated from the standpoint of the backup-restore-and-archiving system. When a file is initially designated for continuous backup, a file-signature/encrypted-approximately-fixed-length-block-sequence pair is generated, as shown in FIG. 15A, and transmitted to the server-side portion of the backup-restore-and-archiving system to represent the base-level instance of the file.

Figure 15B:
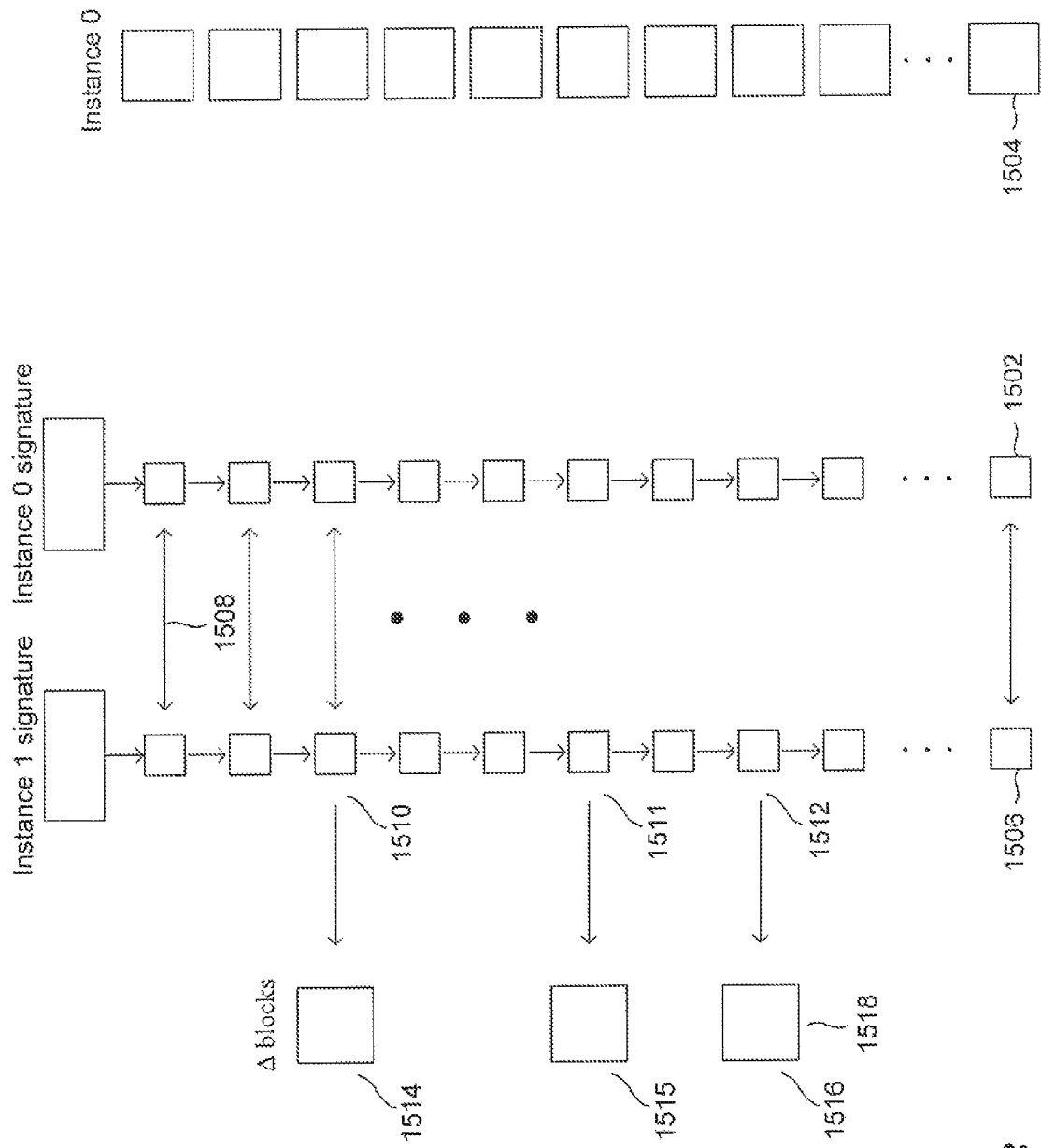

FIG. 15B illustrates a first backup of the file described by the file-signature/encrypted-approximately-fixed-length-block-sequence pair shown in FIG. 15A. When the file is detected to have been altered or edited, a new file signature 1506 is generated from the current contents of the file. The new file signature is block aligned with the previous file signature 1502, and corresponding blocks are compared, as illustrated by horizontal double-headed arrows, such as arrow 1508 in FIG. 15B. When the block hashes computed for the corresponding approximately fixed-length block differ, then the corresponding approximately fixed-length block has been altered with respect to the original file. In FIG. 15B, approximately fixed-length blocks represented by block descriptors 1510-1512 are determined, by comparison of the corresponding block descriptors in the first file signature 1502 and new file signature 1506, to have been altered. The approximately fixed-length blocks associated with these file descriptors 1514-1516 together comprise the list of modified blocks, or Δ blocks. The file-signature comparison discussed with reference to FIG. 15B is an intelligent comparison which allows for new blocks to be inserted within the original block sequence, original blocks to be deleted, and other such large-scale modifications of files to occur without breaking the correspondence between blocks in the first instance of the file with corresponding blocks in the modified file. In other words, two file signatures can be placed in correspondence, and both insertions and deletions detected so that block descriptors following a deletion and/or addition in one file signature remain in correspondence with block descriptors in the other signature, much like DNA sequences corresponding to gene loci can be aligned with one another despite insertion and deletion of subsequences.

Figure 15C:
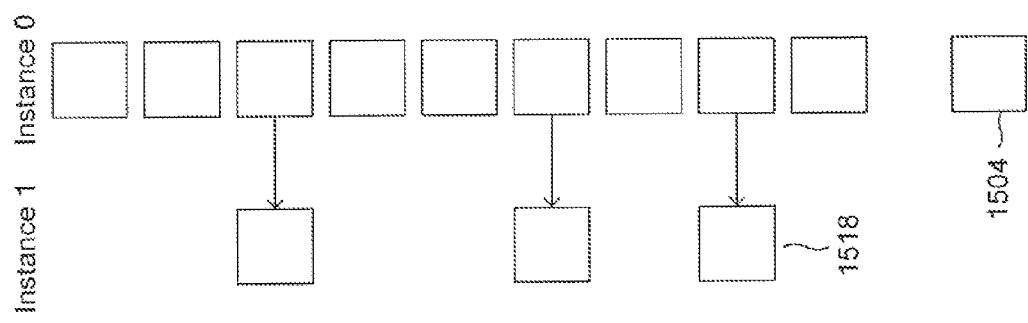

Thus, as shown in FIG. 15B, following detection of modification or alternation of the file, a new file signature and a set of Δ blocks can be generated so that the combination of the original file signature 1502 and ordered sequence of approximately fixed-length blocks 1504, along with the newly generated file signature 1506 and Δ blocks 1514-1516 together fully specify both the original file and the subsequent, altered or modified version of the original file. As shown in FIG. 15C, the data content of both the original file and the modified version of the original file, considered to be instance 0 and instance 1 of the file, respectively, comprises the original ordered sequence of approximately fixed-length data blocks 1504 as well as the generally smaller set of Δ blocks 1518. Provided that the original blocks and the Δ blocks are stored within the permanent store of the server-side portion of the backup-restore-and-archiving system, and provided that both the original file signature 1502 and the more recently generated, second file signature 1506 are stored in the database portion of the server-side portion of the backup-restore-and-archiving system, either the original file or the subsequently modified file can be fully restored from the stored data blocks, Δ blocks, and file signatures.

Figure 15D:
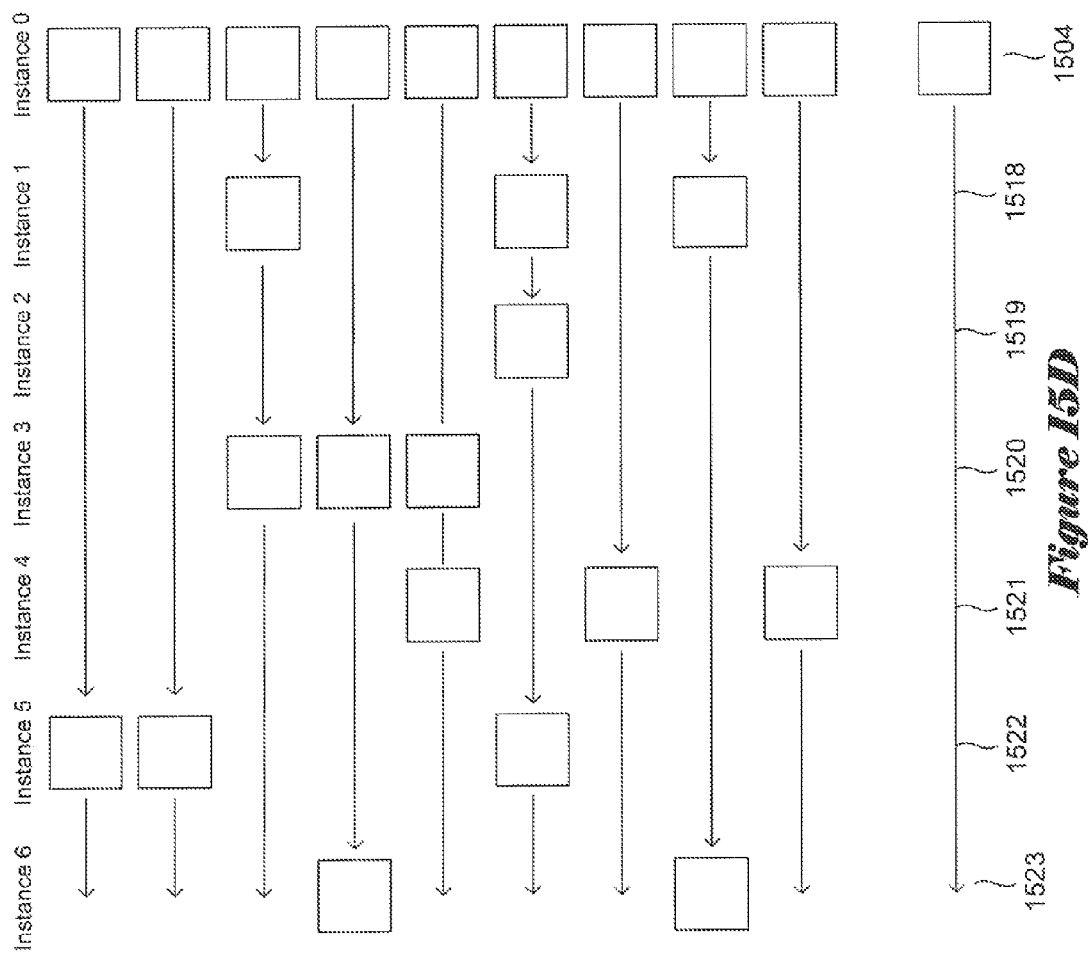
Figure 15C:
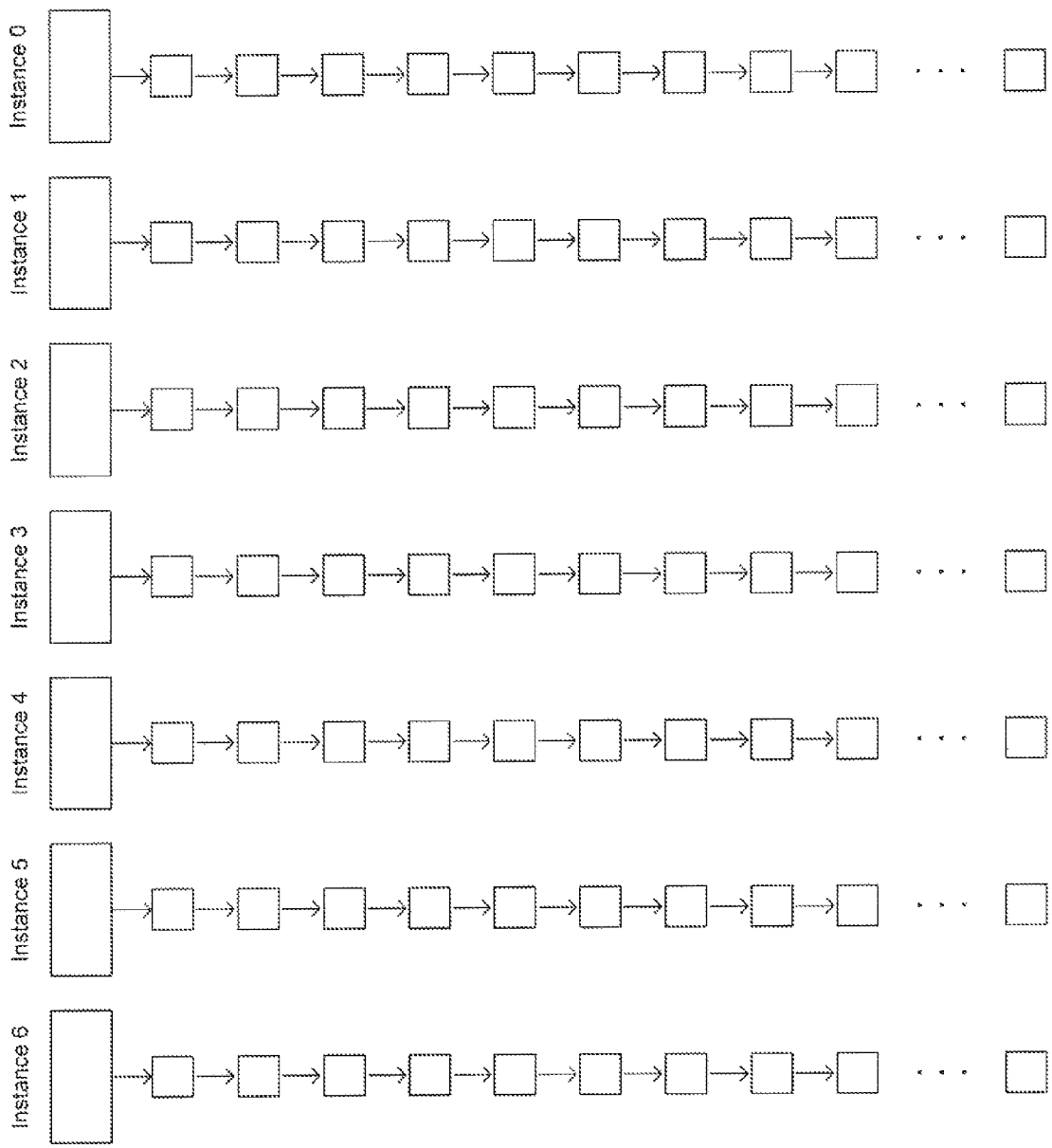

As shown in FIG. 15D, with each detected modification of the file, determination of Δ blocks, and storage of Δ blocks within the permanent data store, a new instance of the file is generated. In FIG. 15D, six instances of the file have been generated subsequent to backup of the original file. As discussed, the original file is represented by a column of approximately fixed-length blocks 1504, and each subsequent instance is represented by a column of Δ blocks 1518 and 1523. By storing the original file blocks and only the Δ blocks for each instance, a much smaller number of data blocks need to be stored to represent all of the instances of the file than by storing each instance in its entirety. Moreover, as discussed in greater detail below, because data blocks are stored in the permanent store of the server-side portion of the backup-restore-and-archiving system and indexed only by their respective block hashes, a data block that occurs in multiple files of a client device, or in multiple files distributed across multiple client devices, needs to be stored only once in the permanent store. In other words, only a single instance of any particular data block identified by a particular block-hash value needs be stored in the permanent store, regardless of how many times that particular data block occurs in the various files distributed across various client devices that are being continuously monitored and backed up by the backup-restore-and-archiving system. Along with the original file blocks and Δ blocks that are stored in the permanent store to represent all of the different instances of a file, as shown in FIG. 15D, the full set of file signatures generated for each successive instance of the file is maintained within the database portion of the server-side portion of the backup-restore-and-archiving system. In certain embodiments of the present invention, the file signatures may be stored using a differential-storage technique, just as data blocks are stored using differential storage. In other words, the first file signature may be stored in its entirety, and only differences between the file signatures computed for the next instance and the previously stored instance are stored.

FIG. 16 summarizes the information stored on the server-side portion and client-side portion of the backup-restore-and-archiving system that represents one embodiment of the present invention for each file on the client device that is monitored and continuously backed up by the backup-restore-and-archiving system. As shown in FIG. 16, on the server-side portion of the backup-restore-and-archiving system, the file-signature history for the file 1602 is stored as logically depicted in FIG. 1SE, within the database portion of the server-side portion of the backup-restore-and-archiving system. In addition, compressed and encrypted versions of the data-block history of the file, as illustrated in FIG. 15D, 1604 is stored within the permanent store portion of the server-side portion of the backup-restore-and-archiving system. On the client side, it is preferred that the most recently generated file signature for the file 1606 be stored for each file that is monitored and backed up. By keeping a local copy of the last, most recently generated file signature, the difference between a subsequent instance of the file and the most recently stored instance of the file can be computed entirely from the stored file signature 1606 and a new file signature generated for the new instance of the file, without needing to access information stored on the server-side portion of the backup-restore-and-archiving system. In addition, as client-side data-storage resources allow, a signature cache 1608 and data-block cache 1610 can be maintained on the client device to facilitate restore operations. In the best case, a file can be restored to a previous version, or instance, using only locally stored file signatures and data blocks, without the need to retrieve file signatures and data blocks from the server-side portion of the backup-restore-and-archiving system. However, should the signature cache 1608, data block cache 1610, and even the most recently generated file signature 1606 be deleted from the client device, any previously generated and backed up instance of the file can be restored on the client device by first accessing needed file signatures and data blocks from the server-side portion of the backup-restore-and-archiving system.

Figure 17A:
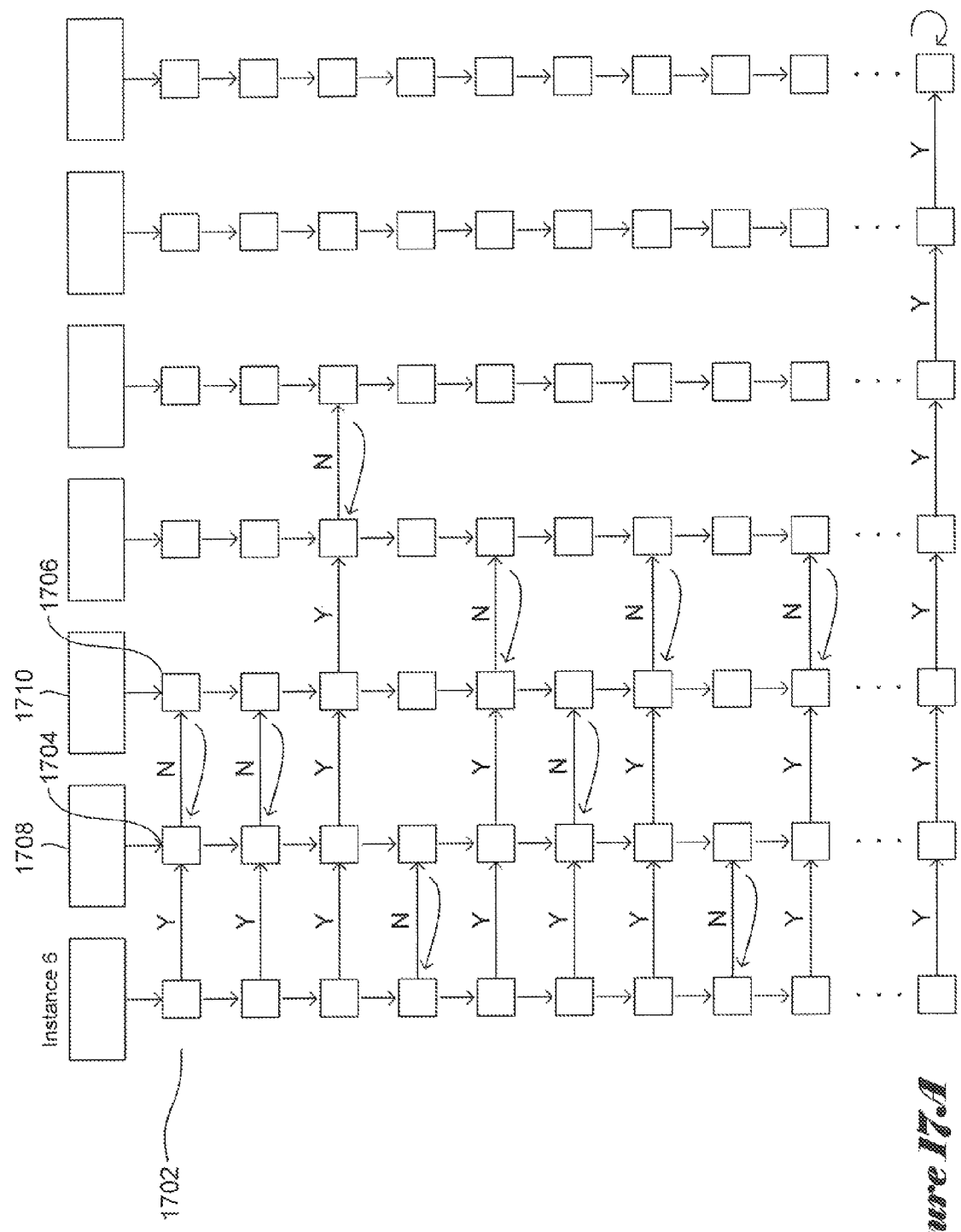
Figure 10A:
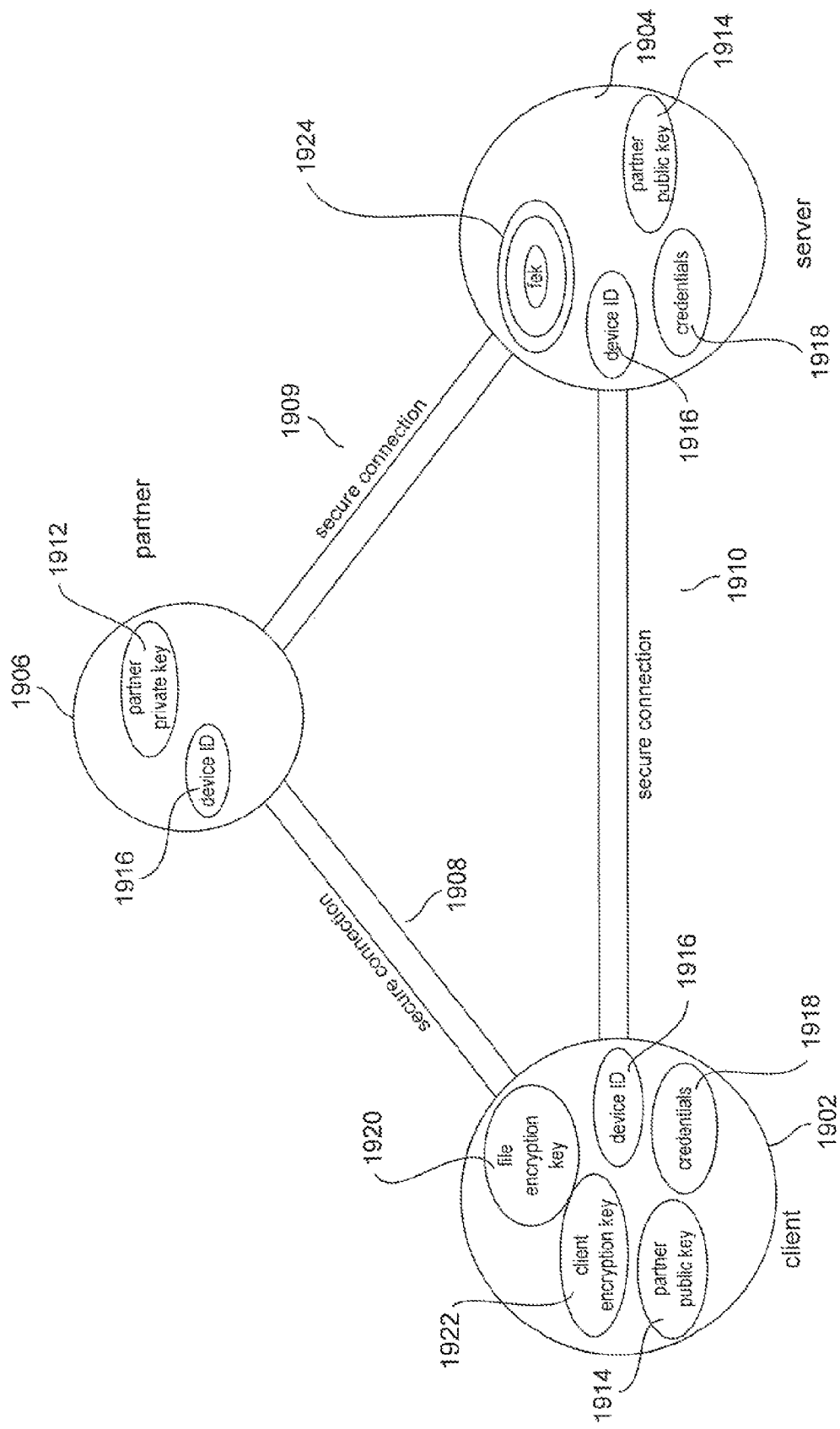

FIGS. 17A-B illustrate the logical operation for constructing a particular instance of a file from the file-signature history and data-block history stored for the file according to embodiments of the present invention. FIG. 17A shows the file-signature history for a file as previously discussed with reference to FIG. 15E. In order to construct a full, most recent instance of the file, corresponding block descriptors for each block within the file-signature history need to be traversed until a difference between block hashes in adjoining file signatures is detected. For example, with respect to the first data block in the sixth instance of the file, represented by block descriptor 1702, the block descriptors corresponding to that block within the file-signature history are traversed, from most recent to least recent, in order to detect two adjacent file signatures in which the block hash for the block differs. As shown in FIG. 17A, comparison of the block hashes stored in corresponding block descriptors 1704 and 1706 of the file signatures corresponding to the fifth instance 1708 and fourth instance 1710 of the file are detected to differ, indicating that the difference block computed for the fifth instance of the file is the version of the data block to be included within the sixth instance of the file. FIG. 17B shows the data-block history for the file, as discussed above with reference to FIG. 15D. As can be seen in FIG. 17B, the most recently stored data block corresponding to the first data block of the file 1712 is the difference block detected and stored during backup of the fifth instance of the file. As another example, all of the block hashes for the final block of the file and all of the file signatures are identical, indicating that the final block of the file has not changed since the original file was stored, and hence the original data block is the data block that should be included in instance 6.

FIGS. 17A-B are intended to illustrate the logical reconstruction of a given instance from the file-signature history and data-block history for a file. However, from a practical standpoint, a particular instance of a file can be completely restored using only the file signature corresponding to that instance and the data block store. This is because each block descriptor within the file signature includes a block hash that uniquely specifies the data block that occurs at the corresponding data-block position within the file.

FIGS. 18A-B illustrate version-history truncation according to embodiments of the present invention. FIG. 18A shows the block history discussed above with reference to FIG. 15D. It may be the case that, to conserve storage space, the backup-restore-and-archiving system may elect to store only some number of most recent instances of a file. For example, as shown in FIG. 18A, the backup-restore-and-archiving system may choose to store only instances 6, 5, 4, and 3 for the file, and delete file signatures and unneeded blocks for instances 2, 1, and 0. Conceptually, truncating the instance history, or removing a number of least-recently generated instances, can be thought of selecting a new, least-recently generated instance, represented by the dashed line 1802 in FIG. 18A, and removing the stored file signatures for previous instances, as well as unneeded data blocks for the previous instances. In FIG. 18A, the unneeded data blocks are shown with an "X" symbol, such as "X" symbol 1804. The data blocks representing the data of the third instance of the file are shown with open circles, such as open circle 1806. Thus, to truncate the file history, the file signatures corresponding to instances 2, 1, and 0 are removed, and the data blocks shown in FIG. 18A with "X" symbols can be deleted from the permanent store. FIG. 18B shows the data-block history following the version truncation discussed with reference to FIG. 18A. As shown in FIG. 15B, the instance previously labeled as "instance 3" is now labeled as "instance 0" 1810, and those data blocks from previous instances that were altered subsequently at or before instance 3 have been removed. Instance histories can therefore be truncated entirely on the server-side portion of the backup-restore-and-archiving system, without need for reconstructing the original file and generating successive instances up to and including the most recently generated instance to be removed.

Figure 19B:
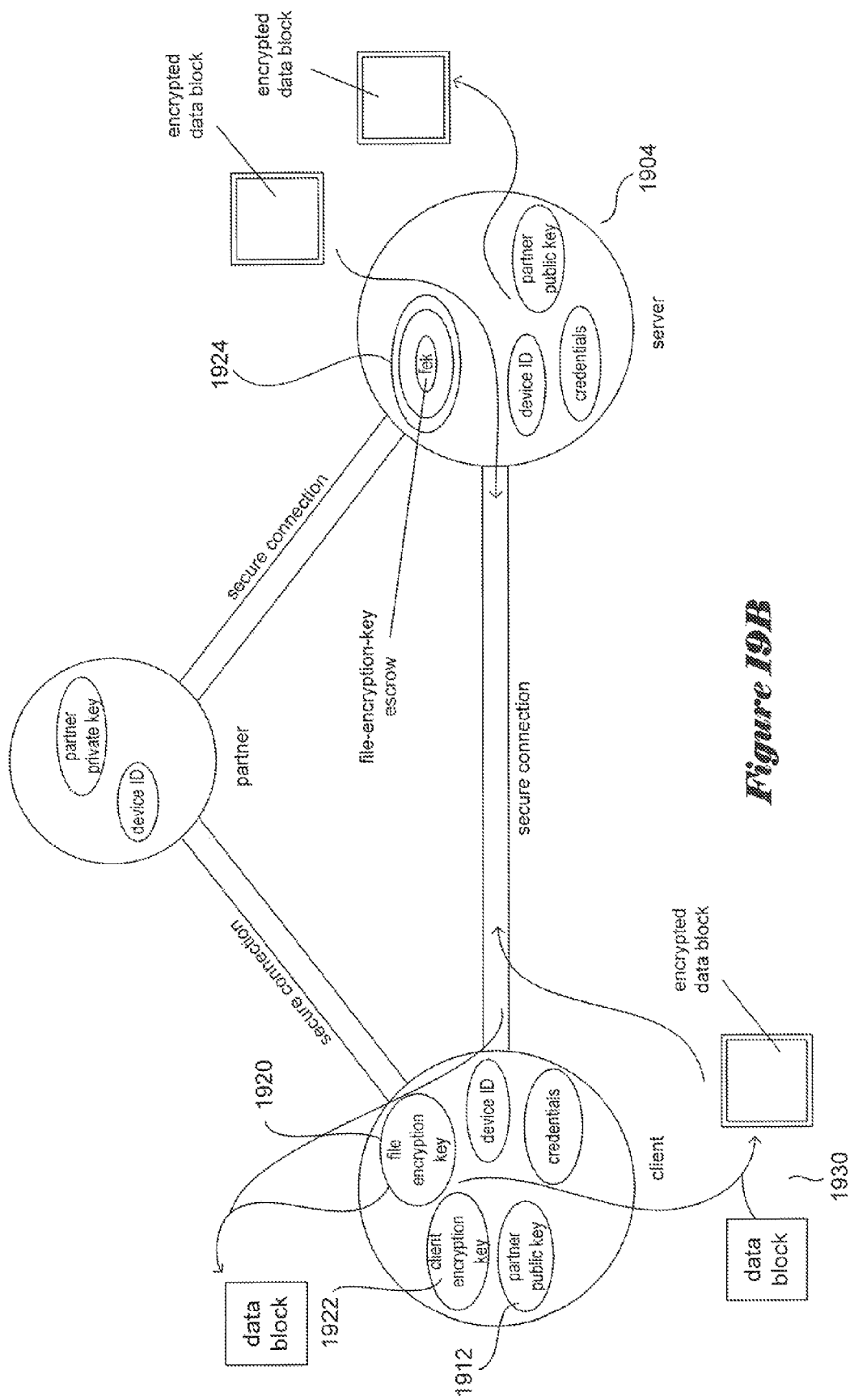

FIGS. 19A-B illustrate security-related entities and operations within the backup-restore-and-archiving system that represents one embodiment of the present invention. These entities and operations are discussed relative to the client-side, server-side, and partner-side portions of the backup-restore-and-archiving system. In describing these entities and operations, a single client device 1902, server-side portion 1904, and partner 1906 are considered. The client, partner, and server communicate with one another via secure connections 1908-1910. In one embodiment of the present invention, partner/server communications is conducted through a doubly authenticated SSL connection. Client/partner communications are conducted through a single-sided SSL secure connection 1908, with the partner supplying an SSL certificate authenticated by a third-party authentication service on behalf of the client. During initial client/server communications, a singly authenticated SSL connection 1910 is employed. Subsequently, the SSL connection is supplemented by credential transmission on each client's request to the server.

The partner 1906 is an entity independent from the server 1904 through which a client contracts for services. The partner is also a vital component of the overall security strategy, as discussed below. The partner generates a partner private-key/public-key encryption key pair, maintaining the partner private key 1912 securely on the partner system and providing the partner public key 1914 to the server-side portion of the backup-restore-and-archiving system, in turn provided by the server to the client. The partner also includes a stored device ID 1916 that identifies the client. The client also stores the device ID. The device ID is originally generated on, and stored within, the server 1904. The server generates credentials 1918 on behalf of the client, and furnishes the credentials to the client for securing subsequent client/server communications. The client generates and uses a file-encryption key 1920 known only to the client. The file-encryption key is used to encrypt data blocks transmitted to, and stored by, the server 1904. The client also generates and stores a client encryption key 1922 used together with the partner public key 1912 to doubly encrypt the client's file-encryption key 1920 for storage within the server in doubly encrypted form 1924.

FIG. 19B illustrates use of the file-encryption key. The file-encryption key 1920 is used by the client to encrypt each data block 1930 that is transmitted to, and stored by the server 1904. Similarly, the client employs the file-encryption key 1920 to decrypt data blocks returned by the server to the client used for restoring client file instances. Because the file-encryption key is generated by the client and accessible only to the client, no file data transmitted from the client device to remote entities as part of backup and restore operations can be accessed by remote devices. Although the file-encryption key is escrowed 1924 within the server 1904, the server cannot access the file-encryption key, since the file-encryption key is itself encrypted both by the client-encryption key 1922 known only to the client and by the partner public encryption key 1912. A client may recover a file-encryption key by requesting that the partner retrieve the doubly encrypted file-encryption key escrowed on the server and decrypt the first layer of encryption, returning to the client device the file-encryption key encrypted by the client-encryption key. This ensures that the server cannot access client data or the client's file-encryption key, and the partner cannot access either the file-encryption key or client data. Loss by the client of the file-encryption key is not fatal to the client, since the file-encryption key is escrowed within the server 1904.

Figure 19C:
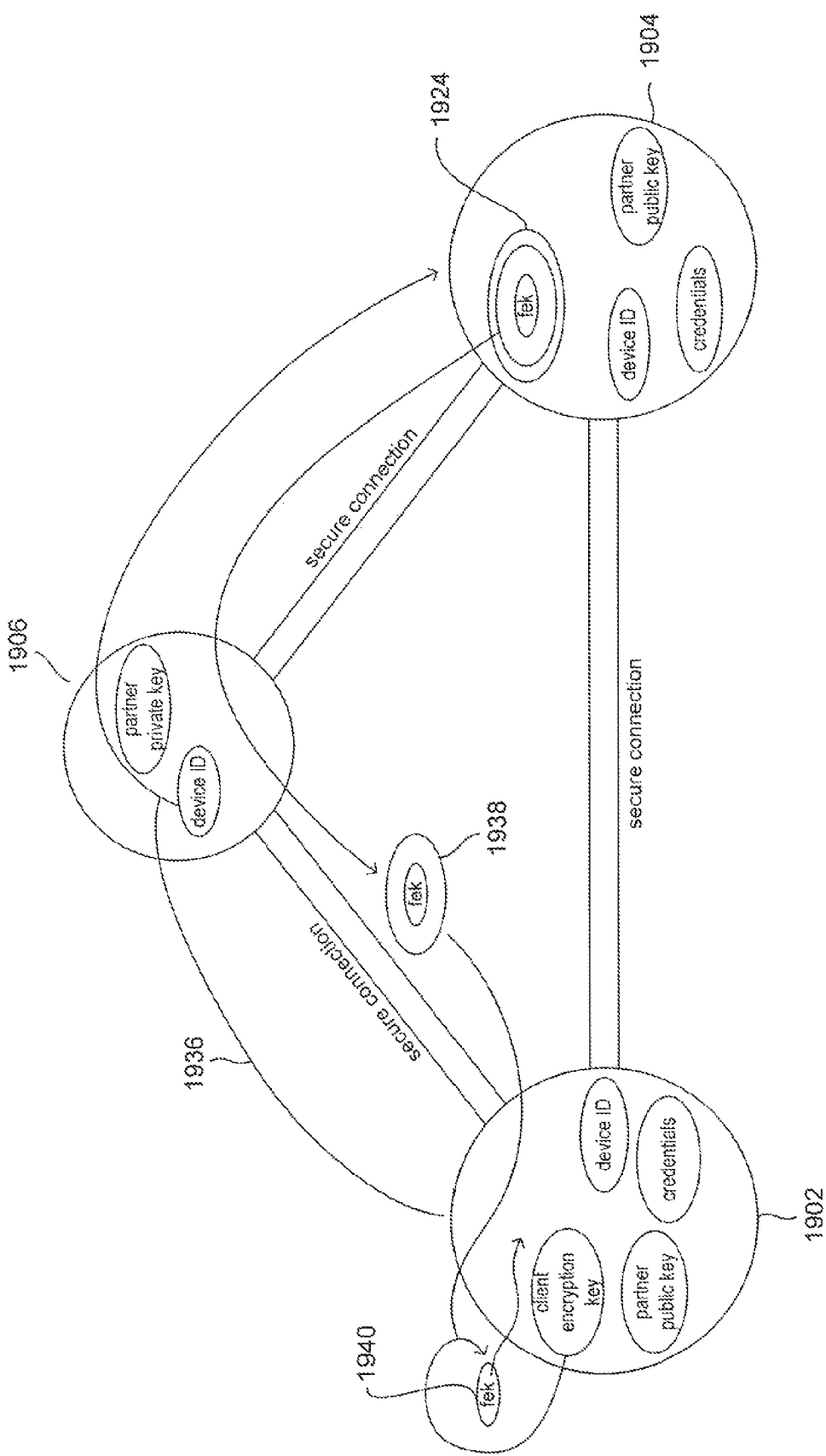
FIG. 19C illustrates retrieval of a file-encryption key by a client device in the event that the client inadvertently deletes or loses the file-encryption key.

FIG. 19C illustrates retrieval of a file-encryption key by a client device in the event that the client inadvertently deletes or loses the file-encryption key. Without the file-encryption key, the client cannot decrypt encrypted data blocks returned to the client by the server. However, the client file-encryption key is escrowed in doubly encrypted form 1924 on the server 1904. Therefore, in order to retrieve the file-encryption key, the client sends a request 1936 to the partner 1906 to retrieve the file-encryption key, and the partner, in turn, forwards the request to the server 1904. The server returns the doubly encrypted file-encryption key 1924 to the partner, which decrypts the first level of encryption to produce a file-encryption key singly encrypted with the client's client-encryption key 1938. The singly encrypted file-encryption key 1938 is returned to the client 1902, which decrypts the file-encryption key using the client-encryption key to regenerate the file-encryption key in clear form 1940.

FIG. 19D illustrates secure communications between the client device and server facilitated by client credentials. When the server requests a service from the server, such as processing of an upload file to back up currently altered client files, the client includes, within the request, the device ID 1916 that represents the client along with credentials 1918, such as a user name and password generated by the server and supplied to the client computer during client initialization. Upon receiving the request, the server can verify that the request has been received from a valid client by matching the device ID and credentials included with the request with a stored device ID 1916 and credentials within the active-directory portion of the server-side portion of the backup-restore-and-archiving system. Thus, the device ID and credentials allows the server to identify requests as having been received from a particular client, verify the request, and route the request through the server-side portion of the backup-restore-and-archiving system so that a response generated from the request can be returned to the requested client.

Figure 20A:
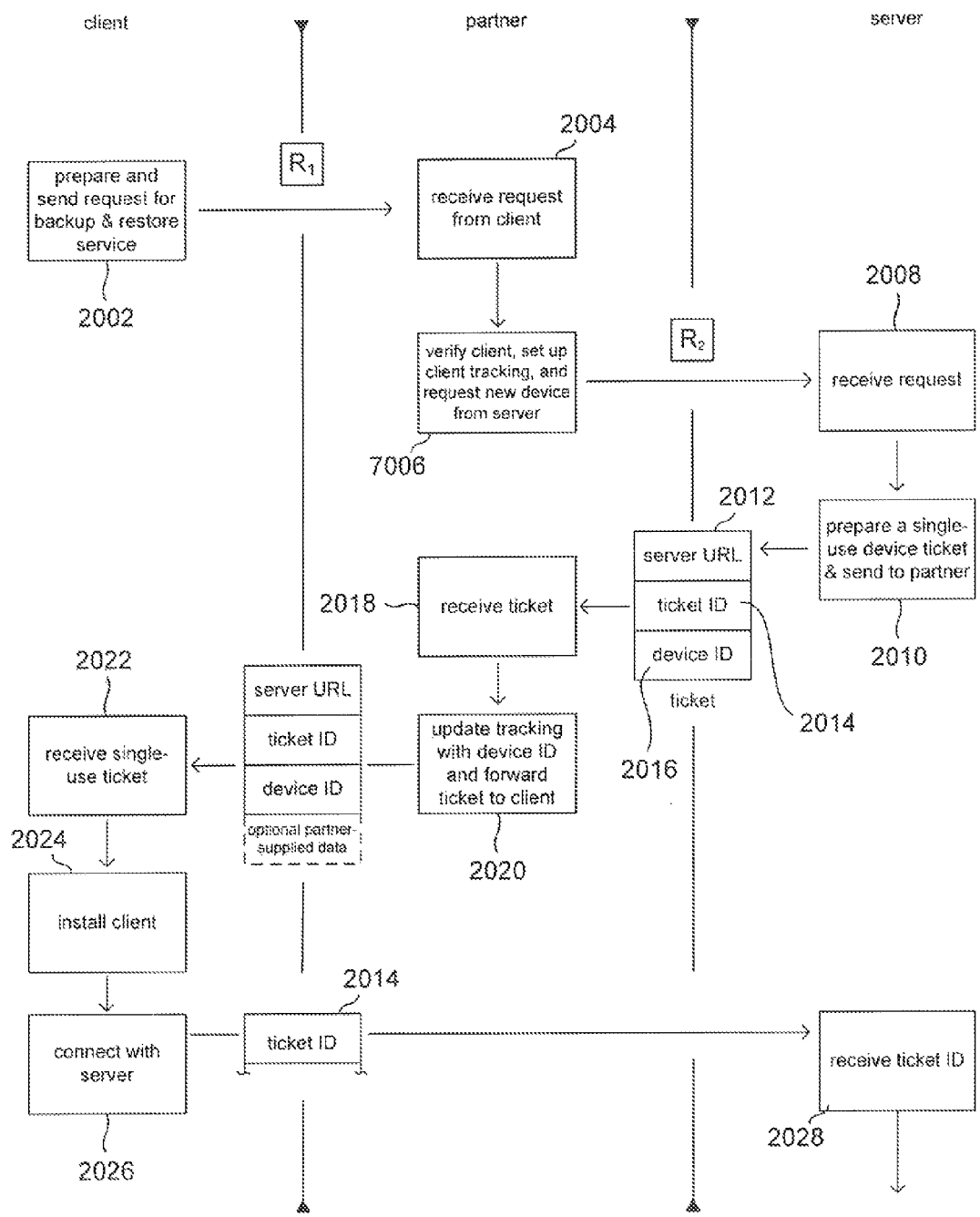
FIGS. 20A-C provide a type of control-flow diagram illustrating initialization of a client so that the client can conduct fully secure request and data exchanges with the server-side portion of a backup-restore-and-archiving system that represents an embodiment of the present invention.
Figure 20B:
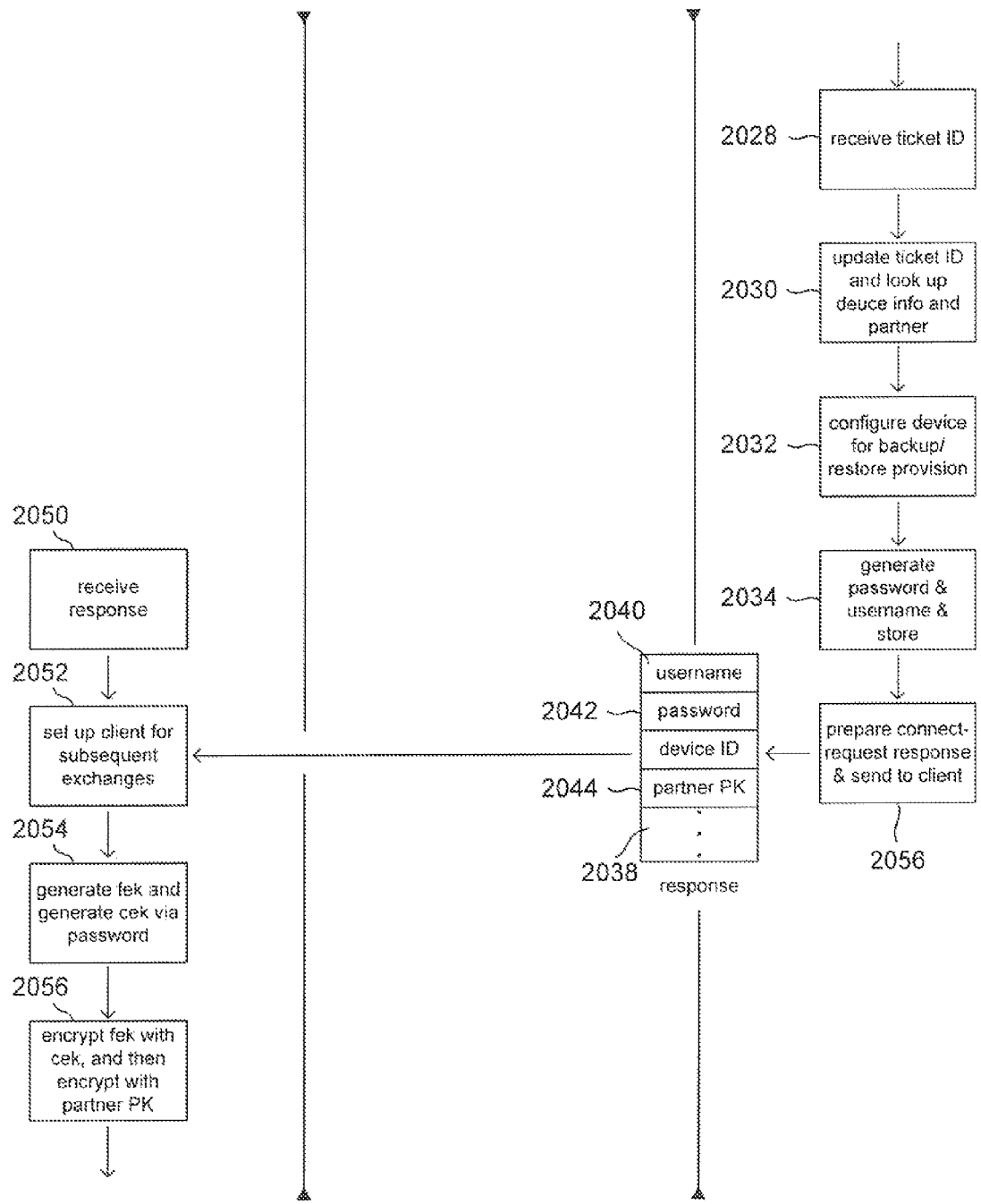
Figure 20C:
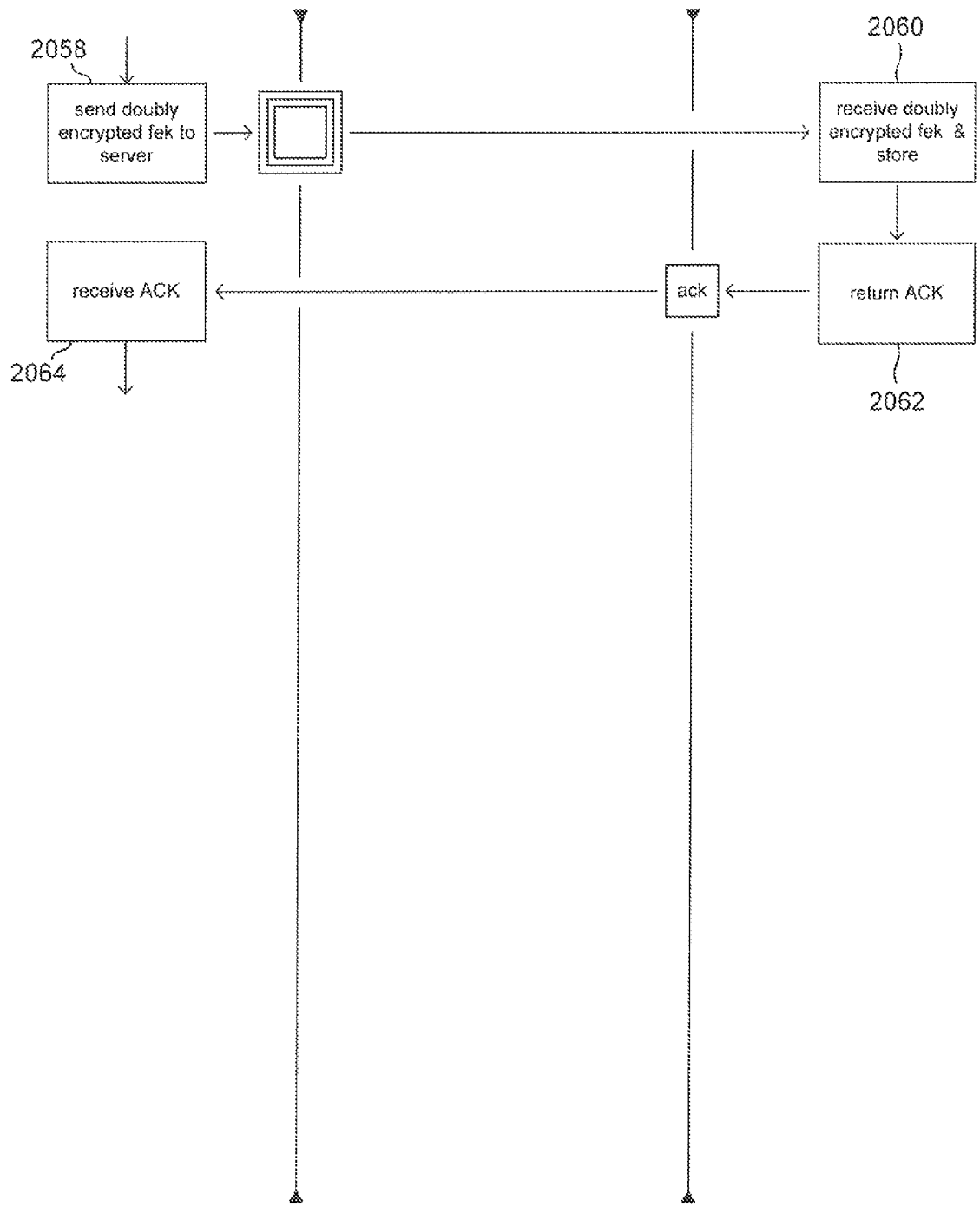

FIGS. 20A-C provide a type of control-flow diagram illustrating initialization of a client so that the client can conduct fully secure request and data exchanges with the server-side portion of a backup-restore-and-archiving system that represents an embodiment of the present invention. First, in step 2002, the client prepares and sends a request for receiving backup and restore services to a partner. The client may prepare and send the request via interaction with a partner-supplied web page, via a partner-supplied initialization routine, or by another method. In step 2004, the partner receives the backup and restore service request from a client and, in step 2006, verifies that the request came from a legitimate client device, carries out any other additional verification, such as attempting to match the client device with a list of unfavored devices, establishes a stored data entry for the client by which the partner may eventually track the client and subsequently identify and interact with the client, and requests provision of the new device from the server by sending a device-provision request to the server. The receiver receives the device-provision request in step 2008, and, in step 2010, prepares a single-use device ticket that the server then returns to the partner. The single-use device ticket includes a URL by which the client can subsequently contact the server 2012, a ticket ID that uniquely identifies the single-use ticket within the backup-restore-and-archiving system 2014, and a device ID generated to represent the client 2016. The partner receives the single-use device ticket in step 2018 and updates the client information stored by the partner to include the device ID contained in the ticket before forwarding the ticket, in step 2020 to the client device. The partner may, in addition, send optional information to the ticket prior to forwarding the ticket to the client device. For example, a group of client devices may elect to use a common client-encryption key and other such information generated on behalf of the clients by the partner. The optional information appended to the ticket may include this key. In step 2022, the client device receives the single-use ticket. In step 2024, the client installs a client-side application that implements the client-side user-interface routine and service processes discussed with reference to FIG. 13A. Once the client-side executables are installed and executing, the client, in step 2026, establishes a secure connection with the server and sends the ticket ID 2014 contained in the single-use device ticket received by the client to the server. In step 2028, the server receives the ticket ID and then, continuing with FIG. 20B, validates the ticket ID and accepts the previously generated device ID and partner information for the client in step 2030. The server then configures the server-side portion of the backup-restore-and-archiving system to provide services to the client device identified by the device ID in step 2032 and generates, in step 2034, credentials for the client device, such as a password and user name. The server then, in step 2036, prepares a response for the client 2038 that includes the generated user name 2040, password 2042, and the partner's public key 2044, and returns the response 2038 to the client.

In step 2050, the client receives the response and then, in step 2052, using the information contained in the response, configures the client-side processes for subsequent request and data exchanges with the server. In step 2054, the client generates the client's file-encryption key and generates the client's client-encryption key via a password-based method. By remembering the password, the client can re-generate the client-encryption key at a subsequent time. Then, in step 2056, the client encrypts the file-encryption key with the client-encryption key, and then encrypts the encrypted file-encryption key with the partner's public key to produce a doubly encrypted file-encryption key. In step 2058, the client sends the doubly encrypted file-encryption key to the server, which receives the doubly encrypted file-encryption key in step 2060 and stores, or escrows, the doubly encrypted file-encryption key. In step 2062, the client returns an acknowledgement to the client, which, upon receiving the acknowledgement in step 2064, is prepared to subsequently issue requests to the server and exchange data with the server. The secure connection between the client and server may operate only for short periods of time, and may be re-established by the client for subsequent requests and data exchanges. Once the client possesses the device ID and credentials, the client can re-establish a fully secure connection to the server at any point in time.

FIG. 21 illustrates, at an overview level, the block store implemented by the permanent-store portion of the server-side portion of the backup-restore-and-archiving system that represents one embodiment of the present invention. In FIG. 21, the block store 2102 is illustrated as containing a block-hash index 2104, each entry of which references a particular encrypted data block, such as data block 2106, stored within the block store. In addition to containing a reference for a particular data block, an entry in the block-hash index may also include a reference count to indicate the number of file signatures that currently reference the block. In this way, only a single instance of any particular data block need be stored in the data store, despite the fact that multiple files distributed across multiple clients may include the data block. Operations provided by the block store include (1) query; (2) retrieve; (3) store; and (4) delete. In the query operation 2108, the block store receives a block hash 2110 and consults the block-hash index to determine whether an encrypted data block corresponding to the block hash is currently stored in the block store. An indication 2112 of whether or not a data block corresponding to the block hash is currently stored in the block store is returned. In the retrieve operation 2114, the block store receives a block hash 2116 and returns the encrypted data block 2118 corresponding to the block hash from the block store in the event that a currently stored encrypted data block corresponds to the supplied block hash 2116. In the store operation 2120, the block store receives a block hash and an encrypted data block and, when the encrypted data block is not already stored within the block store, stores the data block and updates the block-hash index to the supplied block hash to reference the data block. If the encrypted data block is already stored within the block store, the reference count for the data block is incremented. In the delete operation 2126, the block store receives a block hash and decrements the reference count for the block hash if the block hash currently resides within the block-hash index. If the reference count is decremented to 0, then the data block referenced by the block-hash index is also deleted, prior to removing the block-hash-index entry corresponding to the block hash.

Figure 22:
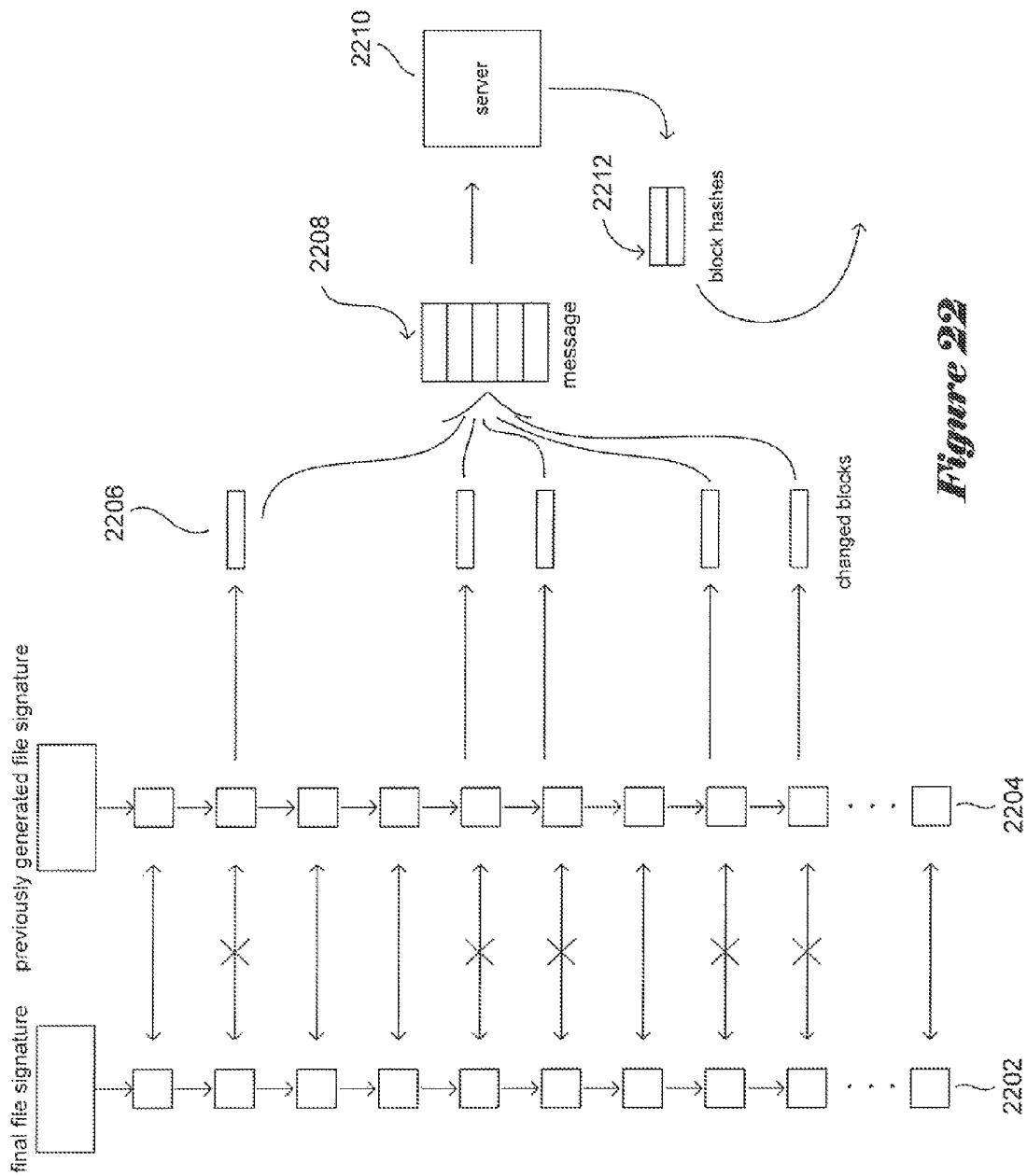
FIG. 22 illustrates differential backup.

The block hash methodology and block store described with reference to FIG. 21 allows for both differential backup and restore. FIG. 22 illustrates differential backup. As shown in FIG. 22, the final signature 2202 generated for a newly updated file is compared, on the client, with the most recently, previously generated file signature 2204 for the file to determine which blocks of the file have changed 2206. The block hashes for these changed blocks can be packaged together into a message 2208 that can be sent to the server. The server then queries the block store to determine which of the block hashes are not currently stored in the block-hash index of the block store, as discussed above with reference to FIG. 21. Only the data blocks corresponding to those block hashes need be sent by the client to the server during the backup process. The server thus returns an indication 2212 of the block hashes of the Δ blocks 2206 that are not currently stored in the block store, and the client, in preparing an upload file, needs only to transmit the newly generated file signature 2202 and those data blocks corresponding to the block hashes 2212 returned by the server. Differential backup eliminates unnecessary data exchanges between the client and server. A two-phase commit protocol can be used to ensure that data blocks are not deleted from the data-block store in the interval between a query and data-block transmission.

FIG. 23 illustrates differential restore. In differential restore, the file signature 2302 for the desired instance is compared with the file signature 2304 for the file as it currently exists on the client. The comparison generates a set of Δ blocks 2306 representing the data that needs to be recovered in order to restore the file to the desired version, or instance. However, certain of these Δ blocks may reside within the local block cache 2308 maintained by the client, so only those Δ blocks 2310 not locally stored need to be recovered from the server in order to restore the file to the desired instance. In the case that the local data-block hash is extensive, and the desired instance relatively recently backed up, it is possible that the restore operation may be fully executed locally, on the client device, without the need to obtain encrypted data blocks from the server.

Figure 24A:
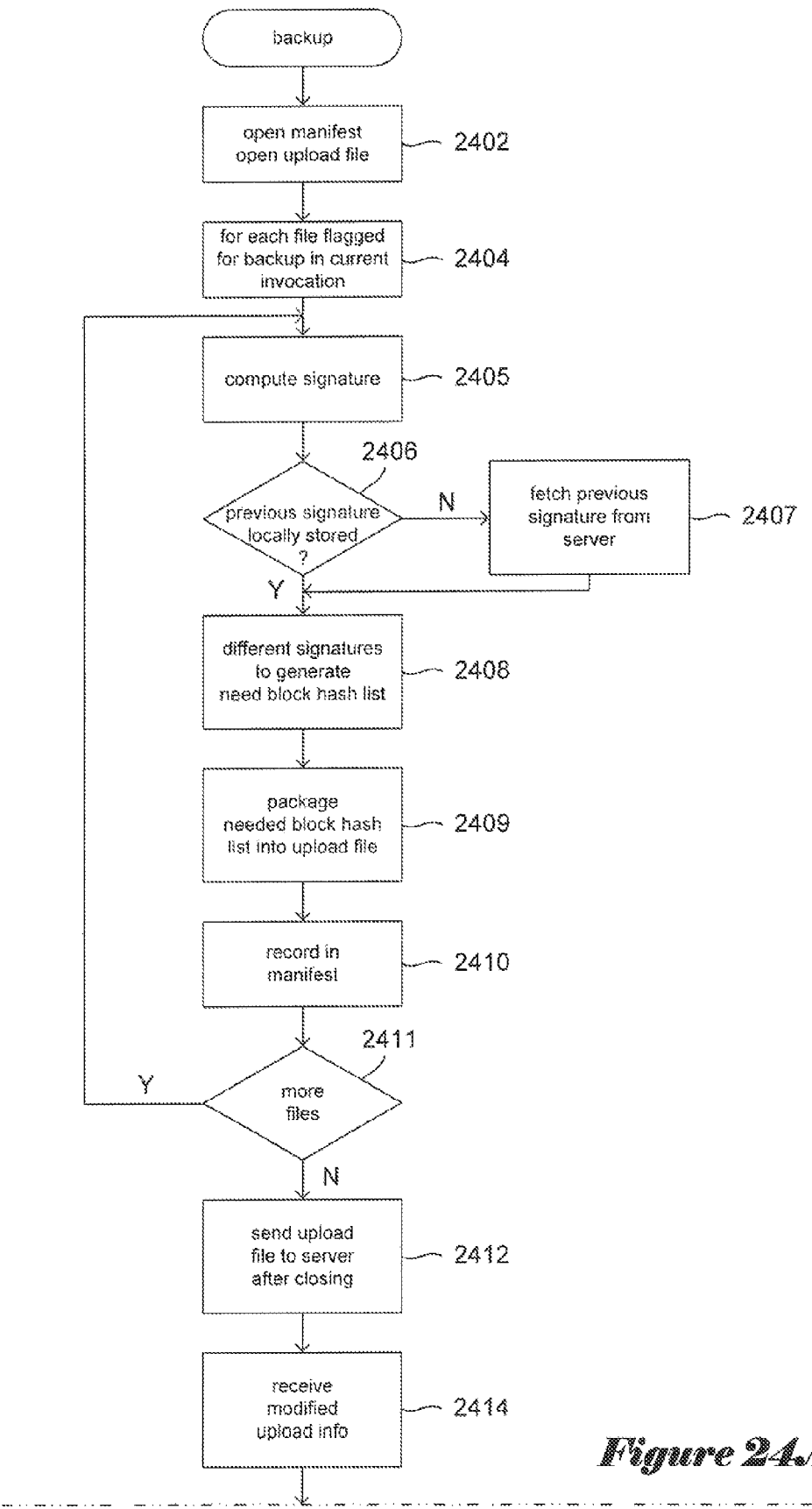
FIGS. 24A-B provide a flow diagram for the backup process carried out by the main service process on the client side of the backup, restore, and archiving system that represents one embodiment of the present invention.
Figure 24B:
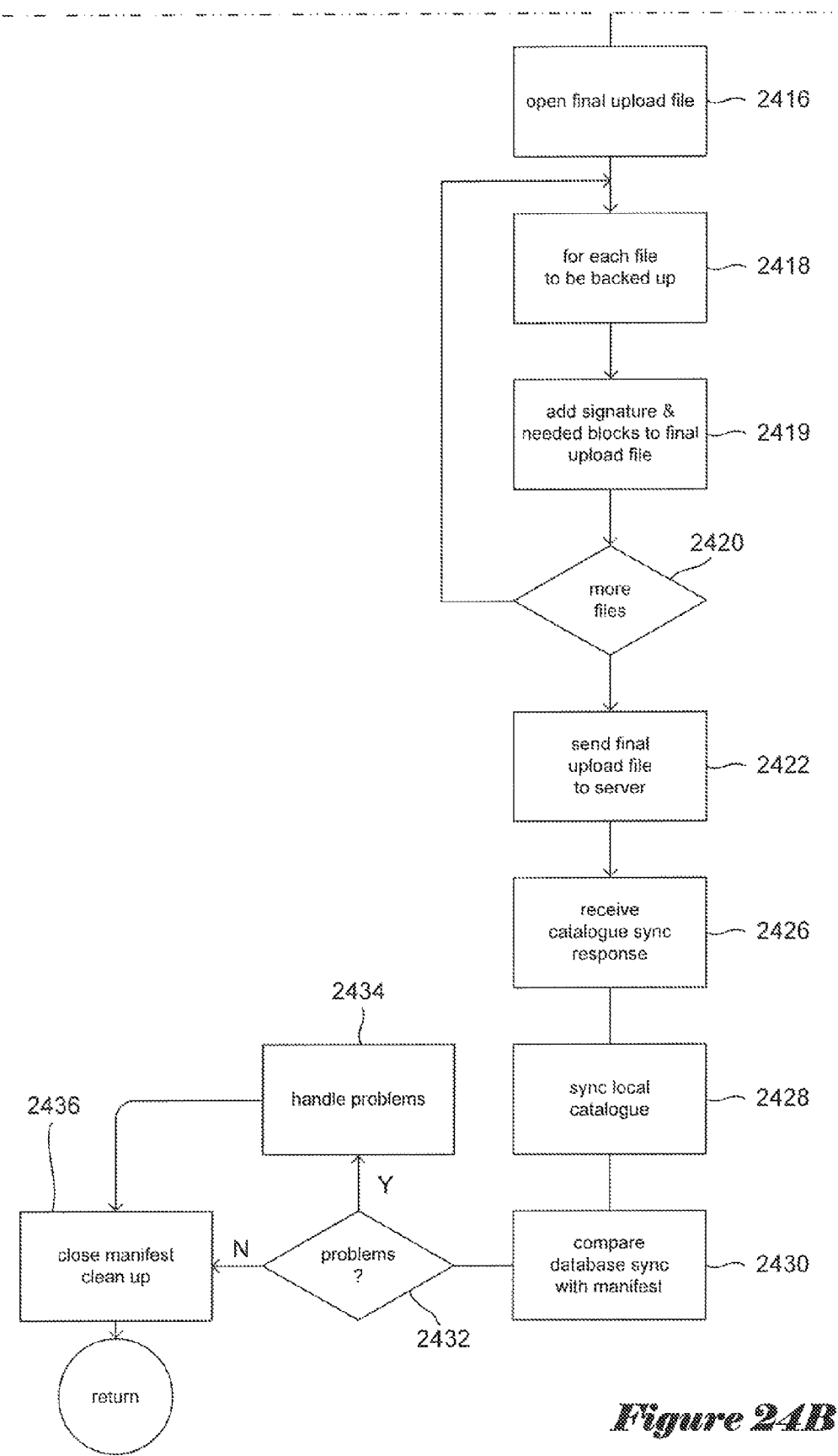

FIGS. 24A-B provide a flow diagram for the backup process carried out by the main service process on the client side of the backup-restore-and-archiving system that represents one embodiment of the present invention. In step 2402, a new manifest and upload and a new upload file are created. Next, in the for-loop comprising steps 2404-2411, each file of a set of files that are flagged for differential backup are processed. For each file, the current file signature is computed, in step 2405. If the previously computed file signature is not locally stored, as determined in step 2406, then the previously computed file signature is retrieved from the server, in step 2407. Next, in step 2408, the file signatures are compared to generate a list of Δ blocks that may need to be encrypted and transferred to the server as part of the backup process. In step 2409, this list of blocks is packaged into the upload file, and the results of the differential comparison are recorded in the manifest in step 2410. If more files need to be processed, as determined in step 2411, then control flows back to step 2405. Once all the files have been processed, the upload file is sent to the server, in step 2412. In step 2414, the backup routine receives from the server the list of data blocks that actually need to be transferred to the server. In other words, the server has queried the block store to determine which of the Δ blocks are already stored in the block store, as discussed above with reference to FIG. 22. Continuing to FIG. 24B, the backup routine opens a final upload file, in step 2416, and, in the for-loop comprising steps 2418-2420, the file signature and encrypted data-blocks that need to be transported to and stored on the server are added to the final upload file. In step 2422, the final upload file is transmitted to the server, and the server stores the file signatures in the data base, data blocks in the data store, and returns a catalog-sync response to the client so that the client can synchronize the local catalog with the remote catalog, including updating the file-signature history of all files that have been successfully backed up. In step 2426, the client receives the catalog-sync response and accordingly synchronizes the local catalog in step 2428. In step 2430, the backup routine compares the catalog synch with the manifest. If it turns out that problems have been encountered by the server, and certain backup operations have not been successfully executed, as determined in step 2432, then those problems are handled, in step 2434, in various ways. For example, backup requests may be re-issued, files may be flagged as temporarily defective, and restored through more comprehensive restoration techniques, or other methods may be employed to correct or ameliorate any encountered problems. Finally, in step 2436, the manifest is closed and temporary files and data structures are removed to complete the backup operation.

Figure 25:
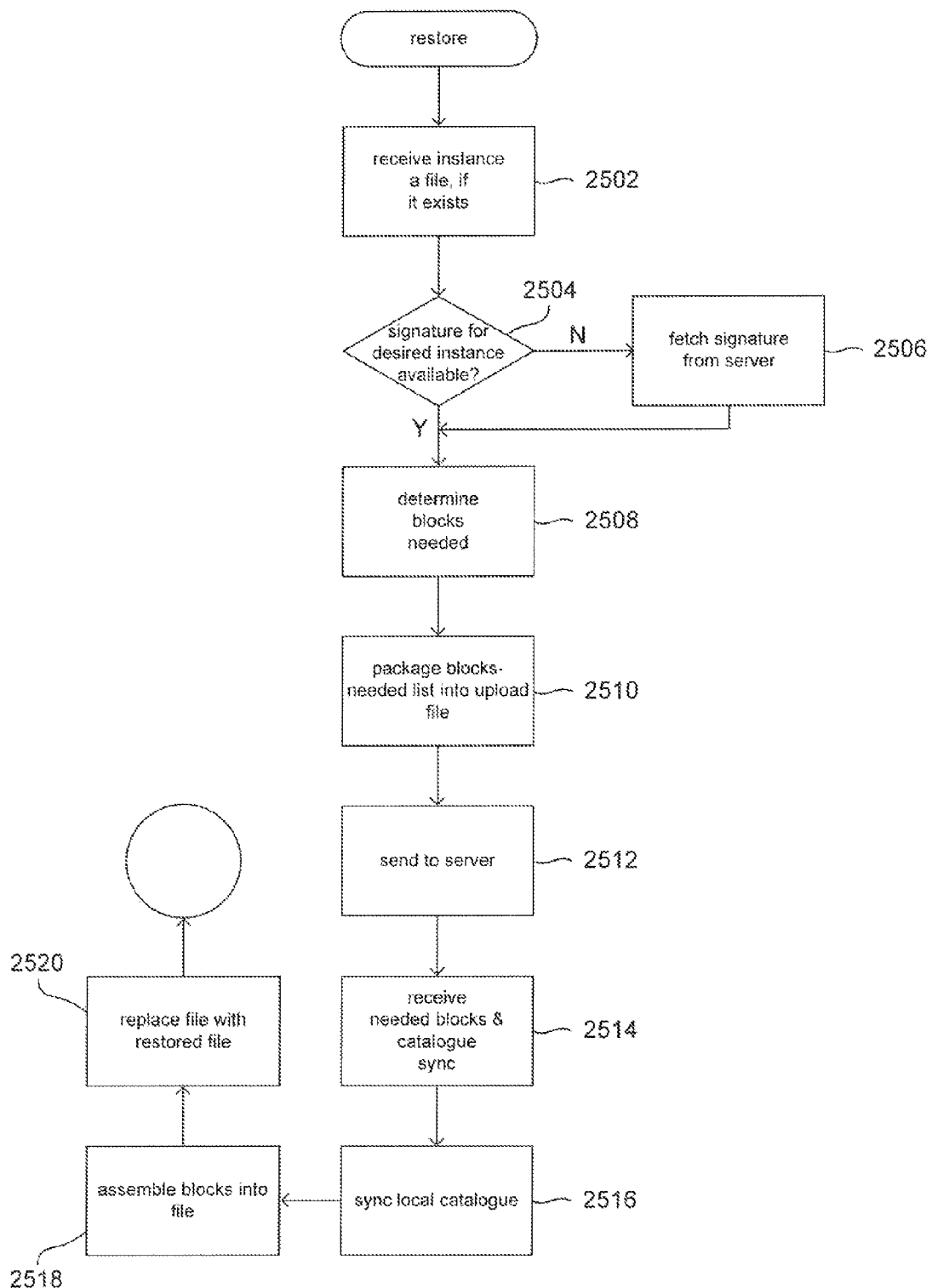
FIG. 25 is a control-flow diagram illustrating the restore operation carried out by the main service process executing on a client device according to one embodiment of the present invention.

FIG. 25 is a control-flow diagram illustrating the restore operation carried out by the main service process executing on a client device according to one embodiment of the present invention. In step 2502, the restore operation is invoked for restoration of a file to a particular version. If the file signature for the desired version is not locally available, as determined in step 2504, then that file signature is requested from the server in step 2506. Next, in step 2508, the restore routine determines which blocks need to be recovered from the server in order to restore the instance, as discussed above with reference to FIG. 23. A blocks-needed list is packaged into an upload file, in step 2510 that is then transmitted to the server in step 2512. In step 2514, the restore routine receives the needed blocks and catalog-sync information from the server. In step 2516, the local catalog is synchronized by updating the local catalog, if necessary, to reflect successful restoration of the file. In step 2518, the data blocks for the file are assembled to form the desired instance of the file which is then used in step 2520, to replace the existing file with the restored file. In other words, the restore operation illustrated in FIG. 25 overwrites an existing file with a desired version. Alternatively, a restore operation may be directed to restore a particular version of a file as a new instance of the file, or as a different file with a different file name.

The backup-restore-and-archiving system of the present invention is flexible with regard to the particular encryption algorithms, compression algorithms, and specific file-encryption key used by a client device. As discussed above, identifiers for the compression algorithm, encryption algorithm, and file-encryption key are included in the block hash calculation, so that if the client decides to change file-encryption keys at some point in time after files have been backed up using the previous file-encryption key, the client can begin using a newly generated file-encryption key, and the server can begin receiving data blocks encrypted by the new file-encryption key while, over time, the server returns data blocks encrypted by the old encryption key to the client for re-encryption with a new file-encryption key and retransmission to the server. In other words, for a certain period of time, data blocks encrypted both with the old file-encryption key and the new file-encryption key can be maintained, without ambiguity, by the backup-restore-and-archiving system while migration to the new file-encryption key is carried out.

Although the present invention has been described in terms of a particular embodiment, it is not intended that the invention be limited to this embodiment. Modifications within the spirit of the invention will be apparent to those skilled in the art. For example, an almost limitless number of different Web-Services-based data-backup and data-archiving applications are possible, including implementations that differ in control structures, programming language, data structures, modularization, and a whole host of other such programming parameters. While the described embodiments implement a remote data-backup and data-archiving service using the Web-Services platform and Internet communications, other remote data-backup and data-archiving services that represent embodiments of the present invention that employ different protocol standards and specifications and different communications media are also possible. Although the described embodiments provide a relatively concise application interface to client-side and partner-services provider applications, alternative embodiments may provide far more complex and feature-rich interfaces. Any of a wide variety of different public/private encryption schemes, hash-based encryption, symmetric encryption, or other encryption techniques may be employed to encrypt data and messages used for client initialization and data transfer in the various embodiments of the present invention. While the described embodiments primarily involve backup and archiving of data files, any type of data object required to be backed up or archived by client computer may be packaged within a file for transmission and storage in the data vault. Each client computer may be associated with multiple data-backup and data-archiving devices configured by one or more data-vaults.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

The invention claimed is:

1. A backup and restore system comprising:
  a server-side portion that receives backup and restore requests and processes the backup and restore requests by returning encrypted data blocks in response to a restore request, and
  storing encrypted data blocks and file signatures in response to a backup request; and
  wherein a file signature includes a header that specifies a file-signature version and an ordered sequence of block descriptors, each block descriptor including a block hash and a block length; and
  wherein a file signature is generated from a file by partitioning the file into an ordered sequence of natural blocks; and
  coalescing the natural blocks, in order, in a an ordered sequence of approximately fixed-size blocks; and
  for each approximately fixed-size block,
    generating a block descriptor that includes an indication of the length of the block and a cryptographic hash of the block; and
  appending the header to the generated block descriptors;
  a client-side portion that provides a user-interface that allows files to designated for continuous backup, includes a service process that detects changes to files designated for continuous backup, computes file signatures, computes, by file-signature comparison, blocks needed to be stored for backup and restore operations, and issues requests for backup and restore operations, and includes a transport service process for exchanging requests and data with the server-side portion.

2. The backup and restore system of claim 1 wherein each cryptographic hash is generated from each approximately fixed-size block by appending a file-encryption key, an encryption-algorithm identifier, and a compression-algorithm identifier to the approximately fixed-size block to generate a fully-specified approximately fixed-size block and applying the cryptographic hash function to the fully-specified approximately fixed-size block.

3. The backup and restore system of claim 1 wherein the service process periodically compares current timestamps of files to previously recorded timestamps to detect those files altered since a previous file-change-detection iteration.

4. The backup and restore system of claim 1 wherein the service process determines blocks needed to be sent to the server portion to backup a file by:

generating a current file signature for the file;

comparing the current file signature to a previously generated file signature to determine data blocks in the file that have changed since the file was last backed up;

determining those data blocks in the file that have changed since the file was last backed up that are not currently stored by the server-side portion as data blocks needed to be stored; and transmitting the current file signature and determined data blocks needed to be stored to the server portion.

5. The backup and restore system of claim 1 wherein the service process determines blocks needed to be requested from the server portion to restore a file by: obtaining a file signature for an instance of the file to be restored; and determining the blocks identified by block hashes in the file signature that are not currently available on the client.

6. The backup and restore system of claim 1 wherein each data block identified by a computed block hash is stored only once by the server-side portion, regardless of the number of times the data block occurs in files designated for continuous backup.

7. The backup and restore system of claim 1 wherein each data block transmitted to the server-side portion is encrypted using a file-encryption key known only to the client that transmitted the data block to the server-side portion, so that the server-side portion cannot access client data stored by the server-side portion.

8. The backup and restore system of claim 1 wherein the server-side portion stores doubly encrypted file-encryption keys on behalf of clients so that clients can restore lost file-encryption keys without providing access to the file-encryption keys to the server-side portion or other clients.

\* \* \* \* \*